United States Patent
Burshtain et al.

(10) Patent No.: US 10,916,811 B2
(45) Date of Patent: Feb. 9, 2021

(54) SEMI-SOLID ELECTROLYTES WITH FLEXIBLE PARTICLE COATINGS

(71) Applicant: StoreDot Ltd., Herzeliya (IL)

(72) Inventors: Doron Burshtain, Herzliya (IL); Daniel Aronov, Netanya (IL); Eran Sella, Tel-Aviv (IL)

(73) Assignee: STOREDOT LTD., Herzeliya (IL)

( * ) Notice: Subject to any disclaimer, the term of this patent is extended or adjusted under 35 U.S.C. 154(b) by 0 days.

(21) Appl. No.: 16/268,527

(22) Filed: Feb. 6, 2019

(65) Prior Publication Data

US 2019/0207270 A1   Jul. 4, 2019

Related U.S. Application Data

(63) Continuation of application No. PCT/IL2017/051358, filed on Dec. 18, 2017, and a
(Continued)

(51) Int. Cl.
*H01M 10/42* (2006.01)
*H01M 10/0525* (2010.01)
(Continued)

(52) U.S. Cl.
CPC ... *H01M 10/4235* (2013.01); *H01M 10/0525* (2013.01); *H01M 10/0562* (2013.01);
(Continued)

(58) Field of Classification Search
CPC ......... H01M 10/4235; H01M 10/0525; H01M 10/0567; H01M 2300/0091; H01M 2300/0094; H01M 10/0562; Y02E 60/10
See application file for complete search history.

(56) References Cited

U.S. PATENT DOCUMENTS 3,778,254 A   12/1973   Cole et al.
6,051,340 A   4/2000   Kawakami
(Continued)

FOREIGN PATENT DOCUMENTS

CA   2161076   4/1996
CA   2258026   12/1997
(Continued)

OTHER PUBLICATIONS

Office action of U.S. Appl. No. 16/243,190, dated Jun. 12, 2019.
(Continued)

*Primary Examiner* — Lingwen R Zeng
(74) *Attorney, Agent, or Firm* — Reches Patent

(57) ABSTRACT

Electrolytes, anode material particles and methods are provided for improving performance and enhancing the safety of lithium ion batteries. Electrolytes may comprise ionic liquid(s) as additives which protect the anode material particles and possibly bind thereto; and/or may comprise a large portion of fluoroethylene carbonate (FEC) and/or vinylene carbonate (VC) as the cyclic carbonate component, and possibly ethyl acetate (EA) and/or ethyl methyl carbonate (EMC) as the linear component; and/or may comprise composite electrolytes having solid electrolyte particles coated by flexible ionic conductive material. Ionic liquid may be used to pre-lithiate in situ the anode material particles. Disclosed electrolytes improve lithium ion conductivity, prevent electrolyte decomposition and/or prevents lithium metallization on the surface of the anode.

21 Claims, 34 Drawing Sheets

Related U.S. Application Data continuation-in-part of application No. 15/447,784, filed on Mar. 2, 2017, and a continuation-in-part of application No. 15/447,889, filed on Mar. 2, 2017, now Pat. No. 10,096,859, and a continuation-in-part of application No. 15/447,784, filed on Mar. 2, 2017.

(60) Provisional application No. 62/435,783, filed on Dec. 18, 2016, provisional application No. 62/441,458, filed on Jan. 2, 2017, provisional application No. 62/482,450, filed on Apr. 6, 2017, provisional application No. 62/482,891, filed on Apr. 7, 2017, provisional application No. 62/550,711, filed on Aug. 28, 2017, provisional application No. 62/319,341, filed on Apr. 7, 2016, provisional application No. 62/371,874, filed on Aug. 8, 2016, provisional application No. 62/337,416, filed on May 17, 2016, provisional application No. 62/401,214, filed on Sep. 29, 2016, provisional application No. 62/401,635, filed on Sep. 29, 2016, provisional application No. 62/421,290, filed on Nov. 13, 2016, provisional application No. 62/426,625, filed on Nov. 28, 2016, provisional application No. 62/427,856, filed on Nov. 30, 2016, provisional application No. 62/435,783, filed on Dec. 18, 2016, provisional application No. 62/441,458, filed on Jan. 2, 2017, provisional application No. 62/319,341, filed on Apr. 7, 2016, provisional application No. 62/337,416, filed on May 17, 2016, provisional application No. 62/371,874, filed on Aug. 8, 2016, provisional application No. 62/401,214, filed on Sep. 29, 2016, provisional application No. 62/401,635, filed on Sep. 29, 2016, provisional application No. 62/421,290, filed on Nov. 13, 2016, provisional application No. 62/426,625, filed on Nov. 28, 2016, provisional application No. 62/427,856, filed on Nov. 30, 2016, provisional application No. 62/435,783, filed on Dec. 18, 2016, provisional application No. 62/441,458, filed on Jan. 2, 2017, provisional application No. 62/319,341, filed on Apr. 7, 2016, provisional application No. 62/337,416, filed on May 17, 2016, provisional application No. 62/371,874, filed on Aug. 8, 2016, provisional application No. 62/401,214, filed on Sep. 29, 2016, provisional application No. 62/401,635, filed on Sep. 29, 2016, provisional application No. 62/426,625, filed on Nov. 28, 2016, provisional application No. 62/427,856, filed on Nov. 30, 2016, provisional application No. 62/435,783, filed on Dec. 18, 2016, provisional application No. 62/441,458, filed on Jan. 2, 2017.

(51) Int. Cl.
*H01M 10/0567* (2010.01)
*H01M 10/0562* (2010.01)

(52) U.S. Cl.
CPC .............. *H01M 10/0567* (2013.01); *H01M 2300/0091* (2013.01); *H01M 2300/0094* (2013.01); *Y02E 60/10* (2013.01)

(56) References Cited

U.S. PATENT DOCUMENTS

| | | |
|---|---|---|
| 6,080,511 A * | 6/2000 | Kejha .............. H01M 10/0525 429/300 |
| 6,492,061 B1 | 12/2002 | Gauthier et al. |
| 6,541,156 B1 | 4/2003 | Fuse et al. |
| 6,558,438 B1 | 5/2003 | Satoh |
| 6,599,662 B1 | 7/2003 | Chiang et al. |
| 7,192,673 B1 | 3/2007 | Ikeda et al. |
| 7,656,120 B2 | 2/2010 | Neu et al. |
| 7,906,238 B2 | 3/2011 | Le |
| 7,956,576 B2 | 6/2011 | Neu et al. |
| 8,021,791 B1 | 9/2011 | Plichta et al. |
| 8,945,774 B2 | 2/2015 | Coowar et al. |
| 8,951,673 B2 | 2/2015 | Wessells et al. |
| 9,406,927 B1 | 8/2016 | Burshtain et al. |
| 9,472,804 B2 | 10/2016 | Burshtain et al. |
| 9,583,761 B2 | 2/2017 | Burshtain et al. |
| 9,728,776 B2 | 8/2017 | Burshtain et al. |
| 9,871,247 B2 | 1/2018 | Burshtain et al. |
| 10,096,859 B2 | 10/2018 | Burshtain et al. |
| 10,110,036 B2 | 10/2018 | Aronov |
| 10,199,677 B2 | 2/2019 | Drach et al. |
| 2001/0017531 A1 | 8/2001 | Sakakibara et al. |
| 2002/0122980 A1 | 9/2002 | Fleischer et al. |
| 2002/0146623 A1 | 10/2002 | Suzuki et al. |
| 2003/0039889 A1 | 2/2003 | Park et al. |
| 2004/0033360 A1 | 2/2004 | Armand et al. |
| 2004/0219428 A1 | 11/2004 | Nagayama |
| 2005/0019659 A1 | 1/2005 | Shiozaki et al. |
| 2005/0093512 A1 | 5/2005 | Mader et al. |
| 2007/0003837 A1 | 1/2007 | Nishimura et al. |
| 2007/0281216 A1 | 12/2007 | Petrat et al. |
| 2007/0284159 A1 | 12/2007 | Takami et al. |
| 2008/0093143 A1 | 4/2008 | Harrison |
| 2008/0248386 A1 | 10/2008 | Obrovac et al. |
| 2009/0111020 A1 | 4/2009 | Yamaguchi et al. |
| 2009/0179181 A1 | 7/2009 | Zhang et al. |
| 2009/0317637 A1 | 12/2009 | Luhrs et al. |
| 2010/0134065 A1 | 6/2010 | Iida |
| 2010/0134305 A1 | 6/2010 | Lu et al. |
| 2010/0159331 A1 | 6/2010 | Lee et al. |
| 2010/0190059 A1 | 7/2010 | Graetz et al. |
| 2011/0123870 A1 | 5/2011 | Oh et al. |
| 2011/0257001 A1 | 10/2011 | Negishi |
| 2011/0260689 A1 | 10/2011 | Kano |
| 2012/0045696 A1 | 2/2012 | Herle |
| 2012/0088155 A1 | 4/2012 | Yushin et al. |
| 2012/0164531 A1 | 6/2012 | Chen et al. |
| 2013/0040226 A1 | 2/2013 | Yamauchi et al. |
| 2013/0059174 A1 | 3/2013 | Zhamu |
| 2013/0071731 A1 | 3/2013 | Tokuda et al. |
| 2013/0224594 A1 | 8/2013 | Yushin et al. |
| 2013/0229153 A1 | 9/2013 | Sarkar et al. |
| 2013/0260285 A1 | 10/2013 | Yamauchi et al. |
| 2013/0266875 A1 | 10/2013 | Matsumoto et al. |
| 2013/0337314 A1 | 12/2013 | Essaki et al. |
| 2014/0004426 A1 | 1/2014 | Kerlau et al. |
| 2014/0113202 A1 | 4/2014 | Sun et al. |
| 2014/0127588 A1 * | 5/2014 | Kato .............. H01B 1/122 429/304 |
| 2014/0295267 A1 | 10/2014 | Wang |
| 2015/0017515 A1 | 1/2015 | Jeon et al. |
| 2015/0046110 A1 | 2/2015 | Joe et al. |
| 2015/0221977 A1 | 8/2015 | Hallac et al. |
| 2015/0367747 A1 | 12/2015 | Decker et al. |
| 2016/0036045 A1 | 2/2016 | Burshtain et al. |
| 2016/0064773 A1 | 3/2016 | Choi et al. |
| 2016/0104882 A1 | 4/2016 | Yushin et al. |
| 2016/0149220 A1 | 5/2016 | Uhm et al. |
| 2016/0264124 A1 | 9/2016 | Hotta |
| 2016/0372753 A1 | 12/2016 | Fukasawa et al. |
| 2017/0012279 A1 | 1/2017 | Burshtain et al. |
| 2017/0207451 A1 | 7/2017 | Burshtain et al. |
| 2017/0288232 A1 * | 10/2017 | Herle .............. H01M 4/139 |
| 2017/0288271 A1 | 10/2017 | Le |
| 2017/0294643 A1 | 10/2017 | Burshtain et al. |
| 2017/0294644 A1 | 10/2017 | Burshtain et al. |
| 2017/0294648 A1 | 10/2017 | Burshtain et al. |
| 2017/0294649 A1 | 10/2017 | Burshtain et al. |
| 2017/0294680 A1 | 10/2017 | Burshtain et al. |
| 2017/0294687 A1 | 10/2017 | Burshtain et al. |
| 2017/0373513 A1 | 12/2017 | Aronov et al. |
| 2018/0050602 A1 | 2/2018 | Aronov |

(56) References Cited

U.S. PATENT DOCUMENTS

| | | |
|---|---|---|
| 2018/0212236 A1 | 7/2018 | Jacob et al. |
| 2018/0212239 A1 | 7/2018 | Jacob et al. |
| 2018/0212240 A1 | 7/2018 | Jacob et al. |
| 2018/0212439 A1 | 7/2018 | Aronov |
| 2018/0301757 A1 | 10/2018 | Burshtain et al. |
| 2018/0315990 A1 | 11/2018 | Paz et al. |

FOREIGN PATENT DOCUMENTS

| | | |
|---|---|---|
| CN | 101734675 | 6/2010 |
| CN | 104577081 | 4/2015 |
| EP | 1999818 | 12/2008 |
| EP | 2889097 | 7/2015 |
| JP | 2002-056891 | 2/2002 |
| JP | 2006-216276 | 8/2006 |
| JP | 2007-323837 | 12/2007 |
| JP | 2008-053092 | 3/2008 |
| JP | 2012/131674 | 7/2012 |
| JP | 2014-002834 | 1/2014 |
| KR | 2012-121265 | 10/2012 |
| KR | 2015-0015070 | 2/2015 |
| TW | 200616268 | 5/2006 |
| WO | WO 2013/040356 | 3/2013 |
| WO | WO 2014068036 | 5/2014 |
| WO | WO 2015/145521 | 10/2015 |
| WO | WO 2016/031082 | 3/2016 |
| WO | WO 2018/109774 | 6/2018 |

OTHER PUBLICATIONS

Chaudhuri el al. "Core/shell nanoparticles: classes, properties, synthesis mechanisms, characterization, and applications" Chemical Reviews, vol. 112, No. 4, pp. 2373-2433, 2012.

Wu et al. "Hydrogen Storage in Pillared Li-Dispersed Boron Carbide Nanotubes", J. Phys. Chem. C, 2008, vol. 112, No. 22, pp. 8458-8463.

Secrist "Compound Formation in the Systems Lithium-Carbon and Lithium-Boron", Journal of the American Ceramic Society, Oct. 1967, vol. 50, No. 10, pp. 520-523.

Suzuki et al. "Silicon nitride thin film electrode for lithium-ion batteries", Journal of Power Sources, 2013, vol. 231, pp. 186-189.

Konno et al. "Application of Si—C—O glass-like compounds as negative electrode materials for lithium hybrid capacitors", Journal of Power Sources, 2009, vol. 191, No. 2, pp. 623-627.

Hu et al. "Silicon/graphene based nanocomposite anode: large-scale production and stable high capacity for lithium ion batteries", Journal of Materials Chemistry A, 2014, vol. 2, No. 24, pp. 9118-9125.

Cui et al. "Carbon-Silicon Core-Shell Nanowires as High Capacity Electrode for Lithium Ion Batteries", Nano Letters, May 8, 2009. vol. 9, No. 9, pp. 3370-3374.

Kennedy et al. "High-Performance Germanium Nanowire-Based Lithium-Ion Battery Anodes Extending over 1000 Cycles Through in Situ Formation of a Continuous Porous Network", Nano Letters, 2014, vol. 14, pp. 716-723.

Hwang el al. "Mesoporous Ge/GeO2/Carbon Lithium-Ion Battery Anodes with High Capacity and High Reversibility", ACS Nano, Apr. 13, 2015, vol. 9, No. 5, pp. 5299-5309.

Balomenos et al. "Exergy Analysis of Metal Oxide Carbothemic Reduction under Vacuum—Sustainability prospects", International Journal of Thermodynamics. Jun. 4, 2012, vol. 15, No. 3, pp. 141-148.

Barton et al. "The Reduction of Germanium Dioxide With Graphite at High Temperatures", Journal of the Less-Common Metals, 1970, vol. 22, pp. 11-17.

Nitta et al. "High-Capacity Anode Materials for Lithium-Ion Batteries: Choice of Elements and Structures for Active Particles", Particle Systems Characterization, 2014, vol. 31, pp. 317-336.

Chung et al. "Electronically conductive phospho-olivines as lithium storage electrodes", nature materials, Oct. 22, 2002, vol. 1, pp. 123-128.

Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.

Kyotani et al. "Remarkable performance improvement of inexpensive ball-milled Si nanoparticles by carbon-coating for Li-ion batteries", Journal of Power Sources, Jul. 1, 2016, vol. 319, pp. 99-103.

Son et al. "Silicon carbide-free graphene growth on silicon for lithium-ion battery with high volumetric energy density", Nature Communications, Jun. 25, 2015, vol. 6, No. 7393, pp. 1-8.

Tow et al. "A Study of Highly Oriented Pyrolytic Graphite as a Model for the Graphite Anode in Li-Ion Batteries", Journal of the Electrochemical Society, 1999, vol. 146, No. 3, pp. 824-832.

Qi et al. "Threefold Increase in the Young's Modulus of Graphite Negative Electrode during Lithium Intercalation", Journal of the Electrochemical Society, 2010, vol. 157, No. 5, pp. A558-A566.

Qi et al. "Lithium Concentration Dependent Elastic Properties of Battery Electrode Materials from First Principles Calculations", Journal of the Electrochemical Society, 2014, vol. 161, No. 11, pp. F3010-F3018.

Wen et al. "Thermodynamic and Mass Transport Properties of "LiAl"", Solid-Stale Science and Technology, Dec. 1979, vol. 126, No. 12, pp. 2258-2266.

Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.

Sun et al. "Silicon/Wolfram Carbide@Graphene composite: enhancing conductivity and structure stability in amorphous-silicon for high lithium storage performance", Electrochimica Acta. Jun. 25, 2016, vol. 191, pp. 462-472.

Cho et al. "Zero-Strain Intercalation Cathode for Rechargeable Li-Ion Cell", Angewandte Chemie, 2001, vol. 40, No. 18, pp. 3367-3369.

Ngo et al. "Mass-scalable synthesis of 3D porous germanium-carbon composite particles as an ultra-high rate anode for lithium ion batteries", Energy & Environmental Science, 2015, vol. 8, pp. 3577-3588.

Billaud et al. "Synthesis and electrical resistivity of lithium-pyrographite intercalation compounds (stages I, II and III)", Materials Research Bulletin, Jul. 1979, vol. 14, No. 7, pp. 857-864.

Guriparti et al. "Review on recent progress of nanostructured anode materials for Li-ion batteries", Journal of Power Sources, 2014, vol. 257, pp. 421-443.

Scott et al. "Ultrathin Coatings on Nano-LiCoO2 for Li-Ion Vehicular Applications", Nano Letters, 2011, vol. 11, pp. 414-418.

Chen et al. "Conductive Rigid Skeleton Supported Silicon as High-Performance Li-Ion Battery Anodes", Nano Letters, 2012, vol. 12, pp. 4124-4130.

Kim et al. "Electrochemical properties of carbon-coated Si/B composite anode for lithium ion batteries", Journal of Power Sources, 2009, vol. 189, pp. 108-113.

Wang el al. "Boron-doped carbon nanotube-supported Pt nanoparticles with improved CO tolerance for methanol electro-oxidation", Phys. Chem. Chem. Phys., 2012, vol. 14, pp. 13910-13913.

Wang el al. "The dimensionality of Sn anodes in Li-ion batteries", materialsloday, Dec. 2012, vol. 15, No. 12, pp. 544-552.

Bhandavat el al. "Improved Electrochemical Capacity of Precursor-Derived Si(B)CN-Carbon Nanotube Composite as Li-Ion Battery Anode", ACS Applied Materials & Interfaces, Oct. 2, 2012, vol. 4, pp. 5092-5097.

Bhandavat el al. "Synthesis, Characterization, and High Temperature Stability of Si(B) CN-Coated Carbon Nanotubes Using a Boron-Modified Poly(ureamethylvinyl)Silazane Chemistry", Journal of the American Ceramic Society, 2012, vol. 95, No. 5, pp. 1536-1543.

Nowotny et al. "Investigations in the three systems: Molybdenum-Silicon-boron, tungsten-Silicon-boron and in which System: VS12—TaSi2", MB. Chem., 1956, vol. 88, No. 2, pp. 179-182.

Kasavajjula et al. "Nano- and bulk-silicon-based insertion anodes for lithium-ion secondary cells", Journal of Power Sources, 2007, Vo. 163, pp. 1003-1039.

(56) References Cited

OTHER PUBLICATIONS

Yom et al. "Improved electrochemical behavior of Tungsten Coated Silicon Monoxide-Carbon composite anode in lithium ion battery",Abstract #1041, The Electrochemical Society 224th ECS Meeting, Oct. 27-Nov. 1, 2013.
Liu el al. "A pomegranate-inspired nanoscale design for large-volume-change lithium battery anodes", Nature Nanotechnology, Mar. 2014, vol. 9, pp. 187-192.
Tao el al. "Hollow core-shell structured Si/C nanocomposites as high-performance anode materials for lithium-ion batteries", Nanoscale, 2014, vol. 6, pp. 3138-3142.
Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
Byeon "Multifunctional metal-polymer nanoagglomerates from singlepass aerosol self-assembly", Scientific Reports, Aug. 10, 2016, pp. 1-8.
Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-7.
Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, pp. 12366-12371.
Molino et al. "Hydrophobic conducting polymer films from post deposition thiol exposure", Synthetic Metals 162, 2012, pp. 1464-1470.
Jankovski et al. "New boron based salts for lithium-ion batteries using conjugated ligands", Chemistry Physical Chemical Physics, May 19, 2016, vol. 18, pp. 16274-16280.
Aurbach et al. "A short review of failure mechanisms of lithium metal and lithiated graphite anodes in liquid electrolyte solutions", Solid State Ionics, 2002, vol. 148, pp. 405-416.
He et al. "Effect of solid electrolyte interface (SEI) film on cyclic performance of Li4Ti5O12 anodes for Li ion batteries", Journal of Power Sources, 2013, vol. 239, pp. 269-276.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1.33Ti1.67O4 Spinel", Journal of the Electrochemical Society, 1999, vol. 146. No. 3, pp. 857-861.
Doughty et al. "A General Discussion of Li Ion Battery Safety", The Electrochemical Society Interface, 2012, pp. 37-44.
E. McRae and J.F. Mareche "Stage dependence of the electrical resistivity of graphite intercalation compounds" *Journal of Physics C: Solid State Physics*, vol. 18, No. 8 , Apr. 5, 1983, pp. 1627-1640, Lab. de Chimie du Solide Miner., Nancy Univ., Vandoeuvre, France.
Takatoshi Kasukabe et al. "Beads-Milling of Waste Si Sawdust into High-Performance Nanoflakes for Lithium-Ion Batteries" *Sci Rep.* 2017; 7: 42734. Published online Feb. 20, 2017.

Yongxin An et al. "Effects of VC-LiBOB binary additives on SEI formation in ionic liquid-organic composite electrolyte" RSC Advances, 2012, 2, Accepted Feb. 21, 2012, pp. 4097-4102.
Aaron M. Chockla "Tin-Seeded Silicon Nanowires for High Capacity Li-Ion Batteries" Department of Chemical Engineering, Texas Materials Institute, Center for Nano- and Molecular Science and Technology,The University of Texas at Austin, Austin, Texas 78712-1062, United States, pp. 3738-3745, Published: Sep. 11, 2012.
Yong-Mao Lin et al. "High performance silicon nanoparticle anode in fluoroethylene carbonate-based electrolyte for Li-ion batteriesw" Chem. Commun., 2012, 48, Accepted May 28, 2012, pp. 7268-7270.
*Rosa Martel Dancary Tsirinorneny* "Contribution to the Ultra-Fast Charging of Electric Vehicles: The Configurable Modular Multi-level Converter (CMMC)" Mots-clés de l'auteur: Ultra-fast; lithium-titanate; UFCEV; CMMC; Flex-EV. Mar. 4, 2016.
Xu et al. "Reversible Conversion of Conducting Polymer Films from Superhydrophobic to Superhydrophilic", Angewandte Chemie, 2005, vol. 44, pp. 6009-6012.
Aldrich (Sigma-Aldrich MSDS Lithium hexafluorophosphate {http://www.sigmaaldrich.com/MSDS/MSDS/DisplayMSDSPage.do?country=US&language=en&productNumber=450227&brand=ALDRICH} Printed Dec. 19, 2017).
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF} date Nov. 4, 2014).
M. Moreno et al. "Ionic Liquid Electrolytes for Safer Lithium Batteries" Journal of the Electrochemical Society, 164 (1) A6026-A6031 (2017), pp. 6026-6031.
Andrzej Lewandowski et al. "Ionic liquids as electrolytes for Li-ion batteries—An overview of electrochemical studies" Journal of Power Sources 194 (2009) pp. 601-609.
Marisa C. Buzzeo et al. "Non-Haloaluminate Room-Temperature Ionic Liquids in Electrochemistry—A Review" ChemPhysChem 2004, 5, pp. 1106-1120.
International Search Report and Written Opinion of PCT Application No. PCT/IL2017/050424, dated Jul. 13, 2017.
Office action of U.S. Appl. No. 15/414,655 dated Aug. 14, 2017.
Office action of U.S. Appl. No. 15/447,784 dated Jun. 22, 2017.
Office action of U.S. Appl. No. 15/447,889 dated Jul. 17, 2017.
Office action of U.S. Appl. No. 15/480,919 dated Jul. 5, 2017.
Office action of U.S. Appl. No. 15/414,655, dated May 9, 2017.
Office action of U.S. Appl. No. 15/287,292, dated Dec. 15, 2017.
Office action of U.S. Appl. No. 15/447,784, dated Dec. 28, 2017.
Office Action for U.S. Appl. No. 15/480,888, dated Oct. 1, 2018.
Office Action for U.S. Appl. No. 15/853,885, dated Feb. 23, 2018.
Office action of U.S. Appl. No. 15/480,888 dated Sep. 13, 2017.
Office action of U.S. Appl. No. 15/447,784 dated Oct. 19, 2017.
Office action of U.S. Appl. No. 15/582,066 dated Aug. 21, 2017.
Office Action for U.S. Appl. No. 15/783,586, dated Apr. 6, 2018.
European Search Report for Application No. EP17206661.5, dated Apr. 16, 2018.
Office Action for U.S. Appl. No. 15/447,889, dated May 24, 2018.
Office Action for U.S. Appl. No. 15/480,904, dated Oct. 29, 2018.
Office Action for U.S. Appl. No. 15/480,911, dated Nov. 8, 2018.
Office Action for U.S. Appl. No. 15/480,922, dated Nov. 8, 2018.
Office Action for U.S. Appl. No. 15/844,689, dated Jan. 31, 2018.
Office Action for U.S. Appl. No. 15/844,689, dated Apr. 16, 2018.
Office Action for U.S. Appl. No. 15/844,689, dated May 23, 2018.
Notice of Allowance for U.S. Appl. No. 15/844,689, dated Sep. 4, 2018.
Office Action for U.S. Appl. No. 16/254,644, dated Mar. 1, 2019.
Notice of Allowance for U.S. Appl. No. 16/258,728, dated Mar. 6, 2019.
Office Action for U.S. Appl. No. 15/853,885, dated May 1, 2019.
U.S. Appl. No. 16/243,190, filed Jan. 9, 2019, Kuks et al.

\* cited by examiner

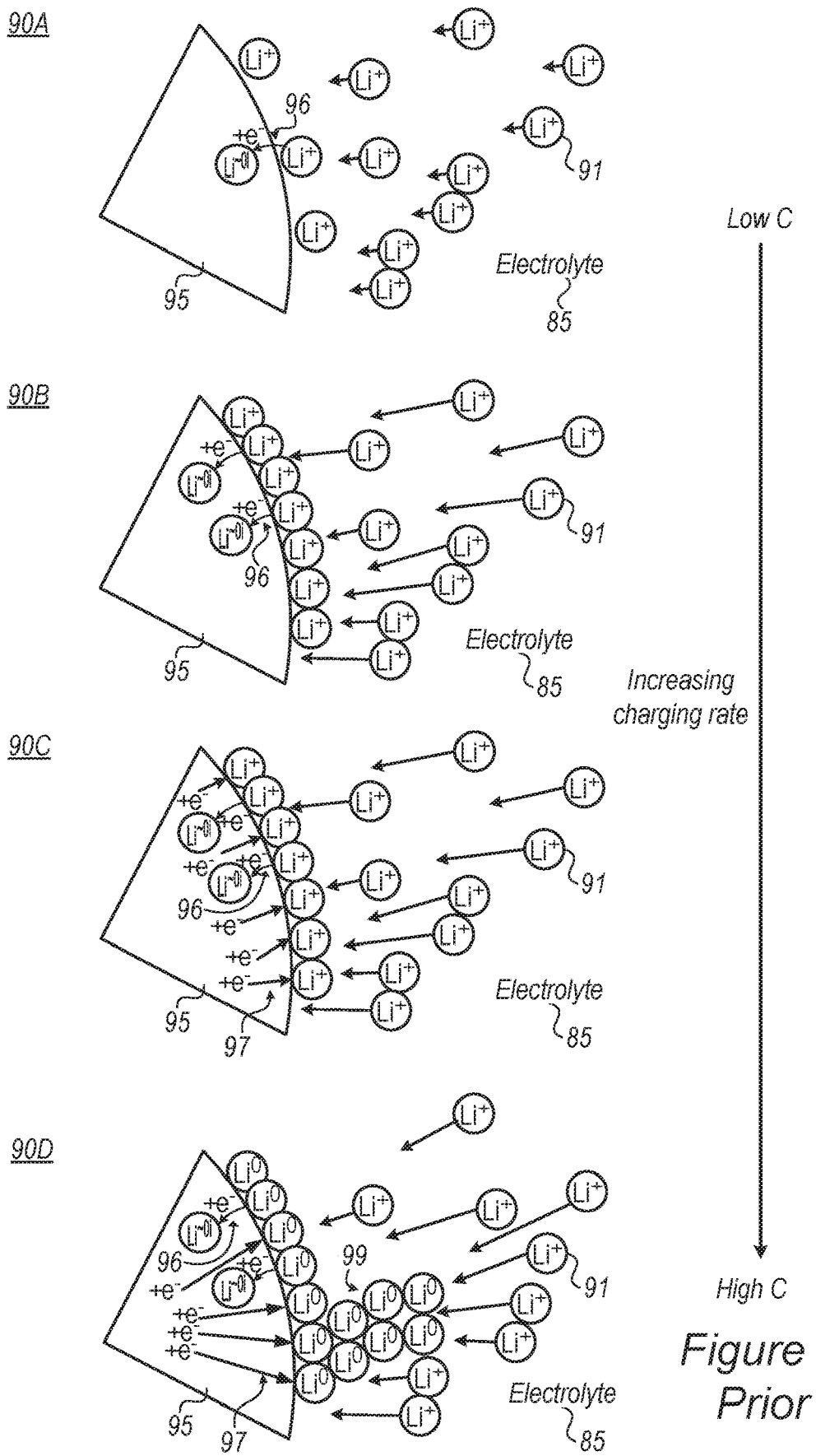
Figure 1A –
Prior art

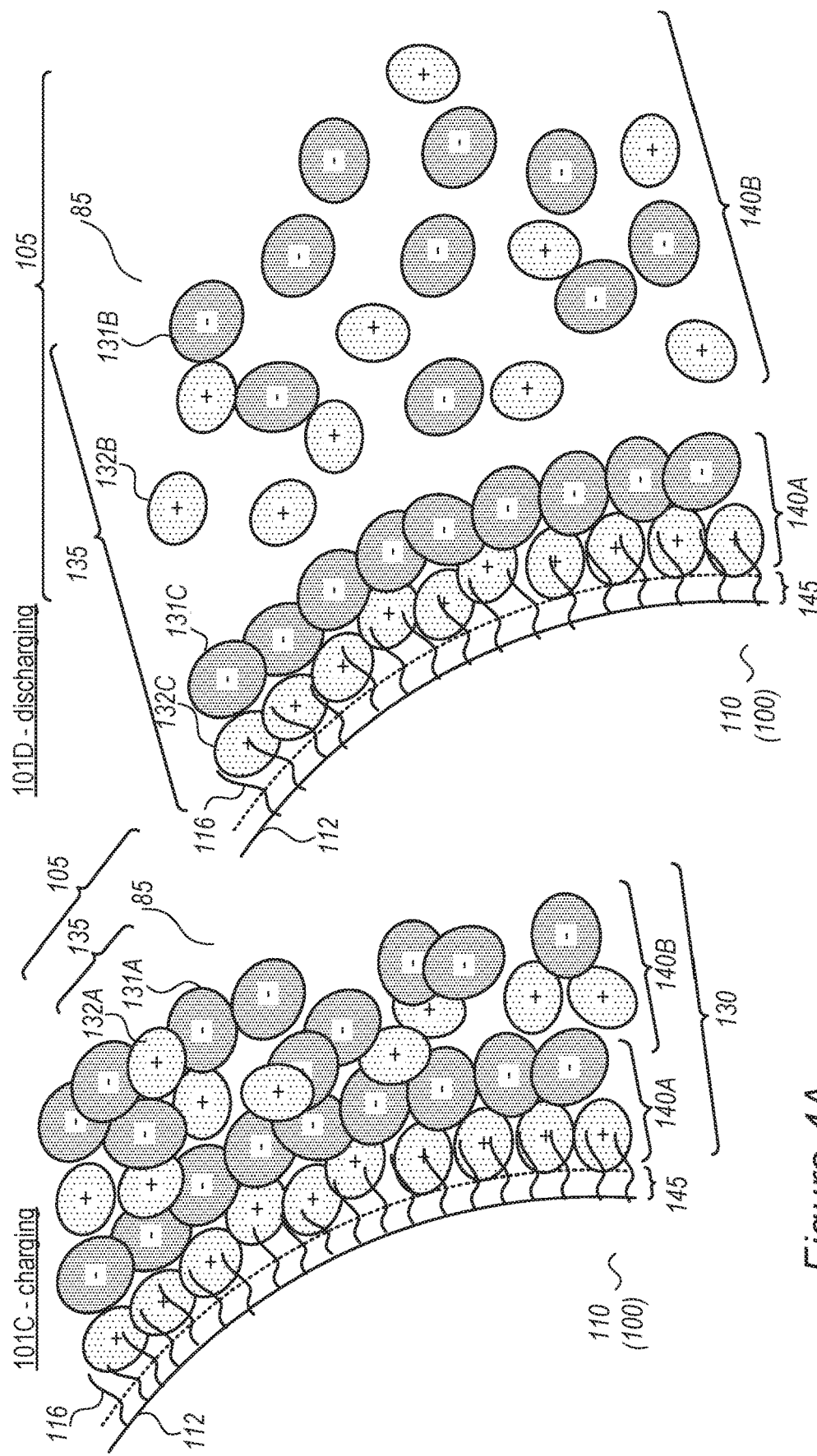

lithium 4-methylbenzenesulfonate
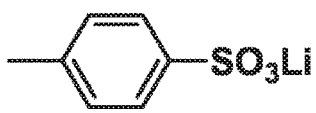

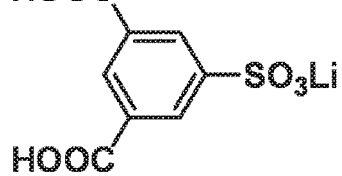
lithium 3,5-dicarboxybenzenesulfonate lithium sulfate     Lithium phosphate / lithium phosphate monobasic

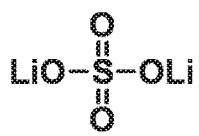 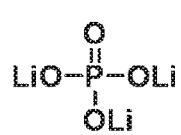 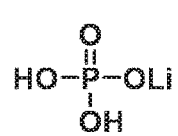

lithium 4-dodecylbenzenesulfonate     lithium propane-1-sulfonate

 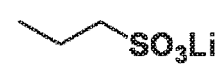

lithium 1,1,2,2,3,3,4,4,5,5,6,6,7,7,8,8,8-heptadecafluorooctane-1-sulfonate $CF_3CF_2CF_2CF_2CF_2CF_2CF_2CF_2SO_3Li$ lithium 2,6-dimethylbenzene-1,4-disulfonate

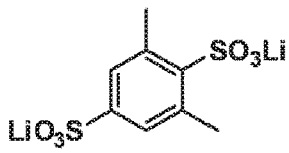

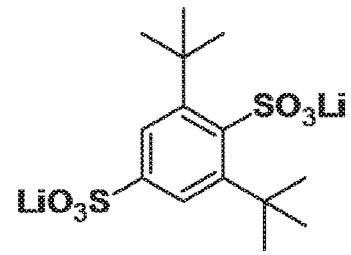

lithium 2,6-di-*tert*-butylbenzene-1,4-disulfonate 3,3'-((1,2-dithiane-4,5-diyl)bis(oxy))bis(*N*-hydroxypropanamide)

3,3'-((4-mercapto-1,2-phenylene)bis(oxy))bis(*N*-hydroxypropanamide)

Lithium aniline sulfonate
(The sulfonate can be p-; m-; o-)

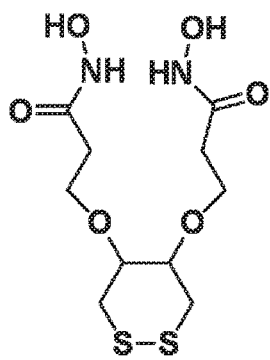 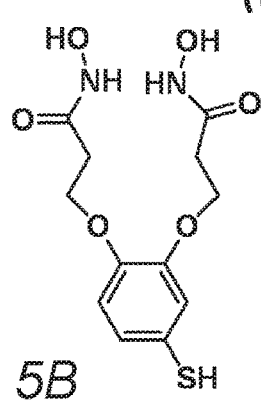 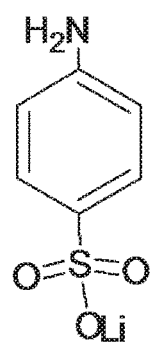 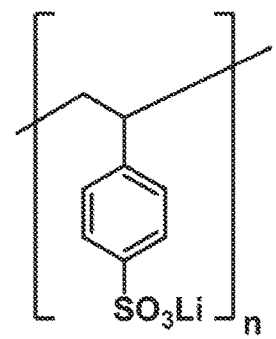

*Figure 5B*            Poly(lithium-4-styrenesulfonate)

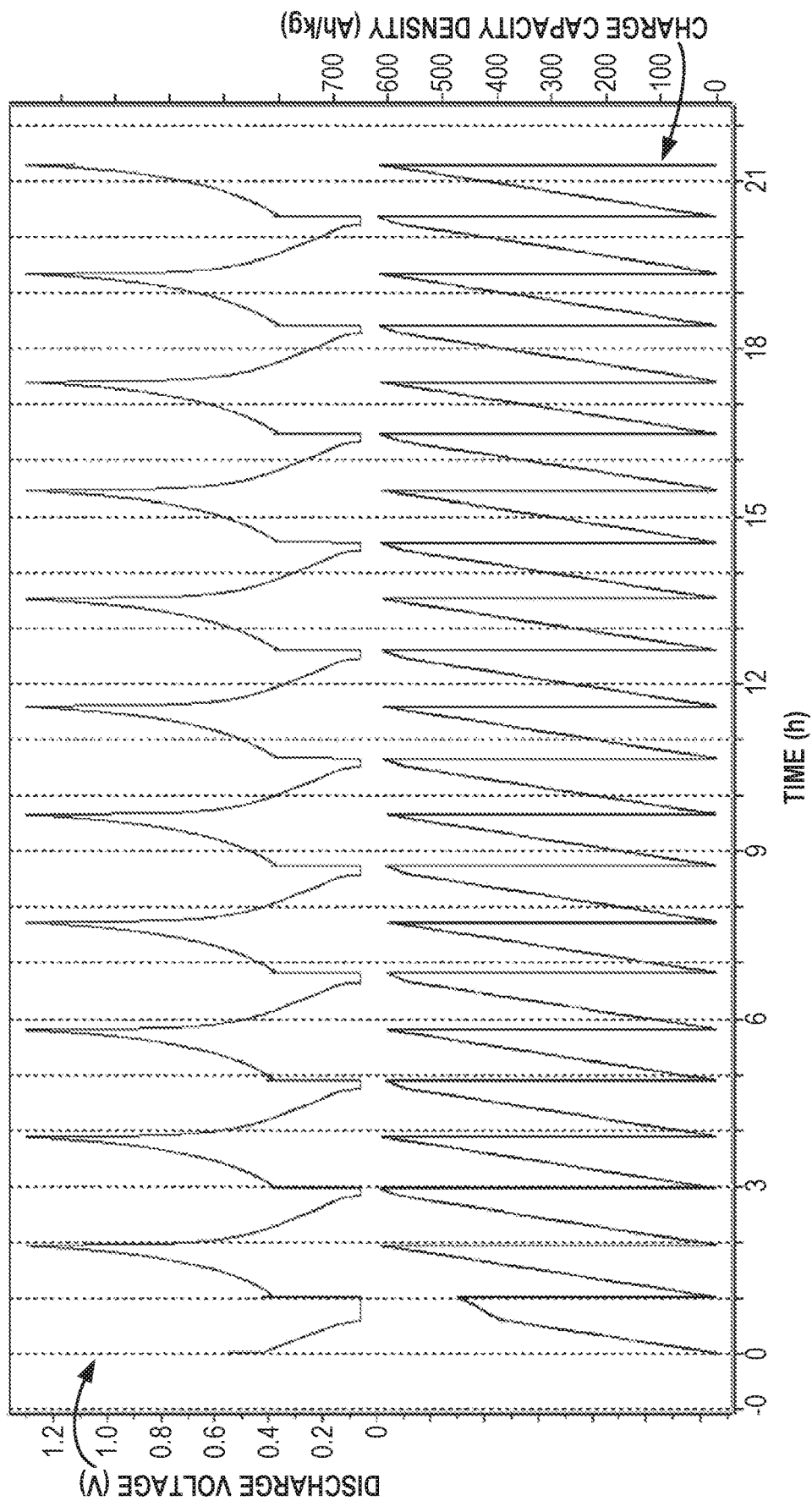
Figure 10B – Prior art

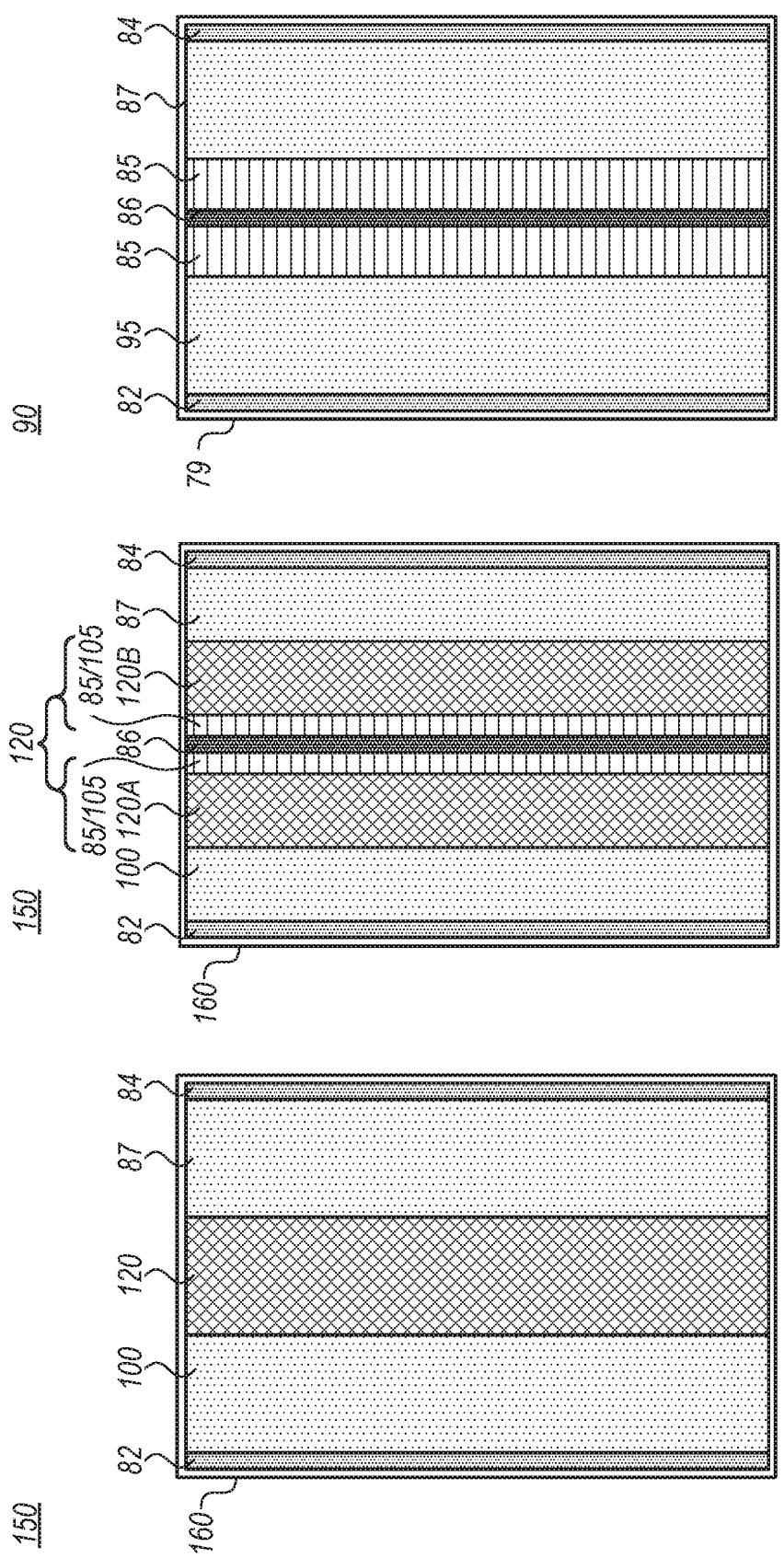

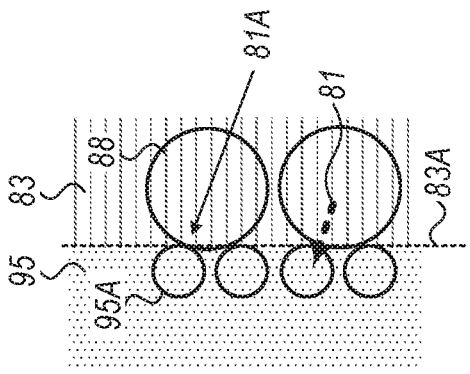
*Figure 14C-Prior art*
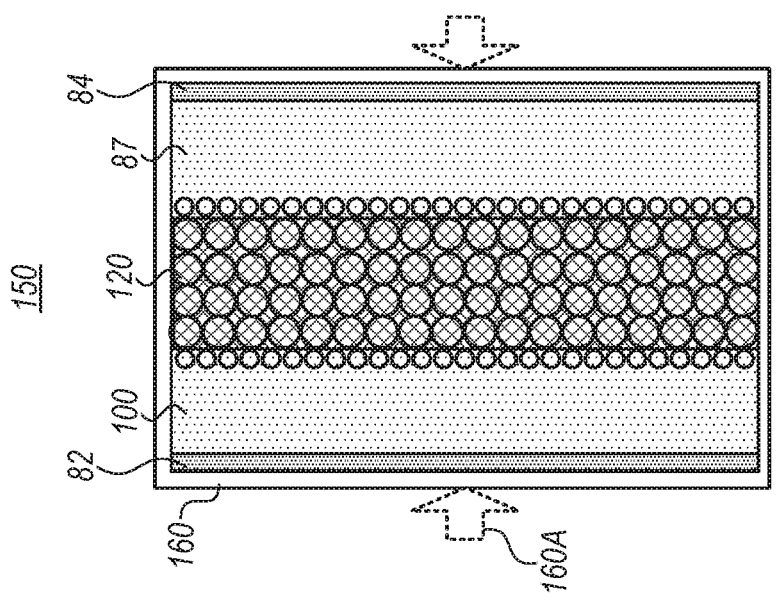
*Figure 14B*
*Figure 14A*

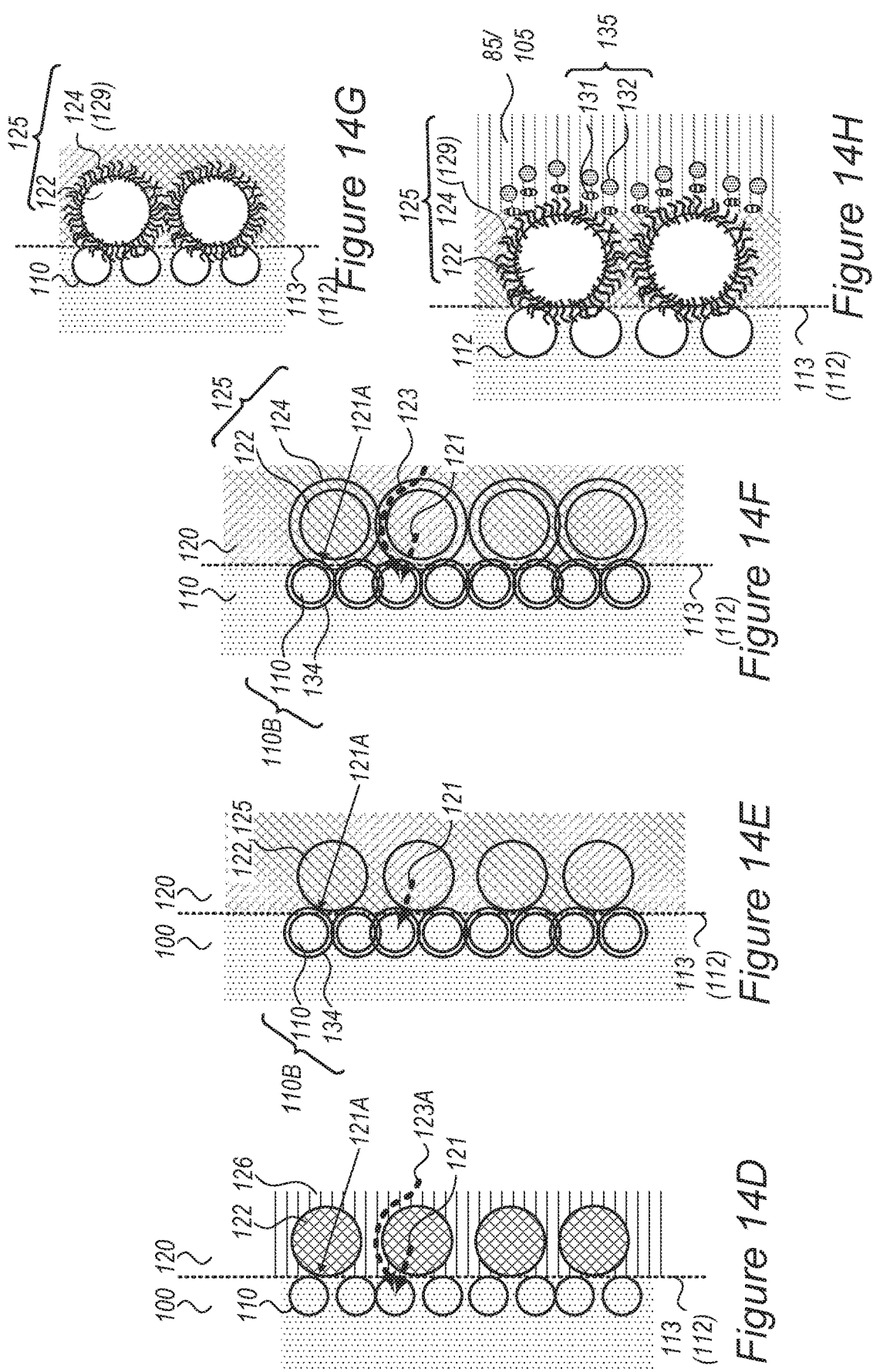

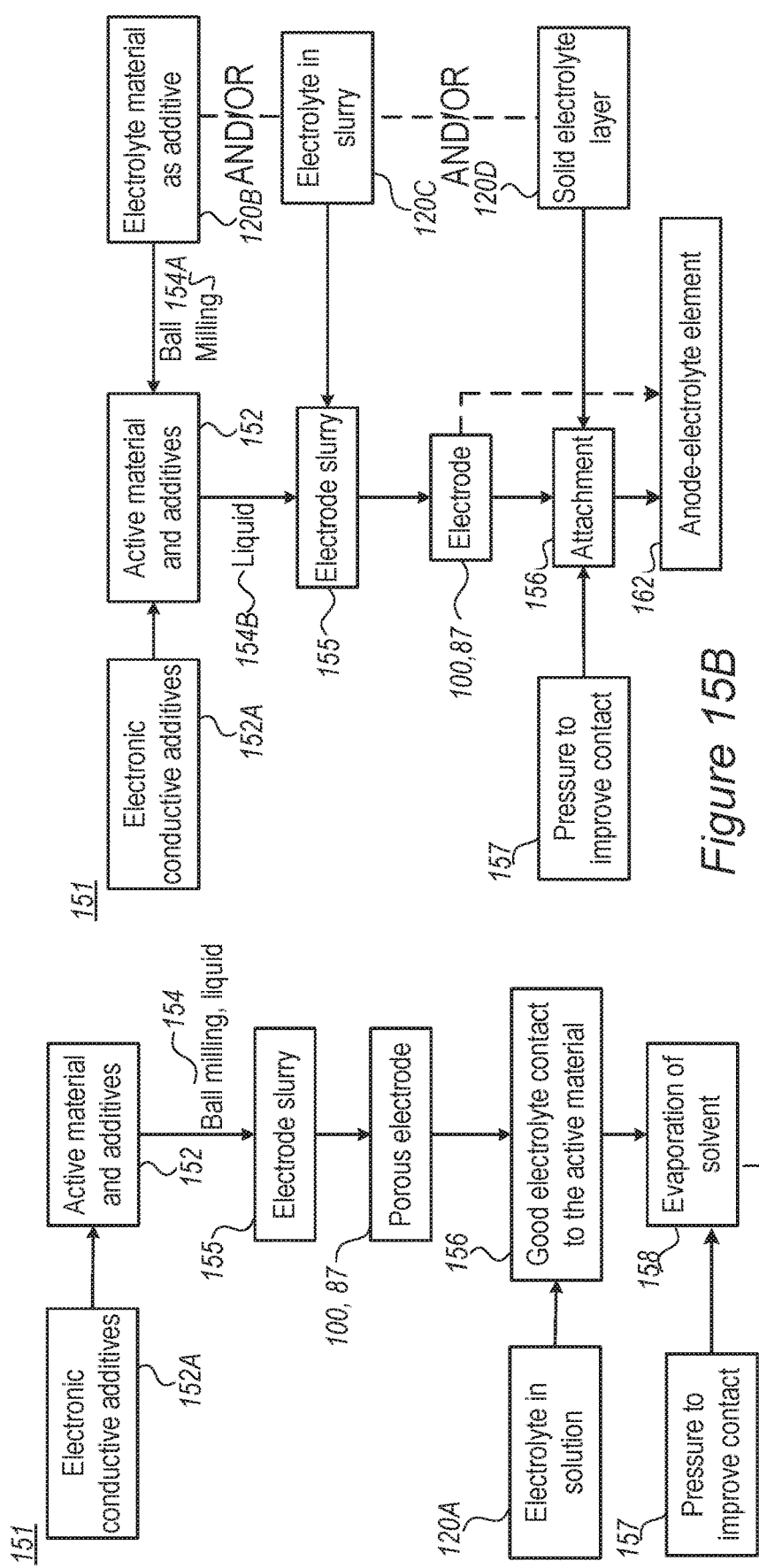
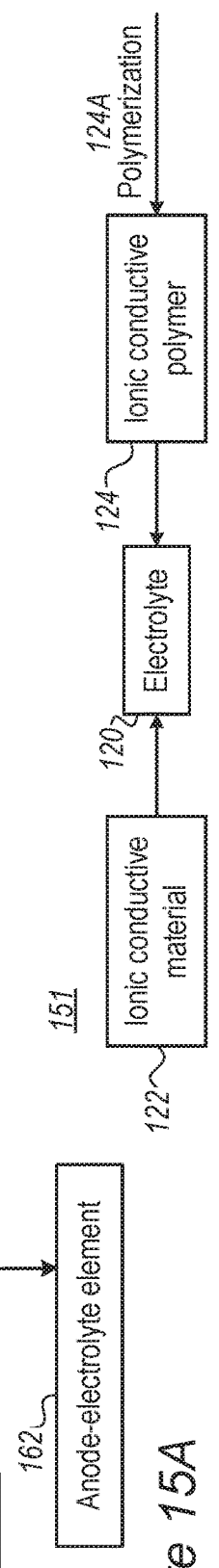
Figure 15A
Figure 15B
Figure 15C

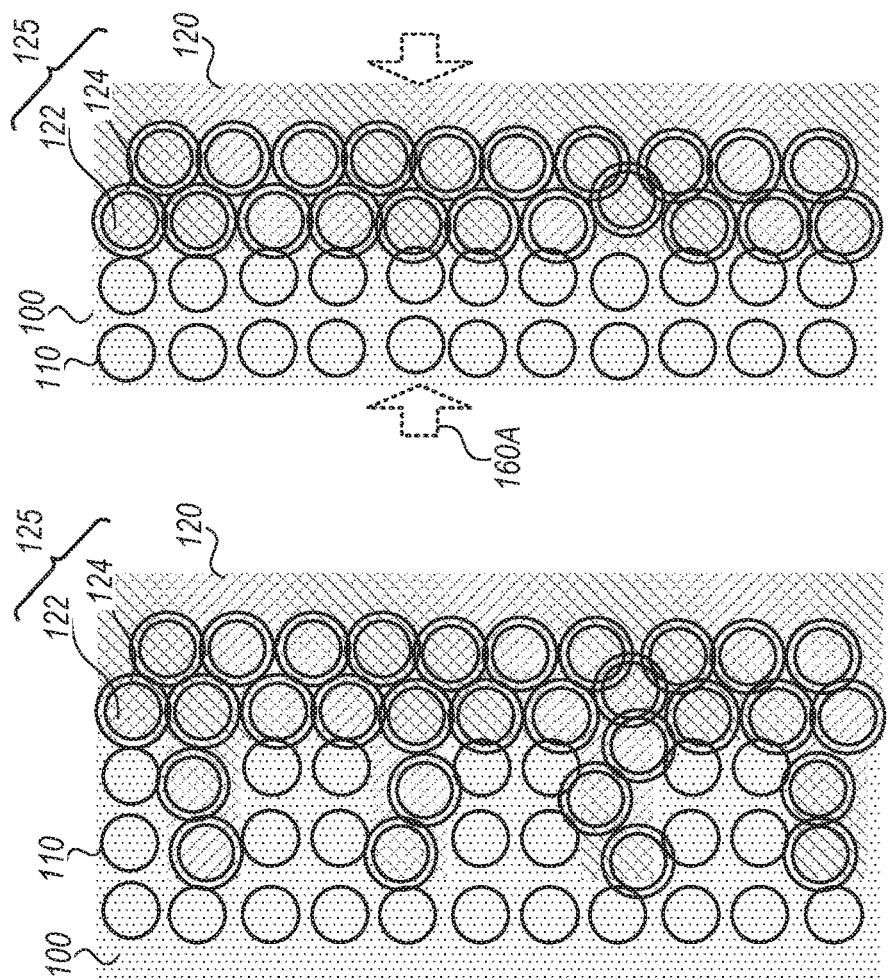
*Figure 15G*
*Figure 15F*
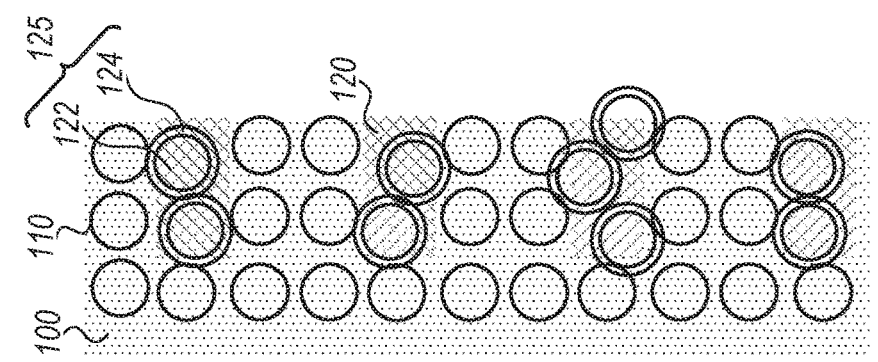
*Figure 15E*
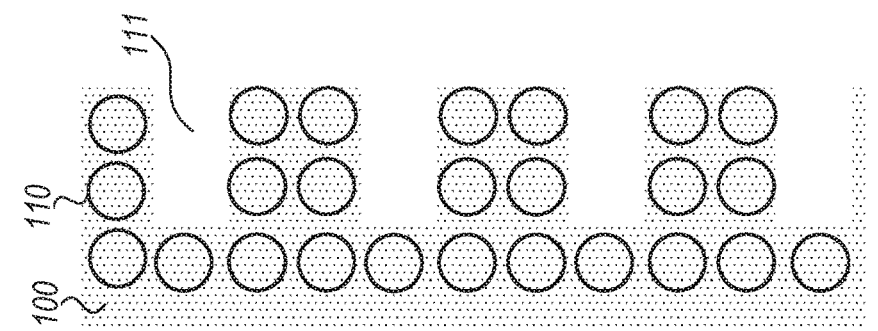
*Figure 15D*

SEMI-SOLID ELECTROLYTES WITH FLEXIBLE PARTICLE COATINGS

CROSS REFERENCE TO RELATED APPLICATIONS

This application is a continuation of PCT International Application No. PCT/IL2017/051358, filed on Dec. 18, 2017, which claims the benefit of U.S. Provisional Patent Application Nos. 62/435,783, filed on Dec. 18, 2016, 62/441,458, filed on Jan. 2, 2017, 62/482,450, filed on Apr. 6, 2017, 62/482,891, filed on Apr. 7, 2017 and 62/550,711, filed on Aug. 28, 2017, and is a continuation-in-part of U.S. patent application Ser. No. 15/447,784, filed on Mar. 2, 2017, and Ser. No. 15/447,889, filed on Mar. 2, 2017; said U.S. patent application Ser. Nos. 15/447,889 and 15/447,784 claim the benefit of U.S. Provisional Application Nos. 62/319,341, filed Apr. 7, 2016, 62/337,416, filed May 17, 2016, 62/371,874, filed Aug. 8, 2016, 62/401,214, filed Sep. 29, 2016, 62/401,635, filed Sep. 29, 2016, 62/421,290, filed Nov. 13, 2016, 62/426,625, filed Nov. 28, 2016, 62/427,856, filed Nov. 30, 2016, 62/435,783, filed Dec. 18, 2016 and 62/441,458, filed Jan. 2, 2017; this application is also a continuation-in-part of U.S. patent application Ser. No. 15/447,784, filed on Mar. 2, 2017, which claims the benefit of U.S. Provisional Application Nos. 62/319,341, filed Apr. 7, 2016, 62/337,416, filed May 17, 2016, 62/371,874, filed Aug. 8, 2016, 62/401,214, filed Sep. 29, 2016, 62/401,635, filed Sep. 29, 2016, 62/421,290, filed Nov. 13, 2016, 62/426,625, filed Nov. 28, 2016, 62/427,856, filed Nov. 30, 2016, 62/435,783, filed Dec. 18, 2016 and 62/441,458, filed Jan. 2, 2017; all of which are incorporated herein by reference in their entirety.

BACKGROUND OF THE INVENTION

1. Technical Field

The present invention relates to the field of lithium ion batteries, and more particularly, to electrolytes for lithium ion batteries.

2. Discussion of Related Art

With continued success in the portable electronic device market, Li-ion batteries (LIBs) are of increasing interest for applications in electric and hybrid vehicles, surgical tools, and oil and gas drilling, etc., due to their superior energy density and long cycle life. However, current LIBs employ conventional liquid electrolytes based on organic solvents, which poses a safety concern, especially at elevated temperatures. Specifically, the use of carbonate solvents such as ethylene carbonate (EC), dimethyl carbonate (DMC), or diethyl carbonate (DEC) restricts battery operation to less than 60° C. due to their volatile and highly flammable nature. Moreover, when these solvents are used with Li salts, such as lithium hexafluorophosphate ($LiPF_6$), a resistive film forms on the electrode surface affording poor cycle life. These side reactions become more dominating at higher temperatures as the rate of chemical reaction between the dissolved lithium salt and electrolyte solvent increases.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a lithium ion cell comprising an anode and an electrolyte comprising at most 20% vol of at least one ionic liquid additive, wherein the anode comprises a surface layer configured to bond at least a portion of the at least one ionic liquid additive.

One aspect of the present invention provides a pre-lithiation method comprising: mixing lithium powder with an ionic liquid, suspending the mixture in an electrolyte, and introducing the suspension into the cell.

One aspect of the present invention provides a composite electrolyte for lithium ion cells, the composite electrolyte comprising solid electrolyte particles coated by flexible ionic conductive material.

One aspect of the present invention provides a lithium ion cell comprising an electrolyte having at least one linear component and at least one cyclic carbonate component, wherein the at least one cyclic carbonate component comprises at least 80% of fluoroethylene carbonate (FEC) and/or vinylene carbonate (VC), and wherein the electrolyte comprises at least 20% vol of FEC and/or VC and further comprises at least one lithium salt.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 1A is a high-level schematic illustration of a metallization process in lithium ion batteries according to the prior art.

FIGS. 4A and 4B are high-level schematic illustrations of an immobilized/mobilized SEI (I/MSEI) during charging and discharging, according to some embodiments of the invention.

FIG. 5B is a high-level schematic illustration of non-limiting examples for bonding molecules, according to some embodiments of the invention.

FIGS. 10A and 10B are non-limiting examples which indicate reversible lithiation at the anode when using the ionic liquid additive according to some embodiments of the invention with respect to the prior art.

FIGS. 13A and 13B are high-level schematic illustrations of lithium ion cells, according to some embodiments of the invention. FIG. 13C is a high-level schematic illustration of prior art lithium ion cells.

FIGS. 14A and 14B are high-level schematic illustrations of the contact between an electrode and composite electrolyte, according to some embodiments of the invention. FIG. 14C is a high-level schematic illustration of prior art contact between an electrode and a solid electrolyte.

FIGS. 14D-14H are high-level schematic illustrations of interfaces between electrode active material and electrolyte particles, according to some embodiments of the invention.

FIGS. 15A-15C are a high-level schematic block diagrams of various production methods, according to some embodiments of the invention.

FIGS. 15D-15G are high-level schematic illustrations of interfaces between electrode active material and electrolyte particles, according to some embodiments of the invention.

DETAILED DESCRIPTION OF THE INVENTION

Figure 1B:
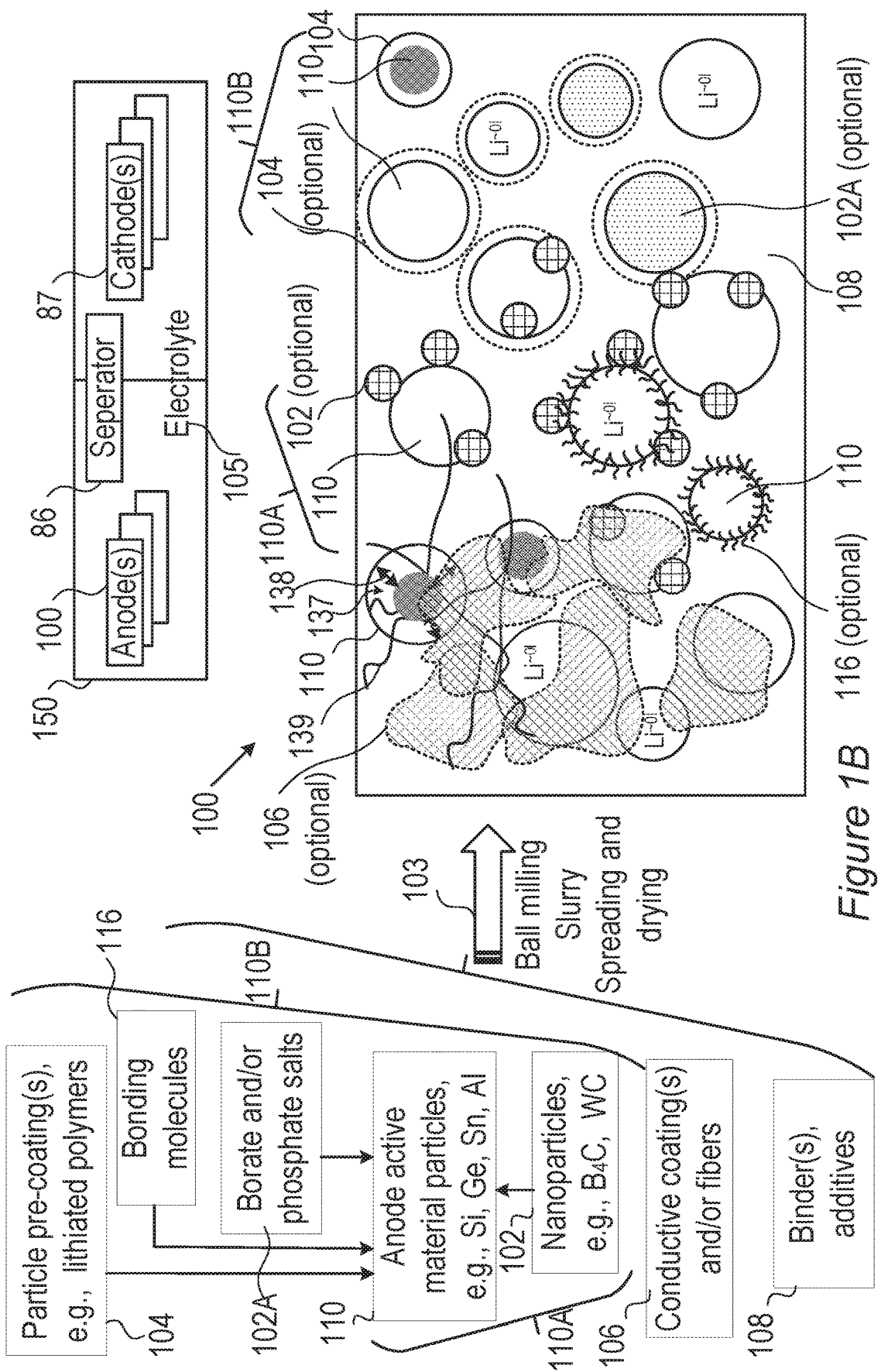
FIG. 1B is a high-level schematic illustration of various anode configurations, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

The following analysis of lithium metallization and dendrite growth in some prior art anodes was used to define a problem which is solved by embodiments of the invention. The present disclosure is however not limited by the disclosed analysis, and is in general not bound by theory.

FIG. 1A is a high-level schematic illustration of a metallization process in lithium ion batteries according to the prior art. Typical lithium ion batteries use graphite anodes 95 which receive lithium ions 91 (passing through a carbonate-based electrolyte 85) in an intercalation process between graphite layers. The maximal capacity of the graphite is limited to approximately one lithium ion for every ca. six carbon atoms and is influenced by the solid-electrolyte interface (SEI) formed between anode 95 and electrolyte 85, typically on the intercalation basal planes (e.g., layers in the graphite material between which the lithium ions intercalate). Such lithium ion batteries typically have low charging and discharging rates due to limiting charge transfer rates and limiting lithium ions diffusion rate into the graphite anode. As shown schematically in illustration 90A in FIG. 1A, under low charging rates, the intercalation rate is higher than the lithium ion accumulation rate, resulting in proper intercalation 96 of lithium ions Li$^+$ into graphite anode 95 as L$^{-01}$, denoting approximately neutral lithium atoms which receive electrons e$^-$ from the graphite and are intercalated in anode 95. The intercalation rate is limited by the Li$^+$ supply rate. As the charging rate increases (schematic illustrations 90B, 90C, 90D represent gradually increasing charging rate with respect to illustration 90A), the rate of incoming lithium ions increases, and lithium ions accumulate on the surface (of anode 95 or particles thereof, at the solid-electrolyte interface) as illustrated in 90B, with an accumulation rate that exceeds the intercalation rate of the lithium ions. As a result, reduction 97 of the lithium ions is carried out on the interface in addition to the intercalated lithium ions, as illustrated in 90C, which shows schematically the increasing flow of electrons to the interface without lithium ion intercalation in anode 95. Finally, as lithium ion accumulation and reduction at the interface increase (as illustrated in 90D), lithium metallization at the interface and dendrite growth 99 commence and damage the cell. Additional considerations include volume changes of the graphite electrode material, influences of anode additives, characteristics of the SEI and details of the charging and discharging cycles. Without being bound by theory, FIG. 1A illustrates schematically a probable occurrence on the anode surface during slow 90A and fast 90B-D charging, without the problematic catalytic reaction of the active material with the electrolyte (which complicates the schematically illustrated mechanism). While at low C rate the apparent diffusion to the active material is fast enough to compensate the migration of the lithium ions through the electrolyte—at high C rate charging, the migration through the electrolyte is faster than the apparent active material lithiation, which gives rise to metallization process at the interface. Moreover, without proper protective coating around the active material metalloid, the active material-Li entity is highly reactive toward the electrolyte, giving rise to catalytic reaction which decompose the electrolyte.

Electrolytes, anode material particles and methods are provided for improving performance and enhancing the safety of lithium ion batteries. Electrolytes may comprise ionic liquid(s) as additives which protect the anode material particles and possibly bind thereto; and/or may comprise a large portion of fluoroethylene carbonate (FEC) and/or vinylene carbonate (VC) as the cyclic carbonate component, and possibly ethyl acetate (EA) and/or ethyl methyl carbonate (EMC) as the linear component; and/or may comprise composite electrolytes having solid electrolyte particles coated by flexible ionic conductive material. Ionic liquid may be used to pre-lithiate in situ the anode material particles. Disclosed electrolytes improve lithium ion conductivity, prevent electrolyte decomposition and/or prevents lithium metallization on the surface of the anode.

Embodiments of the present invention provide efficient and economical methods and mechanisms for preventing lithium metallization in lithium ion batteries (LIBs) and thereby provide improvements and enhancing safety in this technological field. It is suggested to use ionic liquids as an additive to an organic, carbonate-based electrolyte 85 at low concentrations (e.g., up to 20% v/v) in order, e.g., to create a mobilized SEI (MSEI) zone during charging and discharging. It is noted that the MSEI may comprise a fluid layer of anions and/or cations adjacent to the surface of the anode material particles, which is neither affixed to the anode material particles nor necessarily stable upon discharging of the cell. The surface layer of anions and/or cations is not limited by referring to it herein as MSEI. These ionic liquids may be selected to be non-reactive or to have a very low reactivity toward metallic lithium. A surface layer on the anode material particles bonds (e.g., electrostatically and/or ionically) at least some of the ionic liquid additive (an additive comprising ionic liquid) to form an immobilized layer that provides further protection at the interface between the anode and the electrolyte, prevents metallization of lithium on the anode and decomposition of the electrolyte.

Electrolytes, anodes, lithium ion cells and methods are provided for preventing lithium metallization in lithium ion batteries to enhance their safety. Electrolytes comprise up to 20% ionic liquid additives which form a mobile solid electrolyte interface (mobile SEI or MSEI due to its functional operation in the cell, yet fundamentally different from prior art SEI as the MSEI it is not part of nor necessarily affixed to the anode material particles, is fluid, and may dissolve into the electrolyte upon discharging) during charging of the cell and prevent lithium metallization and electrolyte decomposition on the anode while maintaining the lithium ion mobility at a level which enables fast charging of the batteries. Anodes used with the present invention may be metalloid-based, for example the anodes may include silicon, germanium, tin and/or aluminum (as used herein, "metalloid-based") and/or lithium-titanate-based. The invention may also be applied for cells having graphite-based anodes and/or graphene-based anodes.

In certain embodiments, a surface layer on the anode material particles may be applied to bond (e.g., electrostatically and/or ionically) at least some of the ionic liquid additive (an additive comprising ionic liquid) to form an immobilized layer (I/MSEI) that may provide further protection at the interface between the anode and the electrolyte, may prevent metallization of lithium on the former and decomposition of the latter. It is emphasized that MSEI and/or I/MSEI may be created independently of each other, and possibly in addition to other types of SEI which may be formed in or at the surface of the anode material particles.

Various embodiments comprise combinations of any of: using ionic liquid additive(s) (additives comprising one or more ionic liquids) in the electrolyte; applying a surface layer of molecules configured to bond at least some of the anions and/or cations of the ionic liquid additive(s); pre-lithiating the electrodes with lithium powder suspended in the ionic liquid additive(s) or in different ionic liquid(s); using electrolytes with a FEC/VC-based cyclic carbonate component; and/or using a semi-solid electrolyte with particles coated by flexible ionic conductive material, at least as part of the electrolyte—any of which may be implemented as disclosed herein, and optionally combined with embodiments of any of the combinations listed above.

Advantageously, some embodiments of the invention provide alternative electrolytes with superior thermal and chemical stability, which expand the use of LIBs to a wider working temperature range without compromising the electrochemical performance. Moreover, some embodiments of the invention enable use of high energy metalloids and metals as anode active material, including C (graphite), as well as Si, Ge, Sn, Al, as disclosed e.g., in U.S. Pat. No. 9,472,804, filed on Nov. 12, 2015 and U.S. Pat. No. 9,406,927, filed on Feb. 4, 2016; and in U.S. application Ser. No. 14/813,499 filed on Jul. 30, 2015 which are incorporated herein by reference in their entirety. Advantageously, disclosed MSEI may prevent breaking and/or provide a healing mechanism for damage to fragile SEI layer(s) due to expansion and/or shrinkage of the anode. Moreover, disclosed embodiments reduce, to at least a partial extent during the cycle life of the LIB, decomposition of the electrolyte solvent at the interface with the metalloid, which may act as a catalytic surface due to lithium metal species at the interface such as lithium silicide (Li—Si).

FIG. 1B is a high-level schematic illustration of various anode configurations, according to some embodiments of the invention. FIG. 1B illustrates schematically, in a non-limiting manner, a surface of anode 100, which may comprise anode active material particles 110. Anode active material particles 110 may be of various types, at least some of which comprising particles of metalloids such as silicon, germanium and/or tin their alloys and/or mixtures, graphite, modified graphite and/or graphene particles, and/or possibly particles of aluminum, lead and/or zinc, as well as forms of lithium titanate (LTO)—as well as any combinations thereof. At least some of anode active material particles 110 may possibly comprise composite particles 110B, e.g., core-shell particles in various configurations. Anode active material particles 110 may comprise particles at different sizes (e.g., in the order of magnitude of 100 nm, and/or possibly in the order of magnitude of 10 nm or 1μ)—for receiving lithiated lithium during charging and releasing lithium ions during discharging. At least some of composite particles 110B may be based on anode active material particles 110 as their cores.

Anodes 100 may further comprise binder(s) and additive(s) 108 as well as optionally coatings 106 (e.g., conductive polymers, lithium polymers, conductive material such as carbon fibers and/or nanotubes etc.). Coatings 106 may be applied to patches or parts of the surface of anode 100, and/or coatings 104 which may be applied onto anode material particles 110, and/or coatings 134 which may be configured as shells with anode material particles 110 as cores, and/or conductive material 139 such as carbon fibers and/or nanotubes may be configured to interconnect anode material particles 110 and/or interconnect anode material particles 110 as cores of core-shell particles 110B. Active material particles 110 may be pre-coated by one or more coatings 106 (e.g., by any of carbon coating, conductive polymers, lithium polymers, etc.), have borate and/or phosphate salt(s) 102A bond to their surface (possibly forming e.g., $B_2O_3$, $P_2O_5$ etc.), bonding molecules 116 (illustrated schematically and disclosed in detail below) which may interact with electrolyte 105 (and/or ionic liquid additives thereto, see below) and/or various nanoparticles 102 (e.g., $B_4C$, WC, VC, TiN, possibly Sn and/or Si nanoparticles), forming modified anode active material particles 110A, which may be attached thereto in anode preparation processes 103 such as ball milling (see, e.g., U.S. Pat. No. 9,406,927, which is incorporated herein by reference in its entirety), slurry formation, spreading of the slurry and drying the spread slurry. For example, anode preparation processes 103 may comprise mixing additive(s) 108 such as e.g., binder(s) (e.g., polyvinylidene fluoride, PVDF, styrene butadiene rubber, SBR, or any other binder), plasticizer(s) and/or conductive filler(s) with a solvent such as water or organic solvent(s) (in which the anode materials have limited solubility) to make an anode slurry which is then dried, consolidated and is positioned in contact with a current collector (e.g., a metal, such as aluminum or copper). Details for some of these possible configurations are disclosed below.

Certain embodiments comprise anode material particles 110 comprising any of silicon active material, germanium active material and/or tin active material, possibly further comprising carbon material, boron and/or tungsten. As non-limiting examples, anode material particles 110 may comprise 5-50 weight % Si, 2-25 weight % B and/or 5-25 weight % W, and 0.01-15 weight % C (e.g., as carbon nanotubes, CNT); anode material particles 110 may comprise 5-80 weight % Ge, 2-20 weight % B and/or 5-20 weight % W, and 0.05-5 weight % C (e.g., as carbon nanotubes, CNT); anode material particles 110 may comprise 5-80 weight % Sn, 2-20 weight % B and/or 5-20 weight % W, and 0.5-5 weight % C (e.g., as carbon nanotubes, CNT); anode material particles 110 may comprise mixtures of Si, Ge and Sn, e.g., at weight ratios of any of at least 4:1 (Ge:Si), at least 4:1 (Sn:Si) or at least 4:1 (Sn+Ge):Si; anode material particles 110 may comprise aluminum and/or any of zinc, cadmium and/or lead, possibly with additions of borate and/or phosphate salt(s) as disclosed below.

Certain embodiments comprise anode material particles 110 comprising nanoparticles 102 attached thereto, such as any of $B_4C$, WC, VC and TiN, possibly having a particle size range of 10-50 nm and providing 5-25 weight % of modified anode material particles 110A. Nanoparticles 102 may be configured to form in modified anode material particles 110A compounds such as $Li_2B_4O_7$ (lithium tetra-borate salt, e.g., via $4Li+7MeO+2B_4C \rightarrow 2Li_2B_4O_7+C+7Me$, not balanced with respect to C and O, with Me denoting active material such as Si, Ge, Sn etc.) or equivalent compounds from e.g., WC, VC, TiN, which have higher affinity to oxygen than the anode active material.

Certain embodiments comprise anode material particles 110 comprising coatings(s) 104 of any of lithium polymers, conductive polymers and/or hydrophobic polymers, such as e.g., any of lithium polyphosphate ($Li_{(n)}PP$ or LiPP), lithium poly-acrylic acid ($Li_{(n)}PAA$ or LiPAA), lithium carboxyl methyl cellulose ($Li_{(n)}CMC$ or LiCMC), lithium alginate ($Li_{(n)}Alg$ or LiAlg) and combinations thereof, with (n) denoting multiple attached Li; polyaniline or substituted polyaniline, polypyrroles or substituted polypyrroles and so forth.

Any of anode material particles 110, 110A, 110B may be coated by thin films (e.g., 1-50 nm, or 2-10 nm thick) of carbon (e.g., amorphous carbon, graphite, graphene, etc.) and/or transition metal oxide(s) (e.g., $Al_2O_3$, $B_2O_3$, $TiO_2$, $ZrO_2$, MnO etc.)

In certain embodiments, borate and/or phosphate salt(s) 102A may comprise borate salts such as lithium bis(oxalato) borate (LiBOB, $LiB(C_2O_4)_2$), lithium difluoro(oxalato)borate (LiFOB, $LiBF_2(C_2O_4)$), lithium tetraborate ($LiB_4O_7$), lithium bis(malonato)borate (LiBMB), lithium bis(trifluoromethanesulfonylimide) (LiTFSI), or any other compound which may lead to formation of borate salts ($B_2O_3$) on anode active material particles 110, including in certain embodiments $B_4C$ nanoparticles 102.

In certain embodiments, borate and/or phosphate salt(s) 102A may comprise phosphate salts such as lithium phosphate ($LiPO_4$), lithium pyrophosphate ($LiP_2O_7$), lithium tripolyphosphate ($LiP_3O_{10}$) or any other compound which may lead to formation of phosphate salts ($P_2O_5$) on anode active material particles 110.

Certain embodiments comprise composite anode material particles 110B which may be configured as core shell particles (e.g., the shell being provided by any of coating(s) 104 and possible modifications presented above). Different configurations are illustrated schematically in different regions of the illustrated anode surface, yet embodiments may comprise any combinations of these configurations as well as any extent of anode surface with any of the disclosed configurations. Anode(s) 100 may then be integrated in cells 150 which may be part of lithium ion batteries, together with corresponding cathode(s) 87, electrolyte 105 and separator 86, as well as other battery components (e.g., current collectors, electrolyte additives—see below, battery pouch, contacts, and so forth).

In certain embodiments, anode 110 may comprise conductive fibers 139 which may extend throughout anode 100 (illustrated, in a non-limiting manner, only at a section of anode 100) interconnect cores 110 and interconnected among themselves. Electronic conductivity may be enhanced by any of the following: binder and additives 108, coatings 106, conductive fibers 139, nanoparticles 102 and pre-coatings 134, which may be in contact with electronic conductive material (e.g., fibers) 139.

Lithium ion cell 150 may comprise anode(s) 100 (in any of its configurations disclosed herein) made of anode material with composite anode material such as any of anode material particles 110, 110A, 110B, electrolyte 120 (see below) and at least cathode 87 delivering lithium ions during charging through cell separator 86 to anode 100. Lithium ions ($Li^+$) are lithiated (to $Li^{-01}$, indicating substantially non-charged lithium, in lithiation state, see e.g., FIGS. 2B and 2D below)) when penetrating the anode material, e.g., into anode active material cores 110 (possibly of core-shell particles 110B). Any of the configurations of composite anode material and core-shell particles 110B presented below may be used in anode 100, as particles 110B are illustrated in a generic, non-limiting way. In core-shell particle configurations 110B, the shell may be at least partly be provided by coating(s) 134, and may be configured to provide a gap 137 for anode active material 110 to expand 138 upon lithiation. In some embodiments, gap 137 may be implemented by an elastic or plastic filling material and/or by the flexibility of coating(s) 134 which may extend as anode active material cores 110 expands and thereby effective provide room for expansion 138, indicated in FIG. 1B schematically, in a non-limiting manner as gap 137. Examples for both types of gaps 137 are provided below, and may be combined, e.g., by providing small gap 137 and enabling further place for expansion by the coating flexibility.

Anode material particles 110, 110A, 110B, anodes 100 and cells 150 may be configured according to the disclosed principles to enable high charging and/or discharging rates (C-rate), ranging from 3-10 C-rate, 10-100 C-rate or even above 100C, e.g., 5C, 10C, 15C, 30C or more. It is noted that the term C-rate is a measure of charging and/or discharging of cell/battery capacity, e.g., with 1C denoting charging and/or discharging the cell in an hour, and XC (e.g., 5C, 10C, 50C etc.) denoting charging and/or discharging the cell in 1/X of an hour—with respect to a given capacity of the cell.

Examples for electrolyte 105 may comprise liquid electrolytes such as ethylene carbonate, diethyl carbonate, propylene carbonate, VC, FEC, EMC, DMC and combinations thereof and/or solid electrolytes such as polymeric electrolytes such as polyethylene oxide, fluorine-containing polymers and copolymers (e.g., polytetrafluoroethylene), and combinations thereof. Electrolyte 105 may comprise lithium electrolyte salt(s) such as $LiPF_6$, $LiBF_4$, lithium bis(oxalato) borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) 135 may be added to electrolyte 105 as disclosed below.

Electrolytes 120 disclosed below (e.g., in FIGS. 13A-16 and related description) may be configured to operate with any of the disclosed anode embodiments, and the electrolyte production process may possibly be incorporated in the anode production process as disclosed above.

In certain embodiments, cathode(s) 87 may comprise materials based on layered, spinel and/or olivine frameworks, and comprise various compositions, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) LFP formulations (based on $LiFePO_4$), lithium rich cathodes, and/or combinations thereof.

It is explicitly noted that in certain embodiments, cathodes and anodes may be interchanged as electrodes in the disclosed cells, and the use of the term anode is not limiting the scope of the invention. Any mention of the term anode may be replaced in some embodiments with the terms electrode and/or cathode, and corresponding cell elements may be provided in certain embodiments. For example, in cells 150 configured to provide both fast charging and fast discharging, one or both electrodes 100, 87 may be prepared according to embodiments of the disclosed invention.

Separator(s) 86 may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films thereof, woven or non-woven fabrics etc. may be used as separator(s) 86, as well as possibly composite materials including, e.g., alumina, zirconia, titania, magnesia, silica and calcium carbonate along with various polymer components as listed above.

FIGS. 2A-2D and 3A-3C schematically illustrate at least one electrolyte-buffering zone 130 (MSEI) in an electrolyte 105, according to some embodiments of the invention. Electrolyte-buffering zone(s) 130 may be formed by an ionic liquid additive 135 (an additive comprising ionic liquid ionic liquids comprise one or more salt(s) which are liquid below 100° C., or even at room temperature or at lower temperatures—sometimes called "fused salts") and is illustrated schematically as an accumulation of anions 131 and cations 132, which provides separation between organic electrolyte 85 (as main component of electrolyte 105) and anode 100 (illustrated e.g., with respect to anode material particle 110) and may be configured to further regulate lithium ion movement from electrolyte 105 to anode 100 (illustrated e.g., with respect to anode material particles 110). It is noted that shapes and sizes of anions 131 and cations 132 are used for illustration purposes, anions 131 and cations 132 may have various relative sizes and shapes, depending on the specific ionic liquid(s) which are selected as ionic liquid additive 135. For example, anions 131 and/or cations 132 may be relatively large, e.g., larger than lithium ions 91 and/or significantly larger than lithium ions 91 (e.g., larger than lithium ions by at least 10%, 25%, 50% or more, possibly by at least 100%, 200%, 500% or even more, in either volume or radius) to establish a gradient in physical and/or chemical characteristics in region 130 and possibly provide an interphase transition between electrolyte 105 and anode 100 (illustrated e.g., with respect to anode material particles 110) that enhances the stabilization of transition region and prevents lithium ion accumulation and/or metallization and dendrite growth. Anions 131 may be selected to provide negative electric charge in the region of lithium ions 91 moving towards anode 100 (illustrated e.g., with respect to anode material particles 110), which somewhat, yet not fully, reduces the positive charge of lithium ions 91 to δ+ (e.g., by physical proximity, such as through, e.g., electrostatic and/or ionic interactions, and not by a chemical bond). The relative sizes of anions 131 and cations 132 may vary—anions 131 and cations 132 may have a similar size or one of anions 131 and cations 132 may be larger than the other. Mixtures of different ionic liquid additives 135 may have different size relations between their anions 131 and cations 132.

In certain embodiments, electrolyte 105 may comprise ionic liquid additive 135 (e.g., at 20%, 10%, 5%, 2%, 1% v/v or any other volume part smaller than 20%), added to carbonate-based electrolyte 85, which is selected to at least partially provide anions 131 and/or cations 132 to build electrolyte-buffering zone(s) 130. For example, ionic liquid additive 135 may comprise acidic groups which are selected to be anionic in the environment of lithium ions 91. Anions 131 and/or cations 132 may be relatively large to form a barrier which reduces the approaching speed of lithium ions 91 and which locally increases the resistance of electrolyte-buffering zone(s) 130 to lithium ions 91 to prevent or attenuate accumulation of lithium ions 91 at the surface of anode 100 (illustrated e.g., with respect to anode material particles 110).

Ionic liquid additive 135 may be selected to be not reactive in the cell, not to be reactive with lithium metal (e.g., not decompose in the presence of lithium metal) and not to intercalate with active material 110 of anode 100. The ionic strength and lithium ion mobility may be selected to appropriate values and the ionic conductivity may be controlled in a better way than a single component electrolyte 85. Moreover, ionic liquid additive 135 may be selected to have large volume anions 131 and cations 132 (illustrated schematically in FIGS. 2A-C). Advantageously, using ionic liquid additive 135 in the cell overcomes a prior art need to balance the risk of lithium metallization (requiring low lithium accumulation concentration at the anode surface) with the ability to fast charge the battery over a large number of cycles (requiring high lithium conductivity and mobility).

Figure 2A:
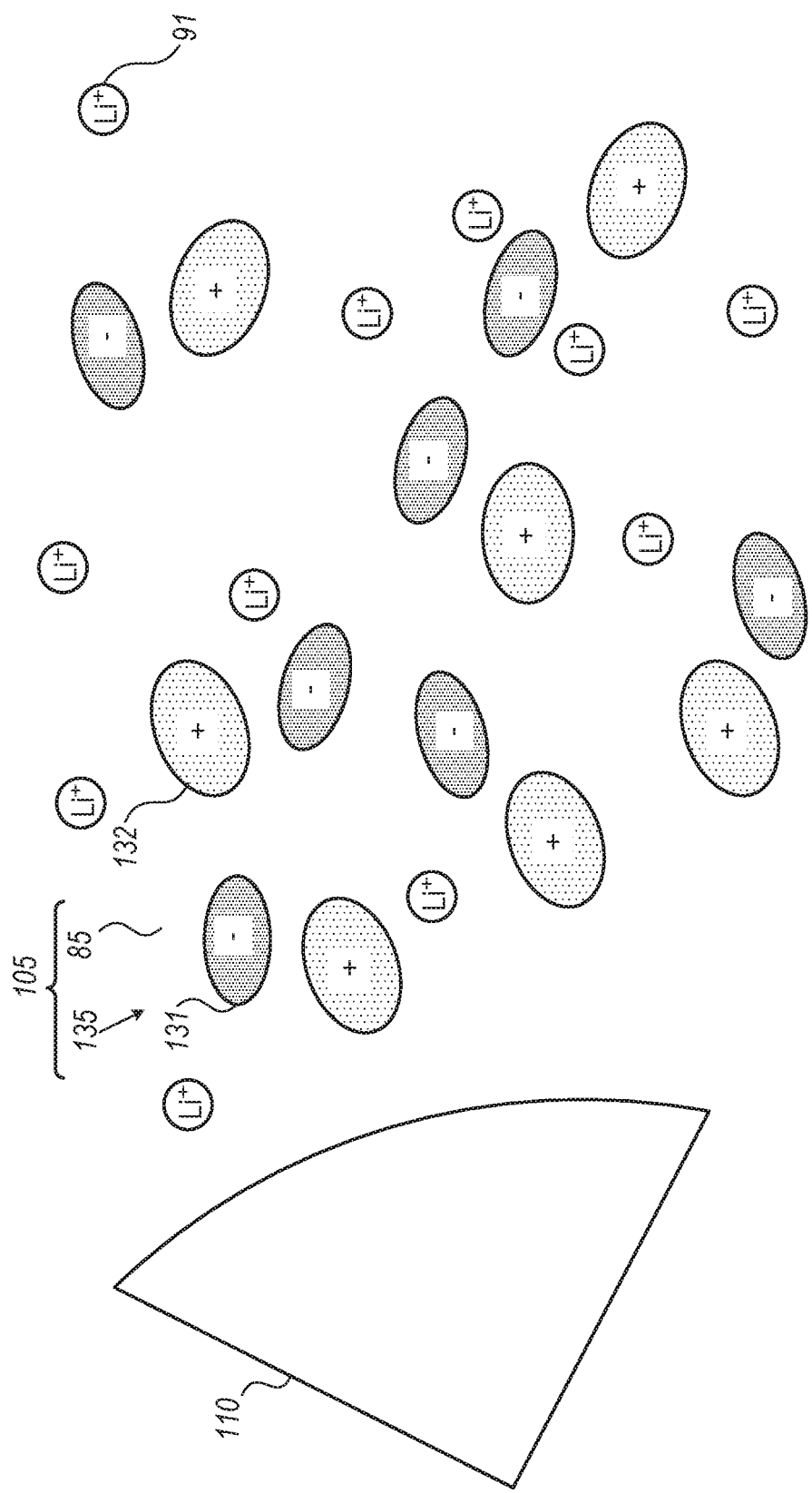
FIGS. 2A-2D and 3A-3C schematically illustrate at least one electrolyte-buffering zone (mobile solid-electrolyte interface, MSEI) in an electrolyte, according to some embodiments of the invention.
Figure 2C:
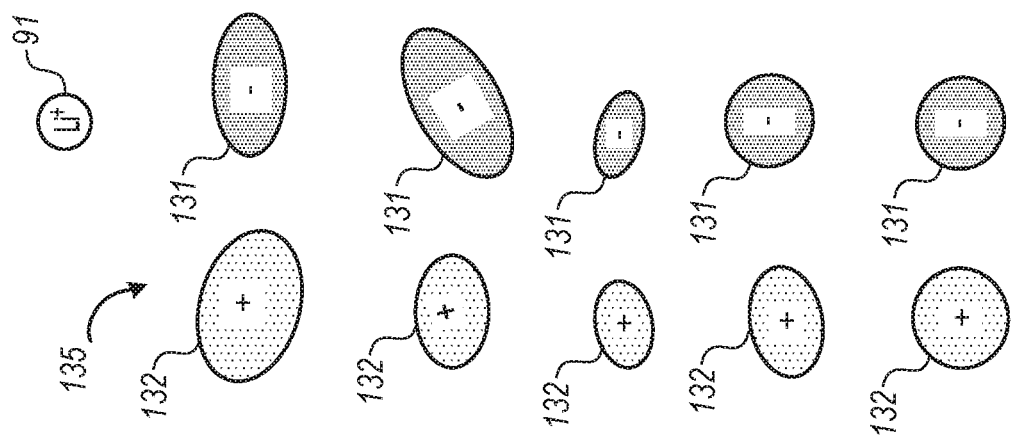
Figure 2B:
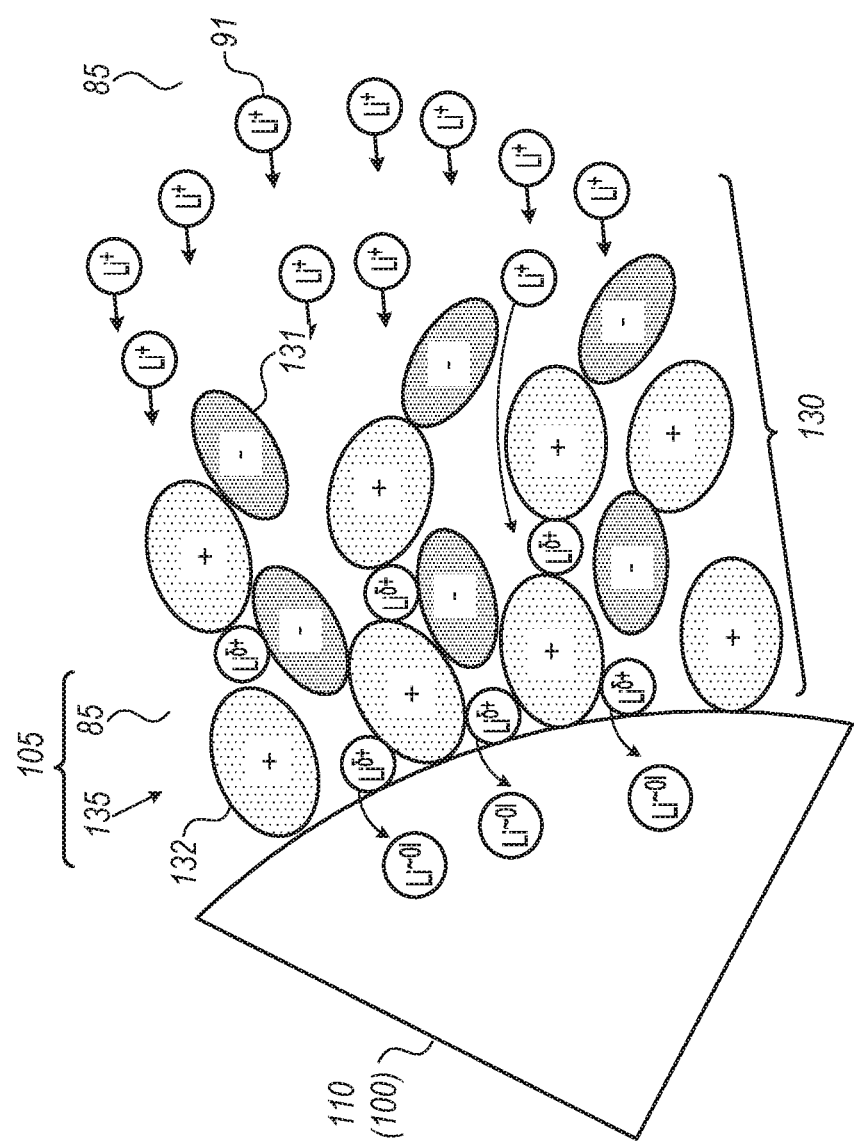
Figure 2D:
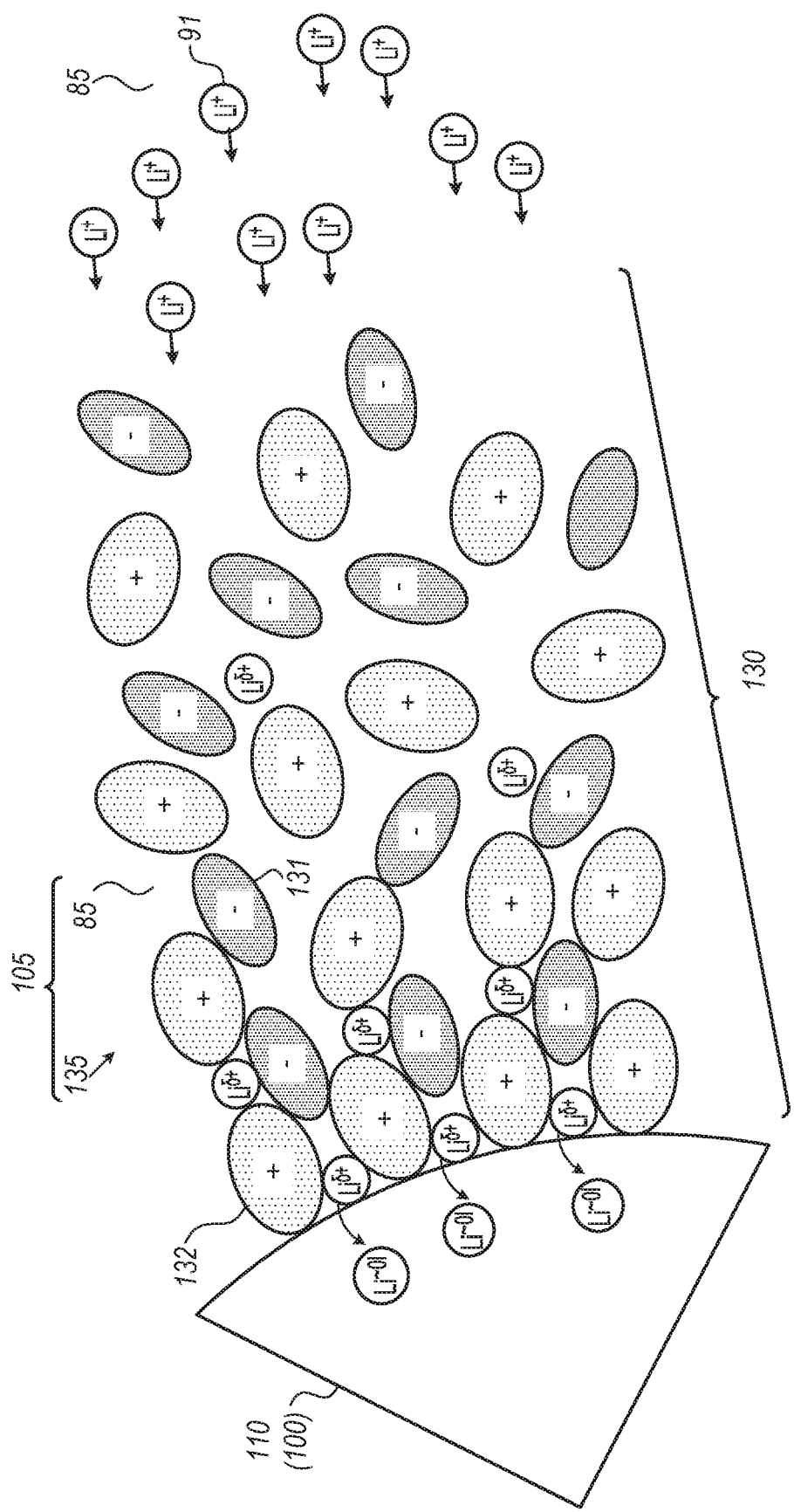

FIG. 2A illustrates schematically the situation prior to application of an electrical field in the vicinity of anode 100 (illustrated e.g., with respect to anode material particles 110) and FIGS. 2B and 2D illustrate schematically the situation during application of an electrical field in the vicinity of anode 100 (e.g., anode material particles 110). In the former case (FIG. 2A), the dispersion of anions 131 and cations 132 of ionic liquid additive 135 in electrolyte 105 may be essentially homogenous; while during application of an electrical field in the vicinity of anode 100 (e.g., of anode material particles 110, anions 131 and cations 132 of ionic liquid additive 135 accumulate in zone 130 in electrolyte 105 which is adjacent to the active material surface of anode 100. Without being bound to theory, anions 131 and cations 132 are held adjacent to anode 100 by electrostatic forces, without reacting chemically with the active material of anode 100. Electrolyte-buffering zone(s) 130 may vary in the degree to which anions 131 and cations 132 are ordered, typically the degree of order decreases with increasing distance from the anode surface as the electrostatic forces become weaker.

FIG. 2C is a high-level schematic illustration of non-limiting examples for ion sizes and shapes of ionic liquid additive 135, according to some embodiments of the invention. Cations 132 and anions 131 may have various sizes and shapes, e.g., cations 132 may be larger than anions 131, cations 132 may be smaller than anions 131, cations 132 may be about the same size as anions 131, and/or combinations of cations 132 and anions 131 with different size relations may be used together as ionic liquid additive 135. Cations 132 may be elongated or spherical, anions 131 may be elongated or spherical and/or combinations of cations 132 and anions 131 with different shapes may be used together as ionic liquid additive 135. At least one of cations 132 and anions 131 may be larger than lithium ions 91, as illustrated schematically in FIG. 2C. Any of these combinations may be used in any of the disclosed embodiments, and the specific shapes and sizes of cations 132 and anions 131 illustrated in FIGS. 2A, 2B, 2D, 3B and 3C may be replaced with any of the shapes and sizes illustrated in FIG. 2C, and are non-limiting.

FIG. 2D illustrates schematically possible different thicknesses of electrolyte-buffering zone(s) 130 and the spreading of the charge with distance from anode 100 and/or anode material 110, which may be configured according to performance requirements, and may vary under different specifications. For example, electrolyte-buffering zone(s), MSEI 130, may comprise 1, 2, 4 or more layers of cations 132 and anions 131, depending on electrolyte composition, types of ionic liquid additive 135, sizes of ions, level of charge etc.

Ionic liquid additive 135 may be selected to enable lithium ion transport therethrough while partly reducing the lithium ions and keep them in a partly charged form $Li^{\delta+}$ in zone 130.

Figure 3B:
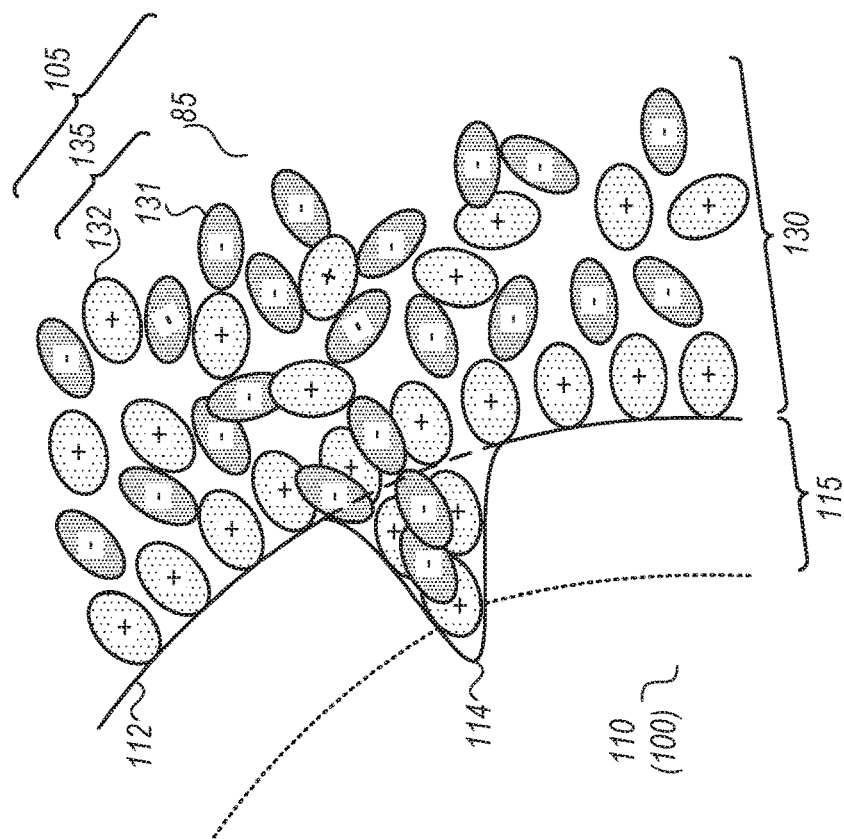
Figure 3A:
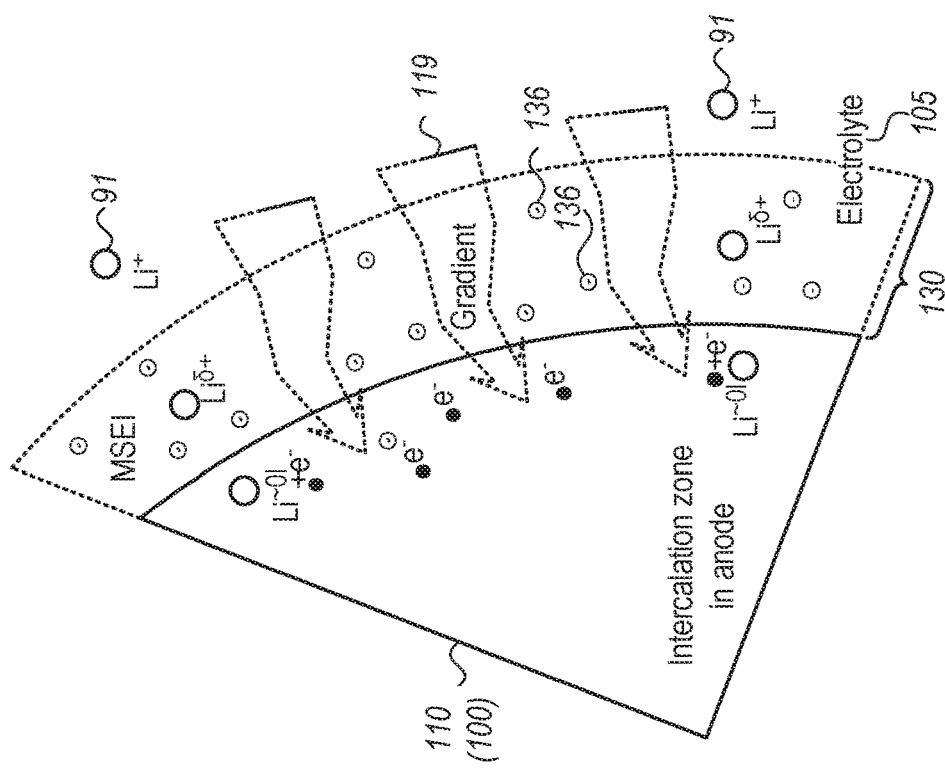

FIG. 3A schematically illustrates at least one electrolyte-buffering zone 130 (MSEI) in an electrolyte 105, which is configured to provide a mobility and charge gradient 119 (indicated schematically by the tapered arrows) having surrounding electric charge 136 (illustrated schematically as a non-specific symbol), according to some embodiments of the invention. Mobility and charge gradient 119 reduces and slows lithium ions 91 entering zone 130 in a gradual manner (indicated schematically by $Li^{\delta+}$, with the partial charge of the lithium ions changing gradually within zone 130) until they reach lithiation (e.g., intercalation in case of graphite particles) in anode 100. Gradient 119 may be configured to enable modification of the interface (the area where the two immiscible phase surfaces of anode and electrolyte are coming in contact with each other) into an interphase region 130 having a gradual change of parameters which gradually reduces the activation energy of the reduction reaction of the lithium ions, and further prevents metallization of lithium and dendrite growth. MSEI zone 130 helps smoothen the lithium ion transport into the active material for full reduction and lithiation (to $Li^{\sim 01}$). The resulting ionic liquid layer 130 reduces the probability of both lithium metallization and decomposition of the organic solvent (electrolyte 85) at the metalloid-lithium surface. Once the electrical field stops (e.g., at the end or interruption of the charging), ionic liquid 135 may slowly diffuse to form homogenous electrolyte 105. It is explicitly noted, however, that ionic liquid additive 135 may be used in cells having metalloid-based and/or graphite-based anodes (either possibly coated and/or pre-coated).

FIG. 3B schematically illustrates at least one electrolyte-buffering zone 130 (MSEI) in an electrolyte 105, which is configured to fill possible cracks 114 appearing in a surface 112 of anode, e.g., due to cracking of a surface layer 115 (which may be e.g., a SEI, a coating and/or an anode buffering zone, e.g., as disclosed in the applications cited above) upon expansion and contraction of anode 100, according to some embodiments of the invention.

Under various configurations of anodes 100, cracks may appear in surface layer 115 of anode, which may comprise or support a SEI (which may be brittle), a coating and/or a buffering zone. Such cracks may enable renewed contact between the anode material and/or metal lithium and electrolyte 85, or increase the surface area available for such contact—causing further electrolyte decomposition and possible sites for lithium metallization. Ionic liquid additive 135 may be configured to fill in such cracks 114 (illustrated schematically in FIG. 3B) once an electric field is applied, or possibly also after the electric field is applied, to reduce the extent of, or prevent, cracks 114 from enhancing electrolyte decomposition and lithium metallization. Anode 100 may be coated and/or pre-coated by a full or partial coating (e.g., a polymer coating, a nanoparticles coating, etc., e.g., on as at least part of surface layer 115, e.g., as disclosed in the applications cited above, and see FIG. 1B), which may be applied before and/or after anode formation (pre- and/or post-coating). Ionic liquid additive 135 may be configured to fill in cracks or uncoated surface areas as explained above, including possible exposed surfaces in the coating resulting from the expansion and contraction during cell cycles (see also FIG. 3C).

Figure 3C:
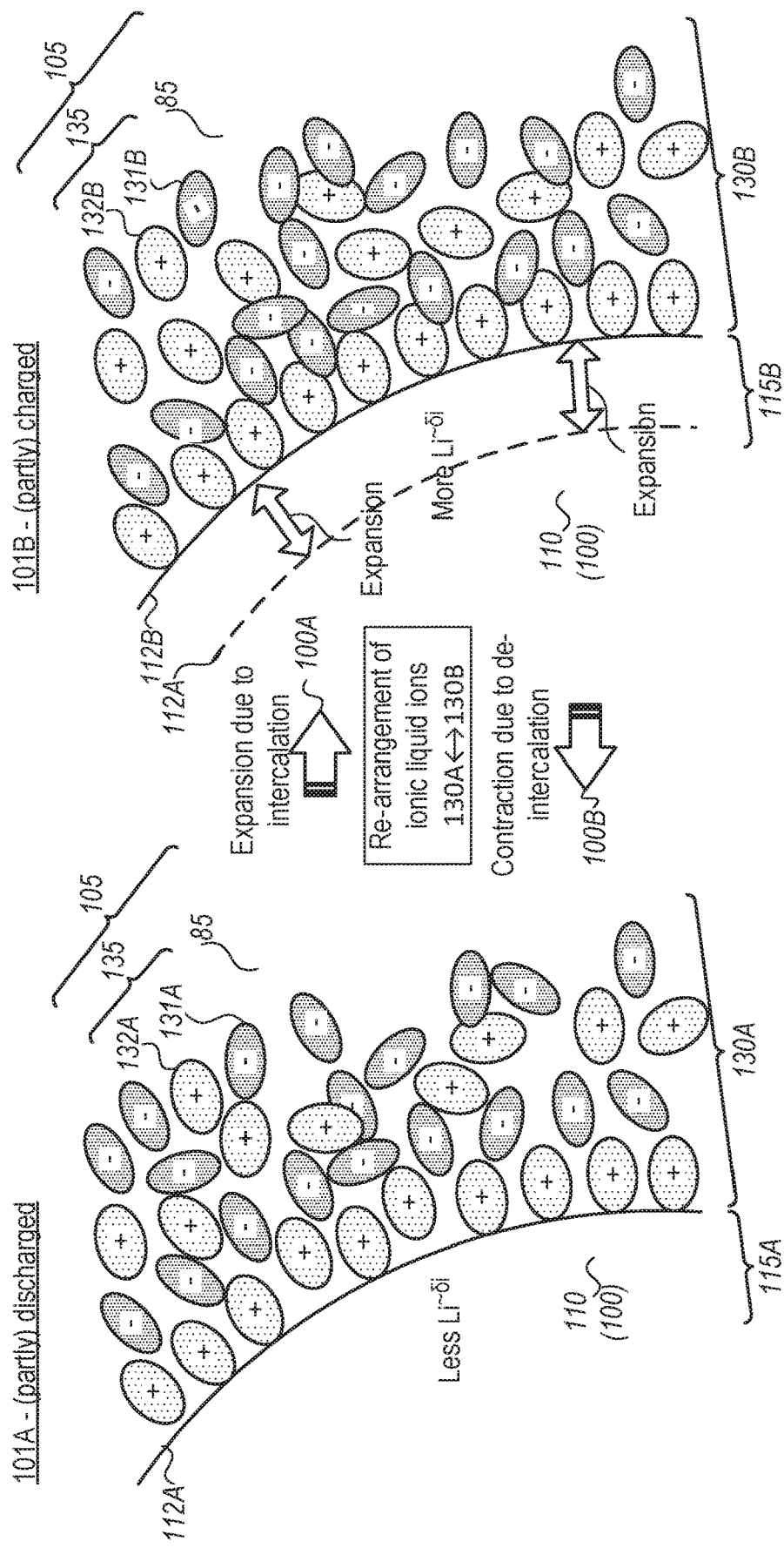

FIG. 3C schematically illustrates the ability of mobilized SEI (MSEI) layer 130 to rearrange and maintain itself as electrolyte-buffering zone(s) 130 upon expansion and contraction of anode 100, according to some embodiments of the invention. Expansion 100A and contraction 100B are illustrated schematically by the respective arrows, the indication of amount of intercalated lithium (denoted $Li^{\sim 01}$)

which correspond to (partly) discharged state 101A and (partly) charged state 101B, the schematically illustrated movement of anode surface 112 from 112A to 112B and expansion of surface layer 115 from 115A to 115B. Ionic liquid additive 135, being a liquid, accommodates itself easily (illustrated schematically by MSEI layers 130A, 130B) upon expansion 100A and contraction 100B by re-arrangement of cations 132 and anions 131 (from schematically illustrated arrangement 132A, 131A to 132B, 131B, corresponding to MSEIs 130A, 130B).

Without being bound by theory, the mechanism of MSEI formation may be both concentration and kinetically controlled, e.g., the more ionic liquid additive 135 is separated from electrolyte 105, the faster mobile SEI layer 130 forms; while an increase of the concentration of ionic liquid additive 135 may reduce the ionic mobility through MSEI 130. The concentration of ionic liquid additive 135 may thus be selected to balance reduced ionic mobility by higher concentration with possible electrolyte decomposition on the active material-electrolyte interface which may be enabled by too low concentrations of ionic liquid additive 135 (which forms MSEI 130 too slowly). Moreover, using ionic liquid additive 135 may maintain or enhance the ionic strength, without compromising the ionic mobility by increasing the ionic resistance, by enabling a reduction of the lithium salt (e.g., $LiPF_6$) concentration, which also further reduces the probability for metallization.

In embodiments, the ionic liquid additive contains a charged nitrogen atom. Non-limiting examples of ionic liquid additives 135 include, without limitation, any of the following and their combinations: 1-butyl-1-methylpyrrolidinium as cation 132 and bis(trifluoromethanesulfonyl)imide as anion 131 (melting point $-6°$ C.); 1-butyl-3-methylimidazolium as cation 132 and bis(trifluoromethanesulfonyl)imide as anion 131 (melting point $-4°$ C.); 1-butyl-3-methylimidazolium as cation 132 and bis(fluorosulfonyl)imide as anion 131 (melting point $-13°$ C.); N,N-Diethyl-N-methyl-N-propylammonium as cation 132 and bis(fluorosulfonyl)imide as anion 131; and N-propyl-N-methylpiperidinium as cation 132 and bis(trifluoromethanesulfonyl)imide as anion 131. Certain embodiments comprise ionic liquids which are derived from these combinations, i.e., having various substituents. As illustrated in the examples above, ionic liquid additives 135 may be based on sulfonylimides as anions 131 and on piperidinium derivatives as cations 132, referred to below as ionic liquids based on sulfonylimides and piperidinium derivatives.

Advantageously, certain embodiments use, as ionic liquid additives 135, ionic liquids having a negligible vapor pressure and which are liquid at room temperature, a wide electrochemical potential window (e.g., up to 5.0 V in ionic liquids based on sulfonylimides and piperidinium derivatives), and structural stability across a large temperature range (e.g., up to $385°$ C. in ionic liquids based on sulfonylimides and piperidinium derivatives). For example, the ionic liquids may have melting temperatures of $10-20°$ C., $0-10°$ C., or possibly even $<0°$ C., e.g., $0--4°$ C., $-4°--13°$ C., or even lower, e.g., below $-20°$ C., having melting points down to $-40°$ C., as non-limiting examples. The lithium ion conductivity in certain ionic liquids based on sulfonylimides and piperidinium derivatives at room temperature may be, for example, between 1-20 mS/cm (at $20°$ C.), in some embodiments, between 1.4-15.4 mS/cm (at $20°$ C.), wherein exact values can be provided according to requirements.

The use of ionic liquids as additive 135 solves prior art problems in attempting to use ionic liquids as electrolytes 85, such as their high viscosity and low Li-ion conductivity at room temperature and reduced cathodic stability. Their use as additives 135 (e.g., up to 20% vol of electrolyte 105, the rest comprising electrolyte 85) mitigates their prior art disadvantages and utilizes their advantageous property exactly where needed, e.g., at the anode-electrolyte interface. Moreover, the use of ionic liquids based on sulfonylimides and piperidinium derivatives with C (e.g., graphite), or metalloid (e.g., Si, Sn, Ge or Al)-based anodes solves prior art problems of co-intercalation of the piperidinium cations along with the Li-ion in graphite-based electrodes at lower potentials during the charge-discharge process—as metalloid-based anodes do not co-intercalate the piperidinium cations. Nevertheless, some embodiments comprise using disclosed electrolytes 105 with ionic liquid additives 135 in lithium ion cells employing graphite anodes.

Figure 3D:
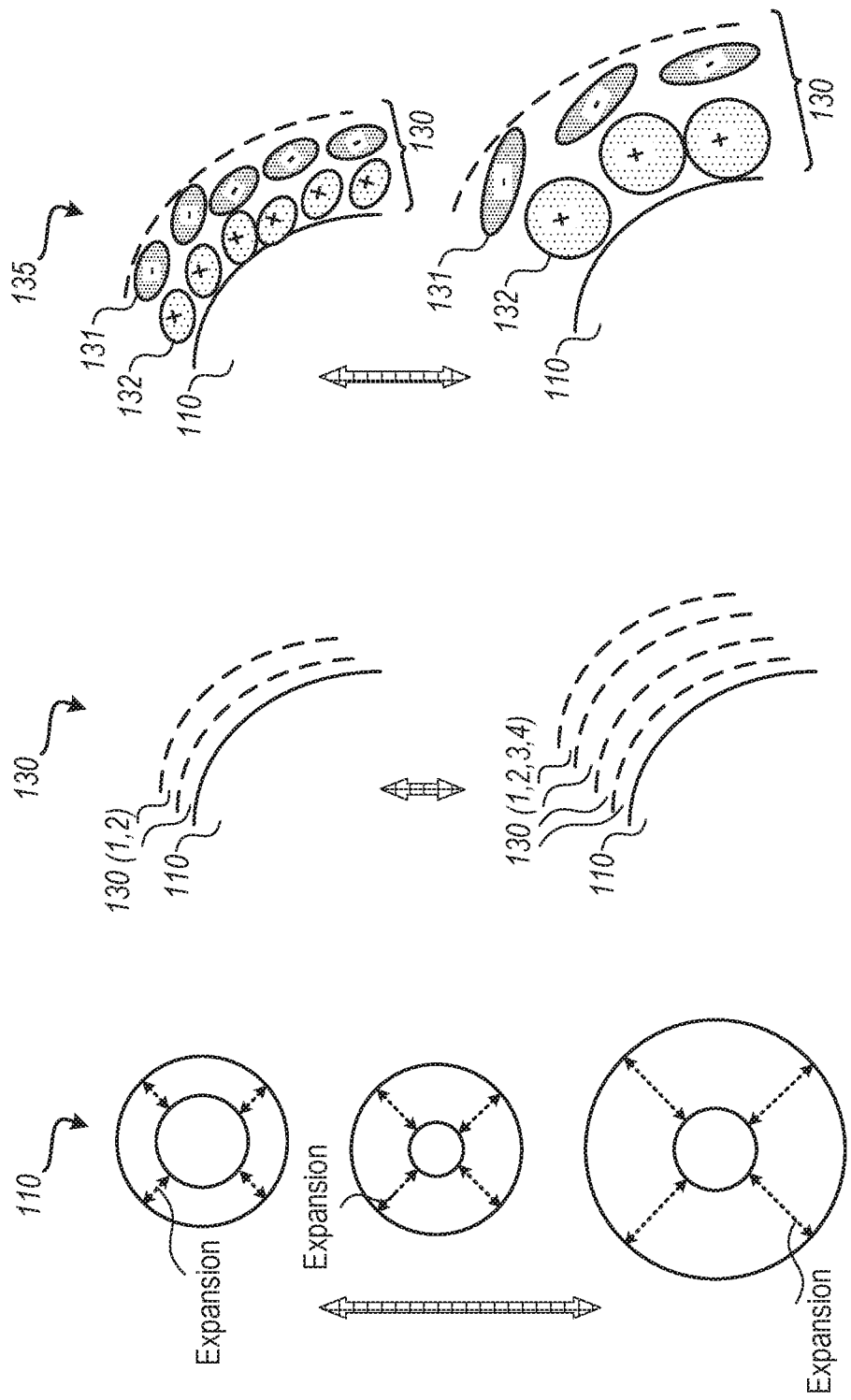
FIG. 3D is a high-level schematic illustration of some of the considerations in determining an amount of ionic liquid additive, according to some embodiments of the invention.

FIG. 3D is a high-level schematic illustration of some of the considerations in determining an amount of ionic liquid additive 135, according to some embodiments of the invention. The considerations are shown schematically as the cross-hatched arrows. The amount of ionic liquid additive 135 in electrolyte 105, may be determined according to the specific parameters and characteristics of cells 150 (see schematic FIGS. 8A and 8B below) such as the type of the anode active material from which anode material particles 110 are made, the expansion coefficient of the anode active material, the expected and/or specified extent of expansion of anode material particles 110 during operation (see, e.g., FIG. 3C), expected level of cracking in the SEI (see, e.g., FIG. 3B) parameters of anode material particles 110 such as dimensions (diameter, volume, surface area), relative amount and number in anode 100, anode porosity, coatings of particles 110 and/or other materials in anode 100 (see e.g., FIG. 1B), as well as parameters of electrolyte 105 and its components, such as their molecular weight, density, reactivity towards the anode active material, ionic conductivity and the amount of electrolyte, and clearly according to the specific parameters and characteristics of ionic liquid additive(s) 135 such as size, molecular weight, form, electrostatic characteristics of the respective cation(s) 132 and anion(s) 131 (see, e.g., FIG. 2C), and the expected and/or specified number of layers of ionic liquid additive(s) 135 on anode material particles 110 during charging (see, e.g., FIGS. 2B and 2D). A few (non-limiting) of these considerations are illustrated in FIG. 3D schematically by the cross-hatched arrows, namely the type, expansion characteristics and dimensions of anode material particles 110, the number of layers of cations 132 and anions 131 of ionic liquid additive 135 which take part in MSEI 130 (indicated schematically as 130(1 . . . n), for non-limiting n=2 and n=4), which may further depend, among other parameters on the expansion state of anode material particles 110 and on other ingredients of electrolyte 105, and the shape, size, and electrostatic characteristics of cation(s) 132 and anion(s) 131 of ionic liquid additive(s) 135.

For example, in quantitative, non-limiting examples, assuming germanium as anode active material which may reach 270% expansion upon lithiation, and particle dimeter of 100 nm, the surface area per particle upon lithiation may increase from ca. 31,000 $nm^2$ to ca. 61,000 $nm^2$. Depending on the number of required ionic liquid additive molecular layers 130(1 . . . n) and on the molecule area, the number of required ionic liquid molecules for covering the overall surface area of the anode active material particles may be calculated. For example, in a non-limiting calculation assuming three layers (n=3) at the maximal expansion of the particles and N,N-Diethyl-N-methyl-N-propylammonium (cation 132) and bis(fluorosulfonyl)imide (anion 131) as ionic liquid additive 135 (relating to cations 132 thereof for molecule size calculation—ca. 0.3 nm$^2$), ca. 620,000 molecules are required per particle, or ca. $10^{-18}$ mol ionic liquid additive 135. Proceeding with estimating the overall number of particles, their mass, the molar weight of the electrolyte and the ionic liquid additive, the volume % of ionic liquid additive 135 may be calculated. For example, for 70% active material in the anode, the number of particle was estimated as ca. $5 \cdot 10^{11}$, requiring ca. $5 \cdot 10^{-7}$ mol of ionic liquid additive 135 which is equivalent to ca. 0.05 mol/liter ionic liquid additive in electrolyte 105 (assuming electrolyte 85 comprising FEC:DMC (3:7) and 2% VC—FEC denoting fluorinated ethylene carbonates, DMC denoting dimethyl carbonate and VC denoting vinylene carbonate), or ca. 1.2% vol of ionic liquid additive 135 in electrolyte 105. Clearly, any adaptation of electrolyte 105 with respect to its ingredients, as well as any modification of the required number of layers 130 (e.g., n=1, 2, 5, 10 etc.) in expanded state yields different percentage, which may be taken into account when preparing electrolyte 105. For example, in certain embodiments, ionic liquid additive 135 concentration of 0.4% vol may be sufficient to provide one layer 130 at most expanded state of anode material particles 110 which corresponds to full lithiation. In other embodiments, lower percentage of active material in the anode may require using less ionic liquid additive 135, but not necessarily at a linear relation.

Similar calculations may be carried out for other anode active materials such as silicon (which may reach 400% expansion upon lithiation), tin (which may reach 330% expansion upon lithiation), alloys and/or mixtures thereof (with or without germanium) which may have intermediate expansion coefficients, and even less expanding anode active materials such as graphite (which typically expands by 10% upon lithiation), LTO (lithium titanate oxide) with minimal expansion (0.02%). Similar calculations may be carried out with respect to particle sizes and surface area, various types of ionic liquid 135 and various types of electrolyte 105, which are disclosed herein. The calculations presented above may be modified to determine the required concentration of ionic liquid additive 135 in electrolyte 105 using the corresponding materials.

Concluding from the examples presented above, the concentration of ionic liquid additive 135 in electrolyte 105 may be determined according to the disclosed guidelines and may vary greatly from embodiment to embodiment. While large concentrations of up to 20% may be used, some embodiments may comprise lower concentrations of 1% vol, 1-0.1% vol, 2-0.1% vol, or possibly even concentrations lower than 0.1%.

FIGS. 4A and 4B are high-level schematic illustrations of an immobilized/mobilized SEI (I/MSEI) during charging and discharging, according to some embodiments of the invention. In certain embodiments, surface functionalization of the anode active material may enhance the functionality of MSEI 130, e.g., by increasing the affinity of ionic liquid 135 to the active material electrolyte interface, and protect the interface from direct interaction with the organic solvent (of electrolyte 85). Surface functionalization may be applied by anode coatings or pre-coatings and/or by additional modifications of surface 112 of anode 100 (e.g., of anode material particles 110) and/or of the active material on anode surface 112. For example, a chemically bonded coating 145 of bonding molecules 116 such as large volume salt(s) on active material surface 112 may be used to keep some of ionic liquid 135 on surface 112 and reduce the probability of the organic solvent decomposition prior to the MSEI rearrangement at the interface. FIGS. 4A and 4B schematically illustrate this effect by the retainment of at least some of cations 132 bonded to surface 112 even when the cell is not charged. FIGS. 4A and 4B schematically illustrate anode 100 (e.g., anode material particles 110) during charging 101C and discharging (or no charging, 101D) with ionic liquid additive 135 building MSEI 130 in charging state 101C, which may comprise an immobilized section 140A and a mobile section 140B, the former remaining in discharging state 101D bonded or associate with anode surface while the latter returning into electrolyte 105 in discharging state 101D. Coating 145 may represent a layer in which bonding molecules 116 are associated with an anode coating and/or attached to anode 100. Cations 132C and possibly anions 131C which stay bonded to bonding molecules 116 (immobilized section 140A of ionic liquid additive 135) are denoted differently from cations 132B and anions 131B which stay in electrolyte 105 (mobile section 140B of ionic liquid additive 135), to illustrate that a part (or possibly all) of electrolyte additive 135 is immobilized onto layer 145 of anode 100 during operation of the cell. Immobilized layer 140A at the interface may have a better affinity to ionic liquid 135 and less affinity toward organic solvent of electrolyte 85, and therefore keep the organic solvent away from the interface and reduce the probability for its decomposition.

In some embodiments, the bonding of ions of ionic liquid additive(s) 135 may involve bonding cations 132 or possibly anions 131 by bonding molecules 116 as the layer closest to surface 112. The bonding may be carried out during one or more first charging and discharging cycles of cell 150. In certain embodiments, the bonding of cations 132 and/or anions 131 may be carried out, at least partially, on active material 110 itself, even before the first charging cycle. The bonding of the ionic liquid to bonding layer 145 may be electrostatic and/or salt-like (ionic). In certain embodiments, the bonding may be at least partly covalent. The bonding may involve any number of ionic layers, typically a few layers, possibly providing a salt layer which isolates the organic solvent used for electrolyte 85 at least from active material 110 of anode 100.

Bonding molecules 116 may be ionic or have electron rich groups such as sodium aniline sulfonate. Bonding molecules 116 may comprise lithium cations and/or possibly magnesium cations, the latter possibly when the anode material is graphite. Non-limiting examples for bonding molecules 116 comprise lithium alkylsulfonate, poly(lithium alkylsulfonate), lithium sulfate, lithium phosphate, lithium phosphate monobasic, alkylhydroxamate salts and their acidic forms (e.g., lithium sulfonic acid, LiHSO$_4$, instead of lithium sulfonate, Li$_2$SO$_4$). In case of aluminum as anode material, bonding molecules 116 may comprise lithium cations and/or aluminum cations. The lithium in the following examples may thus be replaced in some embodiments by magnesium and/or aluminum. In case of graphite anodes, a wide range of activation techniques which yield oxidized graphite may be used to enhance chemical bonding of molecules 116 (e.g., using halides or alkoxides). See below an elaboration of bonding molecules 116 and their characteristics.

The chemical bonding of molecules 116 to anode 100 (e.g., to anode material particles 110) may be carried out, for example, in the anode slurry solution and/or in dry ball milling with anode material particles. The bonding mechanism may comprise, e.g., reaction(s) of the lithium sulfonates and/or salts with metal oxides, releasing the oxide and creating a direct chemical bond to metalloid surface 112, where the lithium cation remain partly charged (Li$^{\delta+}$) in the metalloid. For example, using a large volume salt with an additional anion group as bonding molecules 116 may create a salt surface 145 on metalloid material 110, which can both protect the interface and co-operate with ionic liquid additive 135 in electrolyte 105. Layer 145 may bind a stationary portion of ionic liquid additive 135 on metalloid surface 112 while the rest of ionic liquid additive 135 is mobilized in electrolyte 105, providing a hybrid ionic liquid additive which is partly bonded and partly free in electrolyte 105. Stationary portion 140A may increase the re-ordering rate of ionic liquid additive 135 on surface 115 during charging (101C), help repel organic electrolyte 85 from the interface and hence reduce the probability for the decomposition of the organic solvent. Non-limiting examples for bonding molecules 116 include large anionic salts or their acids which may be selected to sterically repel the smaller organic carbonates solvents (of electrolyte 85) from active material surface 112. Layer 145 and stationary portion 140A of ionic liquid additive 135 on metalloid surface 112 may be highly effective during the initial charging, and enable or support the building of a stable SEI during the formation cycle(s) which protects surface 112 and anode 100 during later operation, and prevent decomposition of electrolyte on anode 100 as well as lithium metallization thereupon.

The resulting SEI may be modified toward enhanced stability and be possibly provided with self-healing mechanisms through layer 145 and stationary portion 140A of ionic liquid additive 135.

In some embodiments, bonding molecules 116 are represented by formula I:

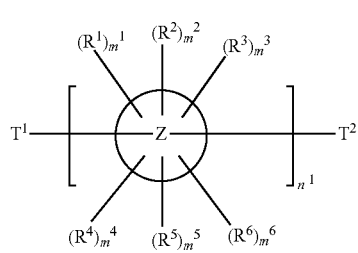

(I)

wherein:
each Z is independently selected from aryl, heterocycloalkyl, crown etheryl, cyclamyl, cyclenyl, 1,4,7-Triazacyclononanyl, hexacyclenyl, cryptandyl, naphthalenyl, anthracenyl, phenanthrenyl, tetracenyl, chrysenyl, triphenylenyl pyrenyl and pentacenyl;
$R^1$ is $[C(L^1)_2]_q^1$-$R^{101}$;
each $L^1$ is independently selected from H, F and $R^{101}$;
$R^2$, $R^3$, $R^4$, $R^5$, $R^6$ and $R^{101}$ are each independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, C(O)N(R)_2$, C(O)NHR, C(O)NH_2$, halide, tosylate, mesylate, $SO_2NHR$, triflate, isocyanate, cyanate, thiocyanate, isothiocyanate, R, cyano, $CF_3$, and $Si(OR)_3$;
each R is independently selected from methyl, ethyl, isopropyl, n-propyl, alkyl, haloalkyl, cycloalkyl, heterocycloalkyl, aryl, and benzyl;
each $M^1$ is independently Li, Na, K, Rb or Cs;
each $M^2$ is independently Be, Mg, Ca, Sr or Ba;
$T^1$ and $T^2$ are each independently absent, or selected from H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, C(O)N(R)_2$, C(O)NHR, C(O)NH_2$, halide, tosylate, mesylate, $SO_2NHR$, triflate, isocyanate, cyanate, thiocyanate, isothiocyanate, R, cyano, $CF_3$, and $Si(OR)_3$;
$m^1$, $m^2$, $m^3$, $m^4$, $m^5$, and $m^6$ are each independently an integer between 0-6;
$n^1$ is an integer between 1-10;
$q^1$ is an integer between 0-10; and
Z is connected to any of $R^1$-$R^6$, $T^1$-$T^2$ or to any neighboring repeating unit in any possible substitution position and via one or more atoms, In some embodiments, bonding molecules 116 are represented by formula II:

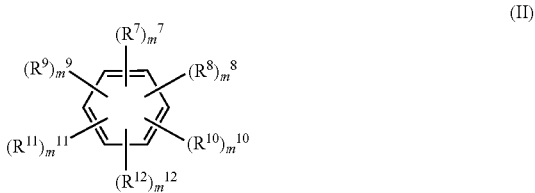

(II)

wherein:
$R^7$ is $[C(L^2)_2]_q^2$-$R^{102}$;
each $L^2$ is independently selected from H, F and $R^{102}$;
$R^8$, $R^9$, $R^{10}$, $R^{11}$, $R^{12}$ and $R^{102}$ are each independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, C(O)N(R)_2$, C(O)NHR, C(O)NH_2$, halide, tosylate, mesylate, $SO_2NHR$, triflate, isocyanate, cyanate, thiocyanate, isothiocyanate, R, cyano and $Si(OR)_3$;
each R is independently selected from methyl, ethyl, isopropyl, n-propyl, alkyl, haloalkyl, cycloalkyl, heterocycloalkyl, aryl, and benzyl;
each $M^1$ is independently Li, Na, K, Rb or Cs;
each $M^2$ is independently Be, Mg, Ca, Sr or Ba;
$m^7$, $m^8$, $m^9$, $m^{10}$, $m^{11}$ and $m^{12}$ are each independently an integer between 0-6; and
$q^2$ is an integer between 0-10.

In some embodiments, bonding molecules 116 are represented by formula III:

(III)

wherein
$R^{103}$ is $[C(L^4)_2]_q^3$-$R^{105}$;
each $L^3$ is independently selected from H, F and $R^{104}$;
each $L^4$ is independently selected from H, F and $R^{106}$;
$R^{104}$, $R^{105}$, and $R^{106}$ are each independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, C(O)N(R)_2$, C(O)NHR, C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each R is independently selected from methyl, ethyl, isopropyl, n-propyl, alkyl, haloalkyl, cycloalkyl, heterocycloalkyl, aryl, or benzyl;
each $M^1$ is independently Li, Na K, Rb or Cs;
each $M^2$ is independently Be, Mg, Ca, Sr or Ba; and
$q^3$ is an integer between 0-10.

In some embodiments, bonding molecules 116 are represented by formula IV:

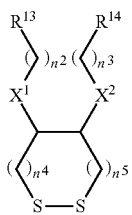

(IV)

wherein:
$X^1$ and $X^2$ are each independently selected from S, O and $CH_2$;
$R^{13}$ and $R^{14}$ are each independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rh or Cs;
each $M^2$ is independently Be, Mg, Ca, Sr or Ba;
each R is independently selected from methyl, ethyl, isopropyl, n-propyl, alkyl, haloalkyl, cycloalkyl, heterocycloalkyl, aryl, or benzyl; and
$n^2$, $n^3$, $n^4$ and $n^5$ are each independently an integer between 0-10, In some embodiments, bonding molecules 116 are represented by formula V:

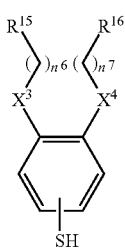

(V)

wherein:
$X^3$ and $X^4$ are each independently selected from S, O and $CH_2$;
$R^{15}$ and $R^{16}$ are each independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rb or Cs;
each $M^2$ is independently Be, Mg, Ca, Sr or Ba;
each R is independently selected from methyl, ethyl, isopropyl, n-propyl, alkyl, haloalkyl, cycloalkyl, heterocycloalkyl, aryl, or benzyl; and
$n^6$, and $n^7$ are each independently an integer between 0-10.

In some embodiments, bonding molecules 116 are represented by formula VI:

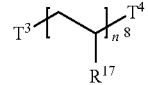

(VI)

wherein:
each $R^{17}$ is independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
$T^3$ and $T^4$ are each independently selected from H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rb or Cs;
each $M^2$ is independently Be, Mg, Ca, Sr or Ba;
each R is independently selected from methyl, ethyl, isopropyl, n-propyl, alkyl, haloalkyl, cycloalkyl, heterocycloalkyl, aryl, or benzyl; and
$n^8$ is an integer between 2-10000.

In some embodiments, bonding molecules 116 are represented by formula VII:

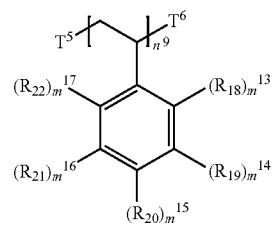

(VII)

wherein:
$R^{18}$, $R^{19}$, $R^{20}$, $R^{21}$ and $R^{22}$ are each independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ and $Si(OR)_3$;
$T^5$ and $T^6$ are each independently selected from H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rb or Cs;
each $M^2$ is independently Be, Mg, Ca, Sr or Ba;

each R is independently selected from methyl, ethyl, isopropyl, n-propyl, alkyl, haloalkyl, cycloalkyl, heterocycloalkyl, aryl, and benzyl;

$n^9$ is an integer between 20-10000; and $m^7$, $m^8$, $m^9$, $m^{10}$, $m^{11}$ and $m^{12}$ are each independently an integer between 0-5.

In some embodiments, bonding molecules 116 may be polymers, possibly crosslinked with inorganic crosslinkers. Non limiting examples of polymers include polymers represented by formula VI, polyvinylalcohol (PVA), polymethylmetacrylate (PMMA), polyacrylic acid (PAA), polyethylene glycol (PEG), polyvinylsulfonic acid and polyvinylpyrrolidone (PVP), or any combination thereof. Non limiting examples of inorganic crosslinkers include boron (B) oxides, zirconium complexes and tetralkoxysilanes or any combination thereof. Non limiting examples of boron (B) oxides include boric acid ($H_3BO_3$), salts of tetraborate ($B_4O_7^{2-}$) and boron trioxide ($B_2O_3$). In some embodiments, salts of tetraborate ($B_4O_7^{2-}$) are selected from the anion tetraborate and a cation of alkali metal or alkaline earth metal, aluminum cation ($Al^{3+}$) or any combination thereof. In some embodiments, the boron (B) oxide is a lithium tetraborate salt ($Li_2B_4O_7$) (and see also borate salts 102A). Non limiting examples of zirconium complexes include zirconium complex of tetra-2-hydroxypropyl ethylenediamine and ammonium zirconium carbonate. Non limiting examples of tetraalkoxysilane include teraethoxysilane and tetrapropoxylsilane.

In some embodiments, bonding molecules 116 may comprise salts comprising cations selected from $H^+$, Li, Na, K, Rb, Cs, Be, Mg, Ca, Sr and Ba, $Al^{3+}$ or any combination thereof and anions selected from $RCOO^-$, $RSO_3^-$, $RPO_3^{2-}$, $RPO_4^{2-}$ or any combination thereof. In some embodiments, the salt is lithium sulfate ($Li_2SO_4$). In some embodiments, the salt is lithium phosphate monobasic ($H_2LiPO_4$). In some embodiments, the salt is lithium phosphate ($Li_3PO_4$). In some embodiments, the salt is phosphoric acid ($H_3PO_4$).

In some embodiments, bonding molecules 116 are represented at least by one of formulas I-VII.

In some embodiments, the invention is directed to a lithium ion cell comprising a modified graphite anode, represented by the formula Gr-Bz, wherein Gr is graphite anode and Bz is a benzyl moiety. In some embodiments, a benzyl moiety with a good leaving group is reacted with graphite anode and also with a non-nucleophilic base to form a modified graphite anode, wherein the graphite is attached covalently to the $CH_2$ moiety of the benzylic compound. Non-limiting examples of non-nucleophilic bases include 1,8-Diazabicyclo(5.4.0)undec-7-ene (DBU), N,N-Diisopropylethylamine (DIPEA) and 2,6-Di-tert-butylpyridine. In some embodiments, the non-nucleophilic base is 1,8-Diazabicyclo(5.4.0)undec-7-ene (DBU). In some embodiments the non-nucleophilic base is N,N-Diisopropylethylamine (DIPEA). In some embodiments the non-nucleophilic base is 2,6-Di-tert-butylpyridine. In some embodiments the non-nucleophilic base is any combination of the above referenced non nucleophilic bases. Non limiting examples of good leaving groups are selected from halides (e.g., Cl, Br, I), mesylate, triflate and tosylate.

In some embodiments, the invention directs to a lithium ion cell comprising a modified graphite anode, represented by the formula Gr-SR, wherein Gr is graphite anode, SR is a thiolether moiety, wherein R is selected from alkyl, haloalkyl, cycloalkyl, heterocycloalkyl, aryl, and benzyl. In some embodiments, a thiol, RSH, is reacted with graphite anode and a radical initiator, to form a modified graphite anode, wherein the graphite is attached covalently to the S atom of the thiolether compound. Non-limiting examples of a radical initiator include azo compounds such as azobisisobutyronitrile (AIBN) and 1,1'-Azobis(cyclohexanecarbonitrile) (ABCN), organic peroxides such as benzoyl peroxide and ditertbutylperoxide and inorganic peroxides, e.g. peroxydisulfate. In some embodiments, the radical initiator is azobisisobutyronitrile (AIBN). In some embodiments, the radical initiator is 1,1'-Azobis(cyclohexanecarbonitrile) (ABCN). In some embodiments, the radical initiator is benzoyl peroxide. In some embodiments, the radical initiator is ditertbutylperoxide. In some embodiments, the radical initiator is peroxydisulfate. In some embodiments, the radical initiator is any combination of the above referenced radical initiators.

In some embodiments, the invention directs to a lithium ion cell comprising a modified Si anode. In some embodiments, the Si anode is connected covalently to bonding molecule 116, represented by formula I-VII. In some embodiments, a Si anode rich in silanol bonds, Si—OH, is reacted with the bonding molecule to afford the modified Si anode. In some embodiments, a Si anode rich in silanol bonds, Si—OH, is reacted with $Si(OR)_3$ moiety in the bonding molecule to afford the modified Si anode. In some embodiments, bonding molecule 116, represented by formula I-VII, is connected to the Si anode via silanol linkage, Si—O—Si.

In some embodiments, Z is aryl, heterocycloalkyl, crown etheryl, cyclamyl, cyclenyl, cryptandyl, naphthalenyl, anthracenyl, phenanthrenyl, tetracenyl, chrysenyl, triphenylenyl pyrenyl or pentacenyl. In some embodiments, Z is aryl. In some embodiments, Z is heterocycloalkyl. In some embodiments, Z is crown etheryl. In some embodiments, Z is cyclamyl. In some embodiments, Z is cyclenyl. In some embodiments, Z is cryptandyl. In some embodiments, Z is naphthalenyl. In some embodiments, Z is anthracenyl. In some embodiments, Z is anthracenyl. In some embodiments, Z is phenanthrenyl. In some embodiments, Z is tetracenyl. In some embodiments, Z is chrysenyl. In some embodiments, Z is triphenylenyl. In some embodiments, Z is pyrenyl. In some embodiments, Z is pentacenyl.

In some embodiments, $L^1$ is H, F or $R^{101}$. In some embodiments, $L^1$ is H. In some embodiments, $L^1$ is F. In some embodiments, $L^1$ is $R^{101}$.

In some embodiments, $L^2$ is H, F or $R^{102}$. In some embodiments, $L^2$ is H. In some embodiments, $L^2$ is F. In some embodiments, $L^2$ is $R^{102}$.

In some embodiments, $L^3$ is H, F or $R^{104}$. In some embodiments, $L^3$ is H. In some embodiments, $L^3$ is F. In some embodiments, $L^3$ is $R^{104}$.

In some embodiments, $L^4$ is H, F or $R^{106}$. In some embodiments, $L^4$ is H. In some embodiments, $L^4$ is F. In some embodiments, $L^4$ is $R^{106}$.

In some embodiments, $R^2$ is $CO_2H$, $CO_2M$ $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^2$ is $CO_2H$. In some embodiments, $R^2$ is $CO_2M^1$. In some embodiments, $R^2$ is $CO_2R$. In some embodiments, $R^2$ is $SO_3H$. In some embodiments, $R^2$ is $SO_3M^1$. In some embodiments, $R^2$ is $PO_3H_2$. In some embodiments, $R^2$ is $PO_3M^1_2$. In some embodiments, $R^2$ is $PO_3M^1H$. In some embodiments, $R^2$ is $PO_4H_2$. In some embodiments, $R^2$ is $PO_4M^1_2$. In some embodiments, $R^2$ is $PO_4M^1H$. In some embodiments, $R^2$ is $PO_4M^2$. In some embodiments, $R^2$ is $C(O)NHOH$. In some embodiments, $R^2$ is $NH_2$. In some embodiments, $R^2$ is NHR.

In some embodiments, $R^2$ is $N(R)_2$. In some embodiments, $R^2$ is $NO_2$. In some embodiments, $R^2$ is COOR. In some embodiments, $R^2$ is CHO. In some embodiments, $R^2$ is $CH_2OH$. In some embodiments, $R^2$ is OH. In some embodiments, $R^2$ is OR. In some embodiments, $R^3$ is SH. In some embodiments, $R^2$ is SR. In some embodiments, $R^2$ is $C(O)N(R)_2$. In some embodiments, $R^2$ is C(O)NHR. In some embodiments, $R^2$ is $C(O)NH_2$. In some embodiments, $R^2$ is halide. In some embodiments, $R^2$ is tosylate. In some embodiments, $R^2$ is mesylate. In some embodiments, $R^2$ is $SO_2NHR$. In some embodiments, $R^2$ is triflate. In some embodiments, $R^2$ is isocyanate. In some embodiments, $R^2$ is cyanate. In some embodiments, $R^2$ is thiocyanate. In some embodiments, $R^2$ is isothiocyanate. In some embodiments, $R^2$ is R. In some embodiments, $R^2$ is cyano. In some embodiments, $R^2$ is $CF_3$. In some embodiments, $R^2$ is $Si(OR)_3$.

In some embodiments, $R^3$ is $CO_2H$, $CO_2M^1$, $CO_2R$, $SO_3H$, sn $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^3$ is $CO_2H$. In some embodiments, $R^3$ is $CO_2M^1$. In some embodiments, $R^3$ is $CO_2R$. In some embodiments, $R^3$ is $SO_3H$. In some embodiments, $R^3$ is $SO_3M^1$. In some embodiments, $R^3$ is $PO_3H_2$. In some embodiments, $R^3$ is $PO_3M^1_2$. In some embodiments, $R^3$ is $PO_3M^1H$. In some embodiments, $R^3$ is $PO_4H_2$. In some embodiments, $R^3$ is $PO_4M^1_2$. In some embodiments, $R^3$ is $PO_4M^1H$. In some embodiments, $R^3$ is $PO_4M^2$. In some embodiments, $R^3$ is C(O)NHOH. In some embodiments, $R^3$ is $NH_2$. In some embodiments, $R^3$ is NHR. In some embodiments, $R^3$ is $N(R)_2$. In some embodiments, $R^3$ is $NO_2$. In some embodiments, $R^3$ is COOR. In some embodiments, $R^3$ is CHO. In some embodiments, $R^3$ is $CH_2OH$. In some embodiments, $R^3$ is OH. In some embodiments, $R^3$ is OR. In some embodiments, $R^3$ is SH. In some embodiments, $R^3$ is SR. In some embodiments, $R^3$ is $C(O)N(R)_2$. In some embodiments, $R^3$ is C(O)NHR. In some embodiments, $R^3$ is $C(O)NH_2$. In some embodiments, $R^3$ is halide. In some embodiments, $R^3$ is tosylate. In some embodiments, $R^3$ is mesylate. In some embodiments, $R^3$ is $SO_2NHR$. In some embodiments, $R^3$ is triflate. In some embodiments, $R^3$ is isocyanate. In some embodiments, $R^3$ is cyanate. In some embodiments, $R^3$ is thiocyanate. In some embodiments, $R^3$ is isothiocyanate. In some embodiments, $R^3$ is R. In some embodiments, $R^3$ is cyano. In some embodiments, $R^3$ is $CF_3$. In some embodiments, $R^3$ is $Si(OR)_3$.

In some embodiments, $R^4$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^4$ is $CO_2H$. In some embodiments, $R^4$ is $CO_2M^1$. In some embodiments, $R^4$ is $CO_2R$. In some embodiments, $R^4$ is $SO_3H$. In some embodiments, $R^4$ is $SO_3M^1$. In some embodiments, $R^4$ is $PO_3H_2$. In some embodiments, $R^4$ is $PO_3M^1_2$. In some embodiments, $R^4$ is $PO_3M^1H$. In some embodiments, $R^4$ is $PO_4H_2$. In some embodiments, $R^4$ is $PO_4M^1_2$. In some embodiments, $R^4$ is $PO_4M^1H$. In some embodiments, $R^4$ is $PO_4M^2$. In some embodiments, $R^4$ is C(O)NHOH. In some embodiments, $R^4$ is $NH_2$. In some embodiments, $R^4$ is NHR. In some embodiments, $R^4$ is $N(R)_2$. In some embodiments, $R^4$ is $NO_2$. In some embodiments, $R^4$ is COOR. In some embodiments, $R^4$ is CHO. In some embodiments, $R^4$ is $CH_2OH$. In some embodiments, $R^4$ is OH. In some embodiments, $R^4$ is OR. In some embodiments, $R^4$ is SH. In some embodiments, $R^4$ is SR. In some embodiments, $R^4$ is $C(O)N(R)_2$. In some embodiments, $R^4$ is C(O)NHR. In some embodiments, $R^4$ is $C(O)NH_2$. In some embodiments, $R^4$ is halide. In some embodiments, $R^4$ is tosylate. In some embodiments, $R^4$ is mesylate. In some embodiments, $R^4$ is $SO_2NHR$. In some embodiments, $R^4$ is triflate. In some embodiments, $R^4$ is isocyanate. In some embodiments, $R^4$ is cyanate. In some embodiments, $R^4$ is thiocyanate. In some embodiments, $R^4$ is isothiocyanate. In some embodiments, $R^4$ is R. In some embodiments, $R^4$ is cyano. In some embodiments, $R^4$ is $CF_3$. In some embodiments, $R^4$ is $Si(OR)_3$.

In some embodiments, $R^5$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^5$ is $CO_2H$. In some embodiments, $R^5$ is $CO_2M^1$. In some embodiments, $R^5$ is $CO_2R$. In some embodiments, $R^5$ is $SO_3H$. In some embodiments, $R^5$ is $SO_3M^1$. In some embodiments, $R^5$ is $PO_3H_2$. In some embodiments, $R^5$ is $PO_3M^1_2$. In some embodiments, $R^5$ is $PO_3M^1H$. In some embodiments, $R^5$ is $PO_4H_2$. In some embodiments, $R^5$ is $PO_4M^1_2$. In some embodiments, $R^5$ is $PO_4M^1H$. In some embodiments, $R^5$ is $PO_4M^2$. In some embodiments, $R^5$ is C(O)NHOH. In some embodiments, $R^5$ is $NH_2$. In some embodiments, $R^5$ is NHR. In some embodiments, $R^5$ is $N(R)_2$. In some embodiments, $R^5$ is $NO_2$. In some embodiments, $R^5$ is COOR. In some embodiments, $R^5$ is CHO. In some embodiments, $R^5$ is $CH_2OH$. In some embodiments, $R^5$ is OH. In some embodiments, $R^5$ is OR. In some embodiments, $R^5$ is SH. In some embodiments, $R^5$ is SR. In some embodiments, $R^5$ is $C(O)N(R)_2$. In some embodiments, $R^5$ is C(O)NHR. In some embodiments, $R^5$ is $C(O)NH_2$. In some embodiments, $R^5$ is halide. In some embodiments, $R^5$ is tosylate. In some embodiments, $R^5$ is mesylate. In some embodiments, $R^5$ is $SO_2NHR$. In some embodiments, $R^5$ is triflate. In some embodiments, $R^5$ is isocyanate. In some embodiments, $R^5$ is cyanate. In some embodiments, $R^5$ is thiocyanate. In some embodiments, $R^5$ is isothiocyanate. In some embodiments, $R^5$ is R. In some embodiments, $R^5$ is cyano. In some embodiments, $R^5$ is $CF_3$. In some embodiments, $R^5$ is $Si(OR)_3$.

In some embodiments, $R^6$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^6$ is $CO_2H$. In some embodiments, $R^6$ is $CO_2M^1$. In some embodiments, $R^6$ is $CO_2R$. In some embodiments, $R^6$ is $SO_3H$. In some embodiments, $R^6$ is $SO_3M^1$. In some embodiments, $R^6$ is $PO_3H_2$. In some embodiments, $R^6$ is $PO_3M^1_2$. In some embodiments, $R^6$ is $PO_3M^1H$. In some embodiments, $R^6$ is $PO_4H_2$. In some embodiments, $R^6$ is $PO_4M^1_2$. In some embodiments, $R^6$ is $PO_4M^1H$. In some embodiments, $R^6$ is $PO_4M^2$. In some embodiments, $R^6$ is C(O)NHOH. In some embodiments, $R^6$ is $NH_2$. In some embodiments, $R^6$ is NHR. In some embodiments, $R^6$ is $N(R)_2$. In some embodiments, $R^6$ is $NO_2$. In some embodiments, $R^6$ is COOR. In some embodiments, $R^6$ is CHO. In some embodiments, $R^6$ is $CH_2OH$. In some embodiments, $R^6$ is OH. In some embodiments, $R^6$ is OR. In some embodiments, $R^6$ is SH. In some embodiments, $R^6$ is SR. In some embodiments, $R^5$ is $C(O)N(R)_2$. In some embodiments, $R^5$ is C(O)NHR. In some embodiments, $R^5$ is $C(O)NH_2$. In some embodiments, $R^6$ is halide. In some embodiments, $R^6$ is tosylate. In some embodiments, $R^6$ is mesylate. In some embodiments, $R^6$ is $SO_2NHR$. In some embodiments, $R^6$ is triflate. In some embodiments, $R^6$ is isocyanate. In some embodiments, $R^6$ is cyanate. In some embodiments, $R^6$ is thiocyanate. In some embodiments, $R^6$ is isothiocyanate. In some embodiments, $R^6$ is R. In some embodiments, $R^6$ is cyano. In some embodiments, $R^6$ is $CF_3$. In some embodiments, $R^6$ is $Si(OR)_3$.

In some embodiments, $R^8$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^8$ is $CO_2H$. In some embodiments, $R^8$ is $CO_2M^1$. In some embodiments, $R^8$ is $CO_2R$. In some embodiments, $R^8$ is $SO_3H$. In some embodiments, $R^8$ is $SO_3M^1$. In some embodiments, $R^8$ is $PO_3H_2$. In some embodiments, $R^8$ is $PO_3M^1_2$. In some embodiments, $R^5$ is $PO_3M^1H$. In some embodiments, $R^8$ is $PO_4H_2$. In some embodiments, $R^8$ is $PO_4M^1_2$. In some embodiments, $R^8$ is $PO_4M^1H$. In some embodiments, $R^8$ is $PO_4M^2$. In some embodiments, $R^8$ is C(O)NHOH. In some embodiments, $R^8$ is $NH_2$. In some embodiments, $R^8$ is NHR. In some embodiments, $R^8$ is $N(R)_2$. In some embodiments, $R^8$ is $NO_2$. In some embodiments, $R^8$ is COOR. In some embodiments, $R^8$ is CHO. In some embodiments, $R^8$ is $CH_2OH$. In some embodiments, $R^8$ is OH. In some embodiments, $R^8$ is OR. In some embodiments, $R^8$ is SH. In some embodiments, $R^8$ is SR. In some embodiments, $R^8$ is $C(O)N(R)_2$. In some embodiments, $R^8$ is C(O)NHR. In some embodiments, $R^8$ is $C(O)NH_2$. In some embodiments, $R^8$ is halide. In some embodiments, $R^8$ is tosylate. In some embodiments, $R^8$ is mesylate. In some embodiments, $R^8$ is $SO_2NHR$. In some embodiments, $R^8$ is triflate. In some embodiments, $R^8$ is isocyanate. In some embodiments, $R^8$ is cyanate. In some embodiments, $R^8$ is thiocyanate. In some embodiments, $R^8$ is isothiocyanate. In some embodiments, $R^8$ is R. In some embodiments, $R^8$ is cyano. In some embodiments, $R^8$ is $CF_3$. In some embodiments, $R^8$ is $Si(OR)_3$.

In some embodiments, $R^9$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ or $Si(OR)_3$. In some embodiments, $R^9$ is $CO_2H$. In some embodiments, $R^9$ is $CO_2M^1$. In some embodiments, $R^9$ is $CO_2R$. In some embodiments, $R^9$ is $SO_3H$. In some embodiments, $R^9$ is $SO_3M^1$. In some embodiments, $R^9$ is $PO_3H_2$. In some embodiments, $R^9$ is $PO_3M^1_2$. In some embodiments, $R^9$ is $PO_3M^1H$. In some embodiments, $R^9$ is $PO_4H_2$. In some embodiments, $R^9$ is $PO_4M^1_2$. In some embodiments, $R^9$ is $PO_4M^1H$. In some embodiments, $R^9$ is $PO_4M^2$. In some embodiments, $R^9$ is C(O)NHOH. In some embodiments, $R^9$ is $NH_2$. In some embodiments, $R^9$ is NHR. In some embodiments, $R^9$ is $N(R)_2$. In some embodiments, $R^9$ is $NO_2$. In some embodiments, $R^9$ is COOR. In some embodiments, $R^9$ is CHO. In some embodiments, $R^9$ is $CH_2OH$. In some embodiments, $R^9$ is OH. In some embodiments, $R^9$ is OR. In some embodiments, $R^5$ is SH. In some embodiments, $R^9$ is SR. In some embodiments, $R^9$ is $C(O)N(R)_2$. In some embodiments, $R^9$ is C(O)NHR. In some embodiments, $R^9$ is $C(O)NH_2$. In some embodiments, $R^9$ is halide. In some embodiments, $R^9$ is tosylate. In some embodiments, $R^9$ is mesylate. In some embodiments, $R^9$ is $SO_2NHR$. In some embodiments, $R^9$ is triflate. In some embodiments, $R^9$ is isocyanate. In some embodiments, $R^9$ is cyanate. In some embodiments, $R^9$ is thiocyanate. In some embodiments, $R^9$ is isothiocyanate. In some embodiments, $R^9$ is R. In some embodiments, $R^9$ is cyano. In some embodiments, $R^9$ is $CF_3$. In some embodiments, $R^9$ is $Si(OR)_3$.

In some embodiments, $R^{10}$ is $CO_2H$, $CO_2M$ $CO_2R$, $SO_3H$, $SO_3M^1$, $PO_3H_2$, $PO_3M^{12}$. $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{10}$ is $CO_2H$. In some embodiments, $R^{10}$ is $CO_2M^1$. In some embodiments, $R^{10}$ is $CO_2R$. In some embodiments, $R^{10}$ is $SO_3H$. In some embodiments, $R^{10}$ is $SO_3M^1$. In some embodiments, $R^{10}$ is $PO_3H_2$. In some embodiments, $R^{10}$ is $PO_3M^1_2$. In some embodiments, $R^{10}$ is $PO_3M^1H$. In some embodiments, $R^{10}$ is $PO_4H_2$. In some embodiments, $R^{10}$ is $PO_4M^1_2$. In some embodiments, $R^{10}$ is $PO_4M^1H$. In some embodiments, $R^{10}$ is $PO_4M^2$. In some embodiments, $R^{10}$ is C(O)NHOH. In some embodiments, $R^{10}$ is $NH_2$. In some embodiments, $R^{10}$ is NHR. In some embodiments, $R^{10}$ is $N(R)_2$. In some embodiments, $R^{10}$ is $NO_2$. In some embodiments, $R^{10}$ is COOR. In some embodiments, $R^{10}$ is CHO. In some embodiments, $R^{10}$ is $CH_2OH$. In some embodiments, $R^{10}$ is OH. In some embodiments, $R^{10}$ is OR. In some embodiments, $R^{10}$ is SH. In some embodiments, $R^{10}$ is SR. In some embodiments, $R^{10}$ is $C(O)N(R)_2$. In some embodiments, $R^{10}$ is C(O)NHR. In some embodiments, $R^{10}$ is $C(O)NH_2$. In some embodiments, $R^{10}$ is halide. In some embodiments, $R^{10}$ is tosylate. In some embodiments, $R^{10}$ is mesylate. In some embodiments, $R^{10}$ is $SO_2NHR$. In some embodiments, $R^{10}$ is triflate. In some embodiments, $R^{10}$ is isocyanate. In some embodiments, $R^{10}$ is cyanate. In some embodiments, $R^{10}$ is thiocyanate. In some embodiments, $R^{10}$ is isothiocyanate. In some embodiments, $R^{10}$ is R. In some embodiments, $R^{10}$ is cyano. In some embodiments, $R^{10}$ is $CF_3$. In some embodiments, $R^{10}$ is $Si(OR)_3$.

In some embodiments, $R^{11}$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{11}$ is $CO_2H$. In some embodiments, $R^{11}$ is $CO_2M^1$. In some embodiments, $R^{11}$ is $CO_2R$. In some embodiments, $R^{11}$ is $SO_3H$. In some embodiments, $R^{11}$ is $SO_3M^1$. In some embodiments, $R^{11}$ is $PO_3H_2$. In some embodiments, $R^{11}$ is $PO_3M^1_2$. In some embodiments, $R^{11}$ is $PO_3M^1H$. In some embodiments, $R^{11}$ is $PO_4H_2$. In some embodiments, $R^{11}$ is $PO_4M^1_2$. In some embodiments, $R^{11}$ is $PO_4M^1H$. In some embodiments, $R^{11}$ is $PO_4M^2$. In some embodiments, $R^{11}$ is C(O)NHOH. In some embodiments, $R^{11}$ is $NH_2$. In some embodiments, $R^{11}$ is NHR. In some embodiments, $R^{11}$ is $N(R)_2$. In some embodiments, $R^{11}$ is $NO_2$. In some embodiments, $R^{11}$ is COOR. In some embodiments, $R^{11}$ is CHO. In some embodiments, $R^{11}$ is $CH_2OH$. In some embodiments, $R^{11}$ is OH. In some embodiments, $R^{11}$ is OR. In some embodiments, $R^{11}$ is SH. In some embodiments, $R^{11}$ is SR. In some embodiments, $R^{11}$ is C(O)N(R)$_2$. In some embodiments, $R^{11}$ is C(O)NHR. In some embodiments, $R^{11}$ is C(O)NH$_2$. In some embodiments, $R^{11}$ is halide. In some embodiments, $R^{11}$ is tosylate. In some embodiments, $R^{11}$ is mesylate. In some embodiments, $R^{11}$ is SO$_2$NHR. In some embodiments, $R^{11}$ is triflate. In some embodiments, $R^{11}$ is isocyanate. In some embodiments, $R^{11}$ is cyanate. In some embodiments, $R^{11}$ is thiocyanate. In some embodiments, $R^{11}$ is isothiocyanate. In some embodiments, $R^{11}$ is R. In some embodiments, $R^{11}$ is cyano. In some embodiments, $R^{11}$ is CF$_3$. In some embodiments, $R^{11}$ is Si(OR)$_3$.

In some embodiments, $R^{12}$ is CO$_2$H, CO$_2$M$^1$, CO$_2$R, SO$_3$H, SO$_3$M$^1$, PO$_3$H$_2$, PO$_3$M$^1$$_2$, PO$_3$M$^1$H, PO$_4$H$_2$, PO$_4$M$^1$$_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano CF$_3$ or Si(OR)$_3$. In some embodiments, $R^{12}$ is CO$_2$H. In some embodiments, $R^{12}$ is CO$_2$M$^1$. In some embodiments, $R^{12}$ is CO$_2$R. In some embodiments, $R^{12}$ is SO$_3$H. In some embodiments, $R^{12}$ is SO$_3$M$^1$. In some embodiments, $R^{12}$ is PO$_3$H$_2$. In some embodiments, $R^{12}$ is PO$_3$M$^1$$_2$. In some embodiments, $R^{12}$ is PO$_3$M$^1$H. In some embodiments, $R^{12}$ is PO$_4$H$_2$. In some embodiments, $R^{12}$ is PO$_4$M$^1$$_2$. In some embodiments, $R^{12}$ is PO$_4$M$^1$H. In some embodiments, $R^{12}$ is PO$_4$M$^2$. In some embodiments, $R^{12}$ is C(O)NHOH. In some embodiments, $R^{12}$ is NH$_2$. In some embodiments, $R^{12}$ is NHR. In some embodiments, $R^{12}$ is N(R)$_2$. In some embodiments, $R^{12}$ is NO$_2$. In some embodiments, $R^{12}$ is COOR. In some embodiments, $R^{12}$ is CHO. In some embodiments, $R^{12}$ is CH$_2$OH. In some embodiments, $R^{12}$ is OH. In some embodiments, $R^{12}$ is OR. In some embodiments, $R^{12}$ is SH. In some embodiments, $R^{12}$ is SR. In some embodiments, $R^{12}$ is C(O)N(R)$_2$. In some embodiments, $R^{12}$ is C(O)NHR. In some embodiments, $R^{12}$ is C(O)NH$_2$. In some embodiments, $R^{12}$ is halide. In some embodiments, $R^{12}$ is tosylate. In some embodiments, $R^{12}$ is mesylate. In some embodiments, $R^{12}$ is SO$_2$NHR. In some embodiments, $R^{12}$ is triflate. In some embodiments, $R^{12}$ is isocyanate. In some embodiments, $R^{12}$ is cyanate. In some embodiments, $R^{12}$ is thiocyanate. In some embodiments, $R^{12}$ is isothiocyanate. In some embodiments, $R^{12}$ is R. In some embodiments, $R^{12}$ is cyano. In some embodiments, $R^{12}$ is CF$_3$. In some embodiments, $R^{5}$ is Si(OR)$_3$.

In some embodiments, $R^{13}$ is CO$_2$H, CO$_2$M$^1$, CO$_2$R, SO$_3$H, SO$_3$M$^1$, PO$_3$H$_2$, PO$_3$M$^1$$_2$, PO$_3$M$^1$H, PO$_4$H$_2$, PO$_4$M$^1$$_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano CF$_3$ or Si(OR)$_3$. In some embodiments, $R^{13}$ is CO$_2$H. In some embodiments, $R^{13}$ is CO$_2$M$^1$. In some embodiments, $R^{13}$ is CO$_2$R. In some embodiments, $R^{13}$ is SO$_3$H. In some embodiments, $R^{13}$ is SO$_3$M$^1$. In some embodiments, $R^{13}$ is PO$_3$H$_2$. In some embodiments, $R^{13}$ is PO$_3$M$^1$$_2$. In some embodiments, $R^{13}$ is PO$_3$M$^1$H. In some embodiments, $R^{13}$ is PO$_4$H$_2$. In some embodiments, $R^{13}$ is PO$_4$M$^1$$_2$. In some embodiments, $R^{13}$ is PO$_4$M$^1$H. In some embodiments, $R^{13}$ is PO$_4$M$^2$. In some embodiments, $R^{13}$ is C(O)NHOH. In some embodiments, $R^{13}$ is NH$_2$. In some embodiments, $R^{13}$ is NHR. In some embodiments, $R^{13}$ is N(R)$_2$. In some embodiments, $R^{13}$ is NO$_2$. In some embodiments, $R^{13}$ is COOR. In some embodiments, $R^{13}$ is CHO. In some embodiments, $R^{13}$ is CH$_2$OH. In some embodiments, $R^{13}$ is OH. In some embodiments, $R^{13}$ is OR. In some embodiments, $R^{13}$ is SH. In some embodiments, $R^{5}$ is SR. In some embodiments, $R^{13}$ is C(O)N(R)$_2$. In some embodiments, $R^{13}$ is C(O)NHR. In some embodiments, $R^{13}$ is C(O)NH$_2$. In some embodiments, $R^{13}$ is halide. In some embodiments, $R^{13}$ is tosylate. In some embodiments, $R^{13}$ is mesylate. In some embodiments, $R^{13}$ is SO$_2$NHR. In some embodiments, $R^{13}$ is triflate. In some embodiments, $R^{13}$ is isocyanate. In some embodiments, $R^{13}$ is cyanate. In some embodiments, $R^{13}$ is thiocyanate. In some embodiments, $R^{13}$ is isothiocyanate. In some embodiments, $R^{13}$ is R. In some embodiments, $R^{13}$ is cyano. In some embodiments, $R^{13}$ is CF$_3$. In some embodiments, $R^{13}$ is Si(OR)$_3$.

In some embodiments, $R^{14}$ is CO$_2$H, CO$_2$M$^1$, CO$_2$R, SO$_3$H, SO$_3$M$^1$, PO$_3$H$_2$, PO$_3$M$^1$$_2$, PO$_3$M$^1$H, PO$_4$H$_2$, PO$_4$M$^1$$_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano CF$_3$ or Si(OR)$_3$. In some embodiments, $R^{14}$ is CO$_2$H. In some embodiments, $R^{14}$ is CO$_2$M$^1$. In some embodiments, $R^{14}$ is CO$_2$R. In some embodiments, $R^{14}$ is SO$_3$H. In some embodiments, $R^{14}$ is SO$_3$M$^1$. In some embodiments, $R^{14}$ is PO$_3$H$_2$. In some embodiments, $R^{14}$ is PO$_3$M$^1$$_2$. In some embodiments, $R^{14}$ is PO$_3$M$^1$H. In some embodiments, $R^{14}$ is PO$_4$H$_2$. In some embodiments, $R^{14}$ is PO$_4$M$^1$$_2$. In some embodiments, $R^{14}$ is PO$_4$M$^1$H. In some embodiments, $R^{14}$ is PO$_4$M$^2$. In some embodiments, $R^{14}$ is C(O)NHOH. In some embodiments, $R^{14}$ is NH$_2$. In some embodiments, $R^{14}$ is NHR. In some embodiments, $R^{14}$ is N(R)$_2$. In some embodiments, $R^{14}$ is NO$_2$. In some embodiments, $R^{14}$ is COOR. In some embodiments, $R^{14}$ is CHO. In some embodiments, $R^{14}$ is CH$_2$OH. In some embodiments, $R^{14}$ is OH. In some embodiments, $R^{14}$ is OR. In some embodiments, $R^{14}$ is SH. In some embodiments, $R^{14}$ is SR. In some embodiments, $R^{14}$ is C(O)N(R)$_2$. In some embodiments, $R^{14}$ is C(O)NHR. In some embodiments, $R^{14}$ is C(O)NH$_2$. In some embodiments, $R^{14}$ is halide. In some embodiments, $R^{14}$ is tosylate. In some embodiments, $R^{14}$ is mesylate. In some embodiments, $R^{14}$ is SO$_2$NHR. In some embodiments, $R^{14}$ is triflate. In some embodiments, $R^{14}$ is isocyanate. In some embodiments, $R^{14}$ is cyanate. In some embodiments, $R^{14}$ is thiocyanate. In some embodiments, $R^{14}$ is isothiocyanate. In some embodiments, $R^{14}$ is R. In some embodiments, $R^{14}$ is cyano. In some embodiments, $R^{14}$ is CF$_3$. In some embodiments, $R^{14}$ is Si(OR)$_3$.

In some embodiments, $R^{15}$ is CO$_2$H, CO$_2$M CO$_2$R, SO$_3$H, SO$_3$M$^1$, PO$_3$H$_2$, PO$_3$M$^1$$_2$. PO$_3$M$^1$H, PO$_4$H$_2$, PO$_4$M$^1$$_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano CF$_3$ or Si(OR)$_3$. In some embodiments, $R^{15}$ is CO$_2$H. In some embodiments, $R^{15}$ is CO$_2$M$^1$. In some embodiments, $R^{15}$ is CO$_2$R. In some embodiments, $R^{15}$ is SO$_3$H. In some embodiments, $R^{15}$ is SO$_3$M$^1$. In some embodiments, $R^{15}$ is PO$_3$H$_2$. In some embodiments, $R^{15}$ is PO$_3$M$^1$$_2$. In some embodiments, $R^{15}$ is PO$_3$M$^1$H. In some embodiments, $R^{15}$ is PO$_4$H$_2$. In some embodiments, $R^{15}$ is PO$_4$M$^1$$_2$. In some embodiments, $R^{15}$ is PO$_4$M$^1$H. In some embodiments, $R^{15}$ is PO$_4$M$^2$. In some embodiments, $R^{15}$ is C(O)NHOH. In some embodiments, $R^{15}$ is NH$_2$. In some embodiments, $R^{15}$ is NHR. In some embodiments, $R^{15}$ is N(R)$_2$. In some embodiments, $R^{15}$ is NO$_2$. In some embodiments, $R^{15}$ is COOR. In some embodiments, $R^{15}$ is CHO. In some embodiments, $R^{15}$ is CH$_2$OH. In some embodiments, $R^{15}$ is OH. In some embodiments, $R^{15}$ is OR. In some embodiments, $R^{15}$ is SH. In some embodiments, $R^{15}$ is SR. In some embodiments, $R^{15}$ is $C(O)N(R)_2$. In some embodiments, $R^{15}$ is $C(O)NHR$. In some embodiments, $R^{15}$ is $C(O)NH_2$. In some embodiments, $R^{15}$ is halide. In some embodiments, $R^{15}$ is tosylate. In some embodiments, $R^{15}$ is mesylate. In some embodiments, $R^{15}$ is $SO_2NHR$. In some embodiments, $R^{15}$ is triflate. In some embodiments, $R^{15}$ is isocyanate. In some embodiments, $R^{15}$ is cyanate. In some embodiments, $R^{15}$ is thiocyanate. In some embodiments, $R^{15}$ is isothiocyanate. In some embodiments, $R^{15}$ is R. In some embodiments, $R^{15}$ is cyano. In some embodiments, $R^{15}$ is $CF_3$. In some embodiments, $R^{15}$ is $Si(OR)_3$.

In some embodiments, $R^{16}$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{16}$ is $CO_2H$. In some embodiments, $R^{16}$ is $CO_2M^1$. In some embodiments, $R^{16}$ is $CO_2R$. In some embodiments, $R^{16}$ is $SO_3H$. In some embodiments, $R^{16}$ is $SO_3M^1$. In some embodiments, $R^{16}$ is $PO_3H_2$. In some embodiments, $R^{16}$ is $PO_3M^1_2$. In some embodiments, $R^{16}$ is $PO_3M^1H$. In some embodiments, $R^{16}$ is $PO_4H_2$. In some embodiments, $R^{16}$ is $PO_4M^1_2$. In some embodiments, $R^{16}$ is $PO_4M^1H$. In some embodiments, $R^{16}$ is $PO_4M^2$. In some embodiments, $R^{16}$ is $C(O)NHOH$. In some embodiments, $R^{16}$ is $NH_2$. In some embodiments, $R^{16}$ is $NHR$. In some embodiments, $R^{16}$ is $N(R)_2$. In some embodiments, $R^{16}$ is $NO_2$. In some embodiments, $R^{16}$ is $COOR$. In some embodiments, $R^{16}$ is $CHO$. In some embodiments, $R^{16}$ is $CH_2OH$. In some embodiments, $R^{16}$ is $OH$. In some embodiments, $R^{16}$ is $OR$. In some embodiments, $R^{16}$ is $SH$. In some embodiments, $R^{16}$ is $SR$. In some embodiments, $R^{16}$ is $C(O)N(R)_2$. In some embodiments, $R^{16}$ is $C(O)NHR$. In some embodiments, $R^{16}$ is $C(O)NH_2$. In some embodiments, $R^{16}$ is halide. In some embodiments, $R^{16}$ is tosylate. In some embodiments, $R^{16}$ is mesylate. In some embodiments, $R^{16}$ is $SO_2NHR$. In some embodiments, $R^{16}$ is triflate. In some embodiments, $R^{16}$ is isocyanate. In some embodiments, $R^{16}$ is cyanate. In some embodiments, $R^{16}$ is thiocyanate. In some embodiments, $R^{16}$ is isothiocyanate. In some embodiments, $R^{16}$ is R. In some embodiments, $R^{16}$ is cyano. In some embodiments, $R^{16}$ is $CF_3$. In some embodiments, $R^{16}$ is $Si(OR)_3$.

In some embodiments, $R^{17}$ is $CO_2H$, $CO_2M$ $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{17}$ is $CO_2H$. In some embodiments, $R^{17}$ is $CO_2M^1$. In some embodiments, $R^{17}$ is $CO_2R$. In some embodiments, $R^{17}$ is $SO_3H$. In some embodiments, $R^{17}$ is $SO_3M^1$. In some embodiments, $R^{17}$ is $PO_3H_2$. In some embodiments, $R^{17}$ is $PO_3M^1_2$. In some embodiments, $R^{17}$ is $PO_3M^1H$. In some embodiments, $R^{17}$ is $PO_4H_2$. In some embodiments, $R^{17}$ is $PO_4M^1_2$. In some embodiments, $R^{17}$ is $PO_4M^1H$. In some embodiments, $R^{17}$ is $PO_4M^2$. In some embodiments, $R^{17}$ is $C(O)NHOH$. In some embodiments, $R^{17}$ is $NH_2$. In some embodiments, $R^{17}$ is $NHR$. In some embodiments, $R^{17}$ is $N(R)_2$. In some embodiments, $R^{17}$ is $NO_2$. In some embodiments, $R^{17}$ is $COOR$. In some embodiments, $R^{17}$ is $CHO$. In some embodiments, $R^{17}$ is $CH_2OH$. In some embodiments, $R^{17}$ is $OH$. In some embodiments, $R^{17}$ is $OR$. In some embodiments, $R^{17}$ is $SH$. In some embodiments, $R^{17}$ is $SR$. In some embodiments, $R^{17}$ is $C(O)N(R)_2$. In some embodiments, $R^{17}$ is $C(O)NHR$. In some embodiments, $R^{17}$ is $C(O)NH_2$. In some embodiments, $R^{17}$ is halide. In some embodiments, $R^{17}$ is tosylate. In some embodiments, $R^{17}$ is mesylate. In some embodiments, $R^{17}$ is $SO_2NHR$. In some embodiments, $R^{17}$ is triflate. In some embodiments, $R^{17}$ is isocyanate. In some embodiments, $R^{17}$ is cyanate. In some embodiments, $R^{17}$ is thiocyanate. In some embodiments, $R^{17}$ is isothiocyanate. In some embodiments, $R^{17}$ is R. In some embodiments, $R^{17}$ is cyano. In some embodiments, $R^{17}$ is $CF_3$. In some embodiments, $R^{17}$ is $Si(OR)_3$.

In some embodiments, $R^{18}$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{18}$ is $CO_2H$. In some embodiments, $R^{18}$ is $CO_2M^1$. In some embodiments, $R^{18}$ is $CO_2R$. In some embodiments, $R^{18}$ is $SO_3H$. In some embodiments, $R^{18}$ is $SO_3M^1$. In some embodiments, $R^{18}$ is $PO_3H_2$. In some embodiments, $R^{18}$ is $PO_3M^1_2$. In some embodiments, $R^{18}$ is $PO_3M^1H$. In some embodiments, $R^{18}$ is $PO_4H_2$. In some embodiments, $R^{18}$ is $PO_4M^1_2$. In some embodiments, $R^{18}$ is $PO_4M^1H$. In some embodiments, $R^{18}$ is $PO_4M^2$. In some embodiments, $R^{18}$ is $C(O)NHOH$. In some embodiments, $R^{18}$ is $NH_2$. In some embodiments, $R^{18}$ is $NHR$. In some embodiments, $R^{18}$ is $N(R)_2$. In some embodiments, $R^{18}$ is $NO_2$. In some embodiments, $R^{18}$ is $COOR$. In some embodiments, $R^{18}$ is $CHO$. In some embodiments, $R^{18}$ is $CH_2OH$. In some embodiments, $R^{18}$ is $OH$. In some embodiments, $R^{18}$ is $OR$. In some embodiments, $R^{18}$ is $SH$. In some embodiments, $R^{18}$ is $SR$. In some embodiments, $R^{18}$ is $C(O)N(R)_2$. In some embodiments, $R^{18}$ is $C(O)NHR$. In some embodiments, $R^{18}$ is $C(O)NH_2$. In some embodiments, $R^{18}$ is halide. In some embodiments, $R^{18}$ is tosylate. In some embodiments, $R^{18}$ is mesylate. In some embodiments, $R^{18}$ is $SO_2NHR$. In some embodiments, $R^{18}$ is triflate. In some embodiments, $R^{18}$ is isocyanate. In some embodiments, $R^{18}$ is cyanate. In some embodiments, $R^{18}$ is thiocyanate. In some embodiments, $R^{18}$ is isothiocyanate. In some embodiments, $R^{18}$ is R. In some embodiments, $R^{18}$ is cyano. In some embodiments, $R^{13}$ is $CF_3$. In some embodiments, $R^{13}$ is $Si(OR)_3$.

In some embodiments, $R^{19}$ is $CO_2H$, $CO_2M$ $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{19}$ is $CO_2H$. In some embodiments, $R^{19}$ is $CO_2M^1$. In some embodiments, $R^{19}$ is $CO_2R$. In some embodiments, $R^{19}$ is $SO_3H$. In some embodiments, $R^{19}$ is $SO_3M^1$. In some embodiments, $R^{19}$ is $PO_3H_2$. In some embodiments, $R^{19}$ is $PO_3M^1_2$. In some embodiments, $R^{19}$ is $PO_3M^1H$. In some embodiments, $R^{19}$ is $PO_4H_2$. In some embodiments, $R^{19}$ is $PO_4M^1_2$. In some embodiments, $R^{19}$ is $PO_4M^1H$. In some embodiments, $R^{19}$ is $PO_4M^2$. In some embodiments, $R^{19}$ is $C(O)NHOH$. In some embodiments, $R^{19}$ is $NH_2$. In some embodiments, $R^{19}$ is $NHR$. In some embodiments, $R^{19}$ is $N(R)_2$. In some embodiments, $R^{19}$ is $NO_2$. In some embodiments, $R^{19}$ is $COOR$. In some embodiments, $R^{19}$ is $CHO$. In some embodiments, $R^{19}$ is $CH_2OH$. In some embodiments, $R^{19}$ is $OH$. In some embodiments, $R^{19}$ is $OR$. In some embodiments, $R^{19}$ is $SH$. In some embodiments, $R^{19}$ is $SR$. In some embodiments, $R^{19}$ is $C(O)N(R)_2$. In some embodiments, $R^{19}$ is $C(O)NHR$. In some embodiments, $R^{19}$ is $C(O)NH_2$. In some embodiments, $R^{19}$ is halide. In some embodiments, $R^{19}$ is tosylate. In some embodiments, $R^{19}$ is mesylate. In some embodiments, $R^{19}$ is $SO_2NHR$. In some embodiments, $R^{19}$ is triflate. In some embodiments, $R^{19}$ is isocyanate. In some embodiments, $R^{19}$ is cyanate. In some embodiments, $R^{19}$ is thiocyanate. In some embodiments, $R^{19}$ is isothiocyanate. In some embodiments, $R^{19}$ is R. In some embodiments, $R^{19}$ is cyano. In some embodiments, $R^{19}$ is $CF_3$. In some embodiments, $R^{19}$ is $Si(OR)_3$.

In some embodiments, $R^{20}$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{20}$ is $CO_2H$. In some embodiments, $R^{20}$ is $CO_2M^1$. In some embodiments, $R^{20}$ is $CO_2R$. In some embodiments, $R^{20}$ is $SO_3H$. In some embodiments, $R^{20}$ is $SO_3M^1$. In some embodiments, $R^{20}$ is $PO_3H_2$. In some embodiments, $R^{20}$ is $PO_3M^1{}_2$. In some embodiments, $R^{20}$ is $PO_3M^1H$. In some embodiments, $R^{20}$ is $PO_4H_2$. In some embodiments, $R^{20}$ is $PO_4M^1{}_2$. In some embodiments, $R^{20}$ is $PO_4M^1H$. In some embodiments, $R^{20}$ is $PO_4M^2$. In some embodiments, $R^{20}$ is $C(O)NHOH$. In some embodiments, $R^{20}$ is $NH_2$. In some embodiments, $R^{20}$ is $NHR$. In some embodiments, $R^{20}$ is $N(R)_2$. In some embodiments, $R^{20}$ is $NO_2$. In some embodiments, $R^{20}$ is $COOR$. In some embodiments, $R^{20}$ is $CHO$. In some embodiments, $R^{20}$ is $CH_2OH$. In some embodiments, $R^{20}$ is $OH$. In some embodiments, $R^{20}$ is $OR$. In some embodiments, $R^{13}$ is $SH$. In some embodiments, $R^{20}$ is $SR$. In some embodiments, $R^{20}$ is $C(O)N(R)_2$. In some embodiments, $R^{20}$ is $C(O)NHR$. In some embodiments, $R^{20}$ is $C(O)NH_2$. In some embodiments, $R^{20}$ is halide. In some embodiments, $R^{20}$ is tosylate. In some embodiments, $R^{20}$ is mesylate. In some embodiments, $R^{20}$ is $SO_2NHR$. In some embodiments, $R^{20}$ is triflate. In some embodiments, $R^{20}$ is isocyanate. In some embodiments, $R^{20}$ is cyanate. In some embodiments, $R^{20}$ is thiocyanate. In some embodiments, $R^{20}$ is isothiocyanate. In some embodiments, $R^{20}$ is R. In some embodiments, $R^{20}$ is cyano. In some embodiments, $R^{20}$ is $CF_3$. In some embodiments, $R^{20}$ is $Si(OR)_3$.

In some embodiments, $R^{21}$ is $CO_2H$, $CO_2H$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{21}$ is $CO_2H$. In some embodiments, $R^{21}$ is $CO_2M^1$. In some embodiments, $R^{21}$ is $CO_2R$. In some embodiments, $R^{21}$ is $SO_3H$. In some embodiments, $R^{21}$ is $SO_3M^1$. In some embodiments, $R^{21}$ is $PO_3H_2$. In some embodiments, $R^{21}$ is $PO_3M^1{}_2$. In some embodiments, $R^{21}$ is $PO_3M^1H$. In some embodiments, $R^{21}$ is $PO_4H_2$. In some embodiments, $R^{21}$ is $PO_4M^1{}_2$. In some embodiments, $R^{21}$ is $PO_4M^1H$. In some embodiments, $R^{21}$ is $PO_4M^2$. In some embodiments, $R^{21}$ is $C(O)NHOH$. In some embodiments, $R^{21}$ is $NH_2$. In some embodiments, $R^{21}$ is $NHR$. In some embodiments, $R^{21}$ is $N(R)_2$. In some embodiments, $R^{21}$ is $NO_2$. In some embodiments, $R^{21}$ is $COOR$. In some embodiments, $R^{21}$ is $CHO$. In some embodiments, $R^{21}$ is $CH_2OH$. In some embodiments, $R^{21}$ is $OH$. In some embodiments, $R^{21}$ is $OR$. In some embodiments, $R^{13}$ is $SH$. In some embodiments, $R^{21}$ is $SR$. In some embodiments, $R^{21}$ is $C(O)N(R)_2$. In some embodiments, $R^{21}$ is $C(O)NHR$. In some embodiments, $R^{21}$ is $C(O)NH_2$. In some embodiments, $R^{21}$ is halide. In some embodiments, $R^{21}$ is tosylate. In some embodiments, $R^{21}$ is mesylate. In some embodiments, $R^{21}$ is $SO_2NHR$. In some embodiments, $R^{21}$ is triflate. In some embodiments, $R^{21}$ is isocyanate. In some embodiments, $R^{21}$ is cyanate. In some embodiments, $R^{21}$ is thiocyanate. In some embodiments, $R^{21}$ is isothiocyanate. In some embodiments, $R^{21}$ is R. In some embodiments, $R^{21}$ is cyano. In some embodiments, $R^{21}$ is $CF_3$. In some embodiments, $R^{21}$ is $Si(OR)_3$.

In some embodiments, $R^{22}$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{22}$ is $CO_2H$. In some embodiments, $R^{22}$ is $CO_2M^1{}_2$. In some embodiments, $R^{22}$ is $CO_2R$. In some embodiments, $R^{22}$ is $SO_3H$. In some embodiments, $R^{22}$ is $SO_3M^1$. In some embodiments, $R^{22}$ is $PO_3H_2$. In some embodiments, $R_{22}$ is $PO_3M^1{}_2$. In some embodiments, $R^{22}$ is $PO_3M^1H$. In some embodiments, $R^{22}$ is $PO_4H_2$. In some embodiments, $R^{22}$ is $PO_4M^1{}_2$. In some embodiments, $R^{22}$ is $PO_4M^1H$. In some embodiments, $R^{22}$ is $PO_4M^2$. In some embodiments, $R^{22}$ is $C(O)NHOH$. In some embodiments, $R^{22}$ is $NH_2$. In some embodiments, $R^{22}$ is $NHR$. In some embodiments, $R^{22}$ is $N(R)_2$. In some embodiments, $R^{22}$ is $NO_2$. In some embodiments, $R^{22}$ is $COOR$. In some embodiments, $R^{22}$ is $CHO$. In some embodiments, $R^{22}$ is $CH_2OH$. In some embodiments, $R^{22}$ is $OH$. In some embodiments, $R^{22}$ is $OR$. In some embodiments, $R^{22}$ is $SH$. In some embodiments, $R^{22}$ is $SR$. In some embodiments, $R^{22}$ is $C(O)N(R)_2$. In some embodiments, $R^{22}$ is $C(O)NHR$. In some embodiments, $R^{22}$ is $C(O)NH_2$. In some embodiments, $R^{22}$ is halide. In some embodiments, $R^{22}$ is tosylate. In some embodiments, $R^{22}$ is mesylate. In some embodiments, $R^{22}$ is $SO_2NHR$. In some embodiments, $R^{22}$ is triflate. In some embodiments, $R^{22}$ is isocyanate. In some embodiments, $R^{22}$ is cyanate. In some embodiments, $R^{22}$ is thiocyanate. In some embodiments, $R^{22}$ is isothiocyanate. In some embodiments, $R^{22}$ is R. In some embodiments, $R^{22}$ is cyano. In some embodiments, $R^{22}$ is $CF_3$. In some embodiments, $R^{22}$ is $Si(OR)_3$.

In some embodiments, $R^{101}$ is $CO_2H$, $CO_2MCO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{101}$ is $CO_2H$. In some embodiments, $R^{101}$ is $CO_2M^1$. In some embodiments, $R^{101}$ is $CO_2R$. In some embodiments, $R^{101}$ is $SO_3H$. In some embodiments, $R^{101}$ is $SO_3M^1$. In some embodiments, $R^{101}$ is $PO_3H_2$. In some embodiments, $R^{101}$ is $PO_3M^1{}_2$. In some embodiments, $R^{101}$ is $PO_3M^1H$. In some embodiments, $R^{101}$ is $PO_4H_2$. In some embodiments, $R^{101}$ is $PO_4M^1{}_2$. In some embodiments, $R^{101}$ is $PO_4M^1H$. In some embodiments, $R^{101}$ is $PO_4M^2$. In some embodiments, $R^{101}$ is $C(O)NHOH$. In some embodiments, $R^{101}$ is $NH_2$. In some embodiments, $R^{101}$ is $NHR$. In some embodiments, $R^{101}$ is $N(R)_2$. In some embodiments, $R^{101}$ is $NO_2$. In some embodiments, $R^{101}$ is $COOR$. In some embodiments, $R^{101}$ is $CHO$. In some embodiments, $R^{101}$ is $CH_2OH$. In some embodiments, $R^{101}$ is $OH$. In some embodiments, $R^{101}$ is $OR$. In some embodiments, $R^{101}$ is $SH$. In some embodiments, $R^{101}$ is $SR$. In some embodiments, $R^{101}$ is $C(O)N(R)_2$. In some embodiments, $R^{101}$ is $C(O)NHR$. In some embodiments, $R^{101}$ is $C(O)NH_2$. In some embodiments, $R^{101}$ is halide. In some embodiments, $R^{101}$ is tosylate. In some embodiments, $R^{101}$ is mesylate. In some embodiments, $R^{101}$ is $SO_2NHR$. In some embodiments, $R^{101}$ is triflate. In some embodiments, $R^{101}$ is isocyanate. In some embodiments, $R^{101}$ is cyanate. In some embodiments, $R^{101}$ is thiocyanate. In some embodiments, $R^{101}$ is isothiocyanate. In some embodiments, $R^{101}$ is R. In some embodiments, $R^{101}$ is cyano. In some embodiments, $R^{101}$ is $CF_3$. In some embodiments, $R^{101}$ is $Si(OR)_3$.

In some embodiments, $R^{102}$ is $CO_2H$, $CO_2MCO_2R$, $SO_3H$, $SO_3M^1$, $PO_3H_2$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{102}$ is $CO_2H$. In some embodiments, $R^{102}$ is $CO_2M^1$. In some embodiments, $R^{102}$ is $CO_2R$. In some embodiments, $R^{102}$ is $SO_3H$. In some embodiments, $R^{102}$ is $SO_3M^1$. In some embodiments, $R^{102}$ is $PO_3H_2$. In some embodiments, $R^{102}$ is $PO_3M^1{}_2$. In some embodiments, $R^{102}$ is $PO_3M^1H$. In some embodiments, $R^{102}$ is $PO_4H_2$. In some embodiments, $R^{102}$ is $PO_4M^1{}_2$. In some embodiments, $R^{102}$ is $PO_4M^1H$. In some embodiments, $R^{102}$ is $PO_4M^2$. In some embodiments, $R^{102}$ is $C(O)NHOH$. In some embodiments, $R^{102}$ is $NH_2$. In some embodiments, $R^{102}$ is NHR. In some embodiments, $R^{102}$ is $N(R)_2$. In some embodiments, $R^{102}$ is $NO_2$. In some embodiments, $R^{102}$ is COOR. In some embodiments, $R^{102}$ is CHO. In some embodiments, $R^{102}$ is $CH_2OH$. In some embodiments, $R^{102}$ is OH. In some embodiments, $R^{102}$ is OR. In some embodiments, $R^{102}$ is SH. In some embodiments, $R^{102}$ is SR. In some embodiments, $R^{102}$ is $C(O)N(R)_2$. In some embodiments, $R^{102}$ is $C(O)NHR$. In some embodiments, $R^{102}$ is $C(O)NH_2$. In some embodiments, $R^{102}$ is halide. In some embodiments, $R^{102}$ is tosylate. In some embodiments, $R^{102}$ is mesylate. In some embodiments, $R^{102}$ is $SO_2NHR$. In some embodiments, $R^{102}$ is triflate. In some embodiments, $R^{102}$ is isocyanate. In some embodiments, $R^{102}$ is cyanate. In some embodiments, $R^{102}$ is thiocyanate. In some embodiments, $R^{102}$ is isothiocyanate. In some embodiments, $R^{102}$ is R. In some embodiments, $R^{102}$ is cyano. In some embodiments, $R^{102}$ is $CF_3$. In some embodiments, $R^{102}$ is $Si(OR)_3$.

In some embodiments, $R^{104}$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{104}$ is $CO_2H$. In some embodiments, $R^{104}$ is $CO_2M^1$. In some embodiments, $R^{104}$ is $CO_2R$. In some embodiments, $R^{104}$ is $SO_3H$. In some embodiments, $R^{104}$ is $SO_3M^1$. In some embodiments, $R^{104}$ is $PO_3H_2$. In some embodiments, $R^{104}$ is $PO_3M^1{}_2$. In some embodiments, $R^{104}$ is $PO_3M^1H$. In some embodiments, $R^{104}$ is $PO_4H_2$. In some embodiments, $R^{104}$ is $PO_4M^1{}_2$. In some embodiments, $R^{104}$ is $PO_4M^1H$. In some embodiments, $R^{104}$ is $PO_4M^2$. In some embodiments, $R^{104}$ is $C(O)NHOH$. In some embodiments, $R^{104}$ is $NH_2$. In some embodiments, $R^{104}$ is NHR. In some embodiments, $R^{104}$ is $N(R)_2$. In some embodiments, $R^{104}$ is $NO_2$. In some embodiments, $R^{104}$ is COOR. In some embodiments, $R^{104}$ is CHO. In some embodiments, $R^{104}$ is $CH_2OH$. In some embodiments, $R^{104}$ is OH. In some embodiments, $R^{104}$ is OR. In some embodiments, $R^{104}$ is SH. In some embodiments, $R^{104}$ is SR. In some embodiments, $R^{104}$ is $C(O)N(R)_2$. In some embodiments, $R^{104}$ is $C(O)NHR$. In some embodiments, $R^{104}$ is $C(O)NH_2$. In some embodiments, $R^{104}$ is halide. In some embodiments, $R^{104}$ is tosylate. In some embodiments, $R^{104}$ is mesylate. In some embodiments, $R^{104}$ is $SO_2NHR$. In some embodiments, $R^{104}$ is triflate. In some embodiments, $R^{104}$ is isocyanate. In some embodiments, $R^{104}$ is cyanate. In some embodiments, $R^{104}$ is thiocyanate. In some embodiments, $R^{104}$ is isothiocyanate. In some embodiments, $R^{104}$ is R. In some embodiments, $R^{104}$ is cyano. In some embodiments, $R^{104}$ is $CF_3$. In some embodiments, $R^{104}$ is $Si(OR)_3$.

In some embodiments, $R^{105}$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{105}$ is $CO_2H$. In some embodiments, $R^{105}$ is $CO_2M^1$. In some embodiments, $R^{105}$ is $CO_2R$. In some embodiments, $R^{105}$ is $SO_3H$. In some embodiments, $R^{105}$ is $SO_3M^1$. In some embodiments, $R^{105}$ is $PO_3H_2$. In some embodiments, $R^{105}$ is $PO_3M^1{}_2$. In some embodiments, $R^{105}$ is $PO_3M^1H$. In some embodiments, $R^{105}$ is $PO_4H_2$. In some embodiments, $R^{105}$ is $PO_4M^1{}_2$. In some embodiments, $R^{105}$ is $PO_4M^1H$. In some embodiments, $R^{105}$ is $PO_4M^2$. In some embodiments, $R^{105}$ is $C(O)NHOH$. In some embodiments, $R^{105}$ is $NH_2$. In some embodiments, $R^{105}$ is NHR. In some embodiments, $R^{105}$ is $N(R)_2$. In some embodiments, $R^{105}$ is $NO_2$. In some embodiments, $R^{105}$ is COOR. In some embodiments, $R^{105}$ is CHO. In some embodiments, $R^{105}$ is $CH_2OH$. In some embodiments, $R^{105}$ is OH. In some embodiments, $R^{105}$ is OR. In some embodiments, $R^{105}$ is SH. In some embodiments, $R^{105}$ is SR. In some embodiments, $R^{105}$ is $C(O)N(R)_2$. In some embodiments, $R^{105}$ is $C(O)NHR$. In some embodiments, $R^{105}$ is $C(O)NH_2$. In some embodiments, $R^{105}$ is halide. In some embodiments, $R^{105}$ is tosylate. In some embodiments, $R^{105}$ is mesylate. In some embodiments, $R^{105}$ is $SO_2NHR$. In some embodiments, $R^{105}$ is triflate. In some embodiments, $R^{105}$ is isocyanate. In some embodiments, $R^{105}$ is cyanate. In some embodiments, $R^{105}$ is thiocyanate. In some embodiments, $R^{105}$ is isothiocyanate. In some embodiments, $R^{105}$ is R. In some embodiments, $R^{105}$ is cyano. In some embodiments, $R^{105}$ is $CF_3$. In some embodiments, $R^{105}$ is $Si(OR)_3$.

In some embodiments, $R^{106}$ is $CO_2H$, $CO_2M$ $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{106}$ is $CO_2H$. In some embodiments, $R^{106}$ is $CO_2M^1$. In some embodiments, $R^{106}$ is $CO_2R$. In some embodiments, $R^{106}$ is $SO_3H$. In some embodiments, $R^{106}$ is $SO_3M^1$. In some embodiments, $R^{106}$ is $PO_3H_2$. In some embodiments, $R^{106}$ is $PO_3M^1{}_2$. In some embodiments, $R^{106}$ is $PO_3M^1H$. In some embodiments, $R^{106}$ is $PO_4H_2$. In some embodiments, $R^{106}$ is $PO_4M^1{}_2$. In some embodiments, $R^{106}$ is $PO_4M^1H$. In some embodiments, $R^{106}$ is $PO_4M^2$. In some embodiments, $R^{106}$ is $C(O)NHOH$. In some embodiments, $R^{106}$ is $NH_2$. In some embodiments, $R^{106}$ is NHR. In some embodiments, $R^{106}$ is $N(R)_2$. In some embodiments, $R^{106}$ is $NO_2$. In some embodiments, $R^{106}$ is COOR. In some embodiments, $R^{106}$ is CHO. In some embodiments, $R^{106}$ is $CH_2OH$. In some embodiments, $R^{106}$ is OH. In some embodiments, $R^{106}$ is OR. In some embodiments, $R^{106}$ is SH. In some embodiments, $R^{106}$ is SR. In some embodiments, $R^{106}$ is $C(O)N(R)_2$. In some embodiments, $R^{106}$ is $C(O)NHR$. In some embodiments, $R^{106}$ is $C(O)NH_2$. In some embodiments, $R^{106}$ is halide. In some embodiments, $R^{106}$ is tosylate. In some embodiments, $R^{106}$ is mesylate. In some embodiments, $R^{106}$ is $SO_2NHR$. In some embodiments, $R^{106}$ is triflate. In some embodiments, $R^{106}$ is isocyanate. In some embodiments, $R^{106}$ is cyanate. In some embodiments, $R^{106}$ is thiocyanate. In some embodiments, $R^{106}$ is isothiocyanate. In some embodiments, $R^{106}$ is R. In some embodiments, $R^{106}$ is cyano. In some embodiments, $R^{106}$ is $CF_3$. In some embodiments, $R^{106}$ is $Si(OR)_3$.

In some embodiments, $T^1$ is H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^1$ is H. In some embodiments, $T^1$ is $CO_2H$. In some embodiments, $T^1$ is $CO_2M^1$. In some embodiments, $T^1$ is $CO_2R$. In some embodiments, $T^1$ is $SO_3H$. In some embodiments, $T^1$ is $SO_3M^1$. In some embodiments, $T^1$ is $PO_3H_2$. In some embodiments, $T^1$ is $PO_3M^1_2$. In some embodiments, $T^1$ is $PO_3M^1H$. In some embodiments, $T^1$ is $PO_4H_2$. In some embodiments, $T^1$ is $PO_4M^1_2$. In some embodiments, $T^1$ is $PO_4M^1H$. In some embodiments, $T^1$ is $PO_4M^2$. In some embodiments, $T^1$ is $C(O)NHOH$. In some embodiments, $T^1$ is $NH_2$. In some embodiments, $T^1$ is NHR. In some embodiments, $T^1$ is $N(R)_2$. In some embodiments, $T^1$ is $NO_2$. In some embodiments, $T^1$ is COOR. In some embodiments, $T^1$ is CHO. In some embodiments, $T^1$ is $CH_2OH$. In some embodiments, $T^1$ is OH. In some embodiments, $T^1$ is OR. In some embodiments, $T^1$ is SH. In some embodiments, $T^1$ is SR. In some embodiments, $T^1$ is $C(O)N(R)_2$. In some embodiments, $T^1$ is C(O)NHR. In some embodiments, $T^1$ is $C(O)NH_2$. In some embodiments, $T^1$ is halide. In some embodiments, $T^1$ is tosylate. In some embodiments, $T^1$ is mesylate. In some embodiments, $T^1$ is $SO_2NHR$. In some embodiments, $T^1$ is triflate. In some embodiments, $T^1$ is isocyanate. In some embodiments, $T^1$ is cyanate. In some embodiments, $T^1$ is thiocyanate. In some embodiments, $T^1$ is isothiocyanate. In some embodiments, $T^1$ is R. In some embodiments, $T^1$ is cyano. In some embodiments, $T^1$ is $CF_3$. In some embodiments, $T^1$ is $Si(OR)_3$.

In some embodiments, $T^2$ is H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^2$ is H. In some embodiments, $T^2$ is $CO_2H$. In some embodiments, $T^2$ is $CO_2M^1$. In some embodiments, $T^2$ is $CO_2R$. In some embodiments, $T^2$ is $SO_3H$. In some embodiments, $T^2$ is $SO_3M^1$. In some embodiments, $T^2$ is $PO_3H_2$. In some embodiments, $T^2$ is $PO_3M^1_2$. In some embodiments, $T^2$ is $PO_3M^1H$. In some embodiments, $T^2$ is $PO_4H_2$. In some embodiments, $T^2$ is $PO_4M^1_2$. In some embodiments, $T^2$ is $PO_4M^1H$. In some embodiments, $T^2$ is $PO_4M^2$. In some embodiments, $T^2$ is $C(O)NHOH$. In some embodiments, $T^2$ is $NH_2$. In some embodiments, $T^2$ is NHR. In some embodiments, $T^2$ is $N(R)_2$. In some embodiments, $T^2$ is $NO_2$. In some embodiments, $T^2$ is COOR. In some embodiments, $T^2$ is CHO. In some embodiments, $T^2$ is $CH_2OH$. In some embodiments, $T^2$ is OH. In some embodiments, $T^2$ is OR. In some embodiments, $T^2$ is SH. In some embodiments, $T^2$ is SR. In some embodiments, $T^2$ is $C(O)N(R)_2$. In some embodiments, $T^2$ is C(O)NHR. In some embodiments, $T^2$ is $C(O)NH_2$. In some embodiments, $T^2$ is halide. In some embodiments, $T^2$ is tosylate. In some embodiments, $T^2$ is mesylate. In some embodiments, $T^2$ is $SO_2NHR$. In some embodiments, $T^2$ is triflate. In some embodiments, $T^2$ is isocyanate. In some embodiments, $T^2$ is cyanate. In some embodiments, $T^2$ is thiocyanate. In some embodiments, $T^2$ is isothiocyanate. In some embodiments, $T^2$ is R. In some embodiments, $T^2$ is cyano. In some embodiments, $T^2$ is $CF_3$. In some embodiments, $T^2$ is $Si(OR)_3$.

In some embodiments, $T^3$ is H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^3$ is H. In some embodiments, $T^3$ is $CO_2H$. In some embodiments, $T^3$ is $CO_2M^1$. In some embodiments, $T^3$ is $CO_2R$. In some embodiments, $T^3$ is $SO_3H$. In some embodiments, $T^3$ is $SO_3M^1$. In some embodiments, $T^3$ is $PO_3H_2$. In some embodiments, $T^3$ is $PO_3M^1_2$. In some embodiments, $T^3$ is $PO_3M^1H$. In some embodiments, $T^3$ is $PO_4H_2$. In some embodiments, $T^3$ is $PO_4M^1_2$. In some embodiments, $T^3$ is $PO_4M^1H$. In some embodiments, $T^3$ is $PO_4M^2$. In some embodiments, $T^3$ is $C(O)NHOH$. In some embodiments, $T^3$ is $NH_2$. In some embodiments, $T^3$ is NHR. In some embodiments, $T^3$ is $N(R)_2$. In some embodiments, $T^3$ is $NO_2$. In some embodiments, $T^3$ is COOR. In some embodiments, $T^3$ is CHO. In some embodiments, $T^3$ is $CH_2OH$. In some embodiments, $T^3$ is OH. In some embodiments, $T^3$ is OR. In some embodiments, $T^3$ is SH. In some embodiments, $T^3$ is SR. In some embodiments, $T^3$ is $C(O)N(R)_2$. In some embodiments, $T^3$ is C(O)NHR. In some embodiments, $T^3$ is $C(O)NH_2$. In some embodiments, $T^3$ is halide. In some embodiments, $T^3$ is tosylate. In some embodiments, $T^3$ is mesylate. In some embodiments, $T^3$ is $SO_2NHR$. In some embodiments, $T^3$ is triflate. In some embodiments, $T^3$ is isocyanate. In some embodiments, $T^3$ is cyanate. In some embodiments, $T^3$ is thiocyanate. In some embodiments, $T^3$ is isothiocyanate. In some embodiments, $T^3$ is R. In some embodiments, $T^3$ is cyano. In some embodiments, $T^3$ is $CF_3$. In some embodiments, $T^3$ is $Si(OR)_3$.

In some embodiments, $T^4$ is H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^4$ is H. In some embodiments, $T^4$ is $CO_2H$. In some embodiments, $T^4$ is $CO_2M^1$. In some embodiments, $T^4$ is $CO_2R$. In some embodiments, $T^4$ is $SO_3H$. In some embodiments, $T^4$ is $SO_3M^1$. In some embodiments, $T^4$ is $PO_3H_2$. In some embodiments, $T^4$ is $PO_3M^1_2$. In some embodiments, $T^4$ is $PO_3M^1H$. In some embodiments, $T^4$ is $PO_4H_2$. In some embodiments, $T^4$ is $PO_4M^1_2$. In some embodiments, $T^4$ is $PO_4M^1H$. In some embodiments, $T^4$ is $PO_4M^2$. In some embodiments, $T^4$ is $C(O)NHOH$. In some embodiments, $T^4$ is $NH_2$. In some embodiments, $T^4$ is NHR. In some embodiments, $T^4$ is $N(R)_2$. In some embodiments, $T^4$ is $NO_2$. In some embodiments, $T^4$ is COOR. In some embodiments, $T^4$ is CHO. In some embodiments, $T^4$ is $CH_2OH$. In some embodiments, $T^4$ is OH. In some embodiments, $T^4$ is OR. In some embodiments, $T^3$ is SH. In some embodiments, $T^4$ is SR. In some embodiments, $T^4$ is $C(O)N(R)_2$. In some embodiments, $T^4$ is C(O)NHR. In some embodiments, $T^4$ is $C(O)NH_2$. In some embodiments, $T^4$ is halide. In some embodiments, $T^4$ is tosylate. In some embodiments, $T^4$ is mesylate. In some embodiments, $T^4$ is $SO_2NHR$. In some embodiments, $T^4$ is triflate. In some embodiments, $T^4$ is isocyanate. In some embodiments, $T^4$ is cyanate. In some embodiments, $T^4$ is thiocyanate. In some embodiments, $T^4$ is isothiocyanate. In some embodiments, $T^4$ is R. In some embodiments, $T^4$ is cyano. In some embodiments, $T^4$ is $CF_3$. In some embodiments, $T^4$ is $Si(OR)_3$.

In some embodiments, $T^5$ is H, $CO_2H$, $CO_2M^1$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, COOR, CHO, $CH_2OH$, OH, OR, SH, SR, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^5$ is H. In some embodiments, $T^5$ is $CO_2H$. In some embodiments, $T^5$ is $CO_2M^1$. In some embodiments, $T^5$ is $CO_2R$. In some embodiments, $T^5$ is $SO_3H$. In some embodiments, $T^5$ is $SO_3M^1$. In some embodiments, $T^5$ is $PO_3H_2$. In some embodiments, $T^5$ is $PO_3M^1_2$. In some embodiments, $T^5$ is $PO_3M^1H$. In some embodiments, $T^5$ is $PO_4H_2$. In some embodiments, $T^5$ is $PO_4M^1_2$. In some embodiments, $T^5$ is $PO_4M^1H$. In some embodiments, $T^5$ is $PO_4M^2$. In some embodiments, $T^5$ is $C(O)NHOH$. In some embodiments, $T^5$ is $NH_2$. In some embodiments, $T^5$ is NHR. In some embodiments, $T^5$ is $N(R)_2$. In some embodiments, $T^5$ is $NO_2$. In some embodiments, $T^5$ is COOR. In some embodiments, $T^5$ is CHO. In some embodiments, $T^5$ is $CH_2OH$. In some embodiments, $T^5$ is OH. In some embodiments, $T^5$ is OR. In some embodiments, $T^5$ is SH. In some embodiments, $T^5$ is SR. In some embodiments, $T^5$ is $C(O)N(R)_2$. In some embodiments, $T^5$ is $C(O)NHR$. In some embodiments, $T^5$ is $C(O)NH_2$. In some embodiments, $T^5$ is halide. In some embodiments, $T^5$ is tosylate. In some embodiments, $T^5$ is mesylate. In some embodiments, $T^5$ is $SO_2NHR$. In some embodiments, $T^5$ is triflate. In some embodiments, $T^5$ is isocyanate. In some embodiments, $T^5$ is cyanate. In some embodiments, $T^5$ is thiocyanate. In some embodiments, $T^5$ is isothiocyanate. In some embodiments, $T^5$ is R. In some embodiments, $T^5$ is cyano. In some embodiments, $T^5$ is $CF_3$. In some embodiments, $T^5$ is $Si(OR)_3$.

In some embodiments, $T^6$ is H, $CO_2H$, $CO_2M$ $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^6$ is H. In some embodiments, $T^6$ is $CO_2H$. In some embodiments, $T^6$ is $CO_2M^1$. In some embodiments, $T^6$ is $CO_2R$. In some embodiments, $T^6$ is $SO_3H$. In some embodiments, $T^6$ is $SO_3M^1$. In some embodiments, $T^6$ is $PO_3H_2$. In some embodiments, $T^6$ is $PO_3M^1_2$. In some embodiments, $T^6$ is $PO_3M^1H$. In some embodiments, $T^6$ is $PO_4H_2$. In some embodiments, $T^6$ is $PO_4M^1_2$. In some embodiments, $T^6$ is $PO_4M^1H$. In some embodiments, $T^6$ is $PO_4M^2$. In some embodiments, $T^6$ is $C(O)NHOH$. In some embodiments, $T^6$ is $NH_2$. In some embodiments, $T^6$ is NHR. In some embodiments, $T^6$ is $N(R)_2$. In some embodiments, $T^6$ is $NO_2$. In some embodiments, $T^6$ is COOR. In some embodiments, $T^6$ is CHO. In some embodiments, $T^6$ is $CH_2OH$. In some embodiments, $T^6$ is OH. In some embodiments, $T^6$ is OR. In some embodiments, $T^6$ is SH. In some embodiments, $T^6$ is SR. In some embodiments, $T^6$ is $C(O)N(R)_2$. In some embodiments, $T^6$ is $C(O)NHR$. In some embodiments, $T^6$ is $C(O)NH_2$. In some embodiments, $T^6$ is halide. In some embodiments, $T^6$ is tosylate. In some embodiments, $T^6$ is mesylate. In some embodiments, $T^6$ is $SO_2NHR$. In some embodiments, $T^6$ is triflate. In some embodiments, $T^6$ is isocyanate. In some embodiments, $T^6$ is cyanate. In some embodiments, $T^6$ is thiocyanate. In some embodiments, $T^6$ is isothiocyanate. In some embodiments, $T^6$ is R. In some embodiments, $T^6$ is cyano. In some embodiments, $T^6$ is $CF_3$. In some embodiments, $T^6$ is $Si(OR)_3$.

In some embodiments, R is methyl, ethyl, isopropyl, n-propyl, alkyl, haloalkyl, cycloalkyl, heterocycloalkyl, aryl, or benzyl. In some embodiments, R is methyl. In some embodiments, R is ethyl. In some embodiments, R is isopropyl. In some embodiments, R is n-propyl. In some embodiments, R is alkyl. In some embodiments, R is haloalkyl. In some embodiments, R is cycloalkyl. In some embodiments, R is heterocycloalkyl. In some embodiments, R is aryl. In some embodiments, R is benzyl.

In some embodiments, $M^1$ is selected from any alkali metal. In some embodiments, $M^1$ is Li, Na, K, Rb or Cs. In some embodiments, $M^1$ is Li. In some embodiments, $M^1$ is Na. In some embodiments, $M^1$ is K. In some embodiments, $M^1$ is Rb. In some embodiments, $M^1$ is Cs.

In some embodiments, $M^2$ is selected from any alkaline earth metal. In some embodiments, $M^1$ is Be, Mg, Ca, Sr, Ba or Ra. In some embodiments, $M^1$ is Be. In some embodiments, $M^1$ is Mg. In some embodiments, $M^1$ is Ca. In some embodiments, $M^1$ is Sr. In some embodiments, $M^1$ is Ba. In some embodiments, $M^1$ is Ra.

An "alkyl" group refers, in some embodiments, to a saturated aliphatic hydrocarbon, including straight-chain or branched-chain. In some embodiments, alkyl is linear or branched. In some embodiments, alkyl is optionally substituted linear or branched. In some embodiments, alkyl is methyl. In some embodiments alkyl is ethyl. In some embodiments, the alkyl group has 1-20 carbons. In some embodiments, the alkyl group has 1-8 carbons. In some embodiments, the alkyl group has 1-7 carbons. In some embodiments, the alkyl group has 1-6 carbons. In some embodiments, non-limiting examples of alkyl groups include methyl, ethyl, isopropyl, n-propyl, isobutyl, butyl, pentyl or hexyl. In some embodiments, the alkyl group has 1-4 carbons. In some embodiments, the alkyl group may be optionally substituted by one or more groups selected from halide, hydroxy, alkoxy, carboxylic acid, aldehyde, carbonyl, amido, cyano, nitro, amino, alkenyl, alkynyl, aryl, azide, epoxide, ester, acyl chloride and thiol.

A "cycloalkyl" group refers, in some embodiments, to a ring structure comprising carbon atoms as ring atoms, which are saturated, substituted or unsubstituted. In some embodiments the cycloalkyl is a 3-12 membered ring. In some embodiments the cycloalkyl is a 6 membered ring. In some embodiments the cycloalkyl is a 5-7 membered ring. In some embodiments the cycloalkyl is a 3-8 membered ring. In some embodiments, the cycloalkyl group may be unsubstituted or substituted by a halogen, alkyl, haloalkyl, hydroxyl, alkoxy, carbonyl, amido, alkylamido, dialkylamido, cyano, nitro, $CO_2H$, amino, alkylamino, dialkylamino, carboxyl, thio and/or thioalkyl. In some embodiments, the cycloalkyl ring may be fused to another saturated or unsaturated 3-8 membered ring. In some embodiments, the cycloalkyl ring is an unsaturated ring. Non limiting examples of a cycloalkyl group comprise cyclohexyl, cyclohexenyl, cyclopropyl, cyclopropenyl, cyclopentyl, cyclopentenyl, cyclobutyl, cyclobutenyl, cyclooctyl, cyclooctadienyl (COD), cyclooctaene (COE) etc.

A "heterocycloalkyl" group refers in some embodiments, to a ring structure of a cycloalkyl as described herein comprising in addition to carbon atoms, sulfur, oxygen, nitrogen or any combination thereof, as part of the ring. In some embodiments, non-limiting examples of heterocycloalkyl include pyrrolidine, pyrrole, tetrahydrofuran, furan, thiolane, thiophene, imidazole, pyrazole, pyrazolidine, oxazolidine, oxazole, isoxazole, thiazole, isothiazole, thiazolidine, dioxolane, dithiolane, triazole, furazan, oxadiazole, thiadiazole, dithiazole, tetrazole, piperidine, oxane, thiane, pyridine, pyran, thiopyran, piperazine, morpholine, thiomorpholine, dioxane, dithiane, diazine, oxazine, thiazine, dioxine, triazine, and trioxane.

A "crown etheryl" group refers in some embodiments to a cyclic structure that comprises several ether groups. In some embodiments, the cyclic structure comprises a —$CH_2CH_2O$— repeating unit. In some embodiments, the cyclic structure optionally comprises a —$CH_2CH_2NH$— repeating unit. In some embodiments, non-limiting examples of the cyclic structure has between 4-10 repeating units. In some embodiments, the cyclic structure is substituted. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —OCH$_2$Ph, —NHCO-alkyl, COOH, —C(O)Ph, C(O)O-alkyl, C(O)H, or - or —C(O)NH$_2$.

A cyclamyl, cyclenyl, 1,4,7-Triazacyclononanyl, hexacyclenyl, groups refer in some embodiment to cyclic structures that comprise several repeating units that contain alkylamino groups. In some other embodiments, the cyclic structures are substituted. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —OCH$_2$Ph, —NHCO-alkyl, COOH, —C(O)Ph, C(O)O-alkyl, C(O)H, or - or —C(O)NH$_2$.

A "cryptandyl" group refers in some embodiments to a three dimensional structure that comprises several ether and alkylamino groups. In some embodiments, the structure is a [2.2.2]Cryptand: N[$CH_2CH_2OCH_2CH_2OCH_2CH_2$]$_3$N (1,10-diaza-4,7,13,16,21,24-hexaoxabicyclo[8.8.8]hexacosane). In some embodiments, the cyclic structure is substituted. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —OCH$_2$Ph, —NHCO-alkyl, COOH, —C(O)Ph, C(O)O-alkyl, C(O)H, or - or —C(O)NH$_2$.

As used herein, the term "aryl" refers to any aromatic ring that is directly bonded to another group and can be either substituted or unsubstituted. The aryl group can be a sole substituent, or the aryl group can be a component of a larger substituent, such as in an arylalkyl, arylamino, arylamido, etc. Exemplary aryl groups include, without limitation, phenyl, tolyl, xylyl, furanyl, naphthyl, pyridinyl, pyrimidinyl, pyridazinyl, pyrazinyl, triazinyl, thiazolyl, oxazolyl, isooxazolyl, pyrazolyl, imidazolyl, thiophene-yl, pyrrolyl, phenylmethyl, phenylethyl, phenylamino, phenylamido, etc. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —OCH$_2$Ph, —NHCO-alkyl, COOH, —C(O)Ph, C(O)O-alkyl, C(O)H, or - or —C(O)NH$_2$.

In some embodiments, the term "halide" used herein refers to any substituent of the halogen group (group 17). In some embodiments, halide is flouride, chloride, bromide or iodide. In some embodiments, halide is fluoride. In some embodiments, halide is chloride. In some embodiments, halide is bromide. In some embodiments, halide is iodide.

In some embodiments, "haloalkyl" refers to alkyl, alkenyl, alkynyl or cycloalkyl substituted with one or more halide atoms. In some embodiments, haloalkyl is partially halogenated. In some embodiments haloalkyl is perhalogenated (completely halogenated, no C—H bonds). In some embodiments, haloalkyl is $CH_2CF_3$. In some embodiments, haloalkyl is $CH_2CCl_3$. In some embodiments, haloalkyl is $CH_2CBr_3$. In some embodiments, haloalkyl is $CH_2Cl_3$. In some embodiments, haloalkyl is $CF_2CF_3$. In some embodiments, haloalkyl is $CH_2CH_2CF_3$. In some embodiments, haloalkyl is $CH_2CF_2CF_3$. In some embodiments, haloalkyl is $CF_2CF_2CF_3$. In some embodiments, the haloalkyl group may be optionally substituted by one or more groups selected from halide, hydroxy, alkoxy, carboxylic acid, aldehyde, carbonyl, amido, cyano, nitro, amino, alkenyl, alkynyl, aryl, azide, epoxide, ester, acyl chloride and thiol.

In some embodiments, the term "benzyl" used herein refers to a methylene ($CH_2$, CHR or $CR_2$) connected to an "aryl" (described above) moiety. In some embodiments, the methylene is non-substituted ($CH_2$). In some embodiments, the methylene is substituted (CHR or $CR_2$). In some embodiments, the methylene is substituted with alkyl, haloalkyl, cycloalkyl, heterocycloalkyl, aryl, benzyl or any combination of such moieties.

In some embodiments, $X^1$ is S, O or $CH_2$. In some embodiments, $X^1$ is S. In some embodiments, $X^1$ is O. In some embodiments, $X^1$ is $CH_2$.

In some embodiments, $X^2$ is S, O or $CH_2$. In some embodiments, $X^2$ is S. In some embodiments, $X^2$ is O. In some embodiments, $X^2$ is $CH_2$.

In some embodiments, $X^3$ is S, O or $CH_2$. In some embodiments, $X^3$ is S. In some embodiments, $X^3$ is O. In some embodiments, $X^3$ is $CH_2$.

In some embodiments, $X^4$ is S, O or $CH_2$. In some embodiments, $X^4$ is S. In some embodiments, $X^4$ is O. In some embodiments, $X^4$ is $CH_2$.

Figure 5A:
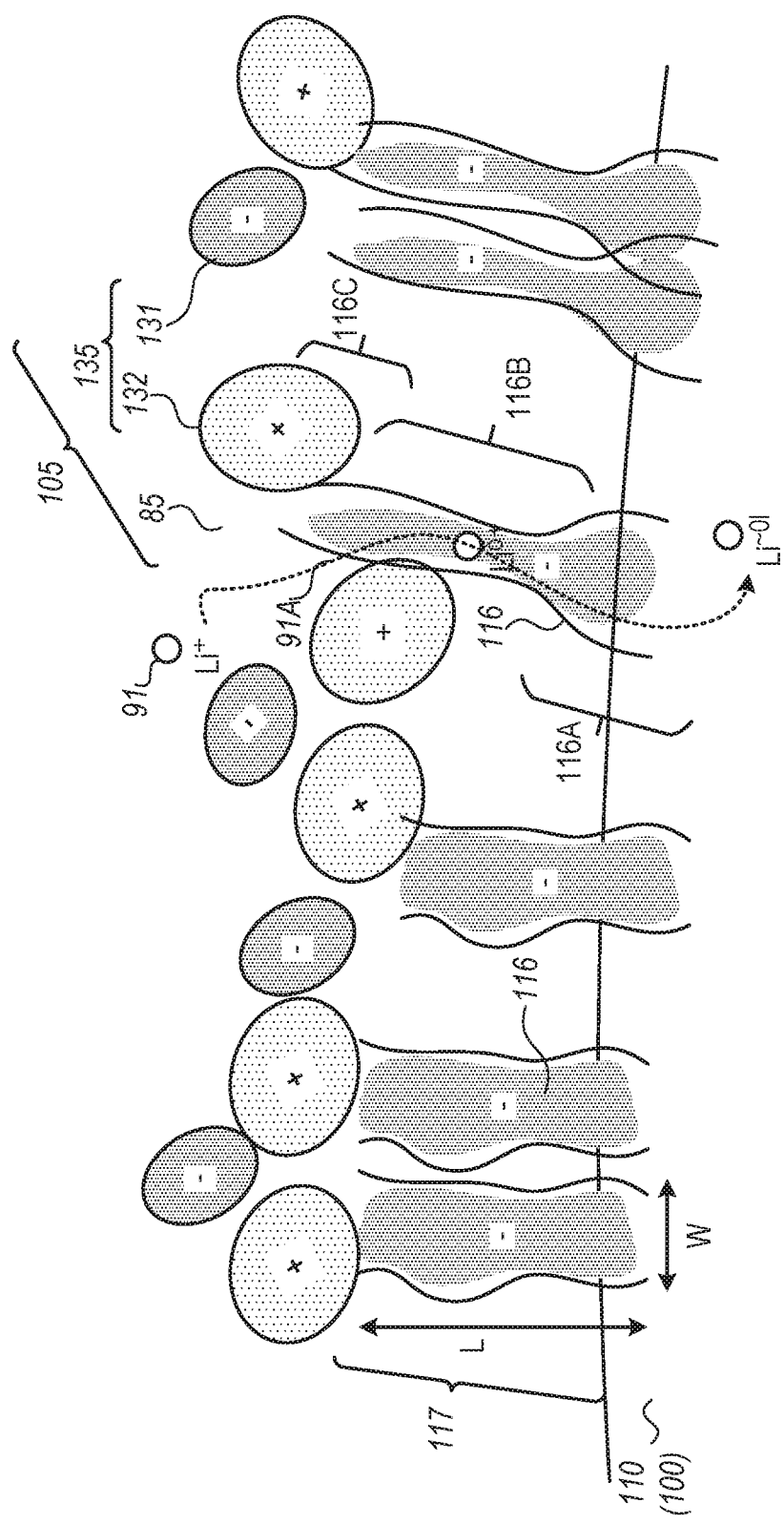
FIG. 5A is a high-level schematic illustration of bonding molecules forming a surface molecular layer on the anode and/or anode active material particles, according to some embodiments of the invention.

FIG. 5A is a high-level schematic illustration of bonding molecules 116 forming a surface molecules layer 117 on anode 100 and/or anode active material particles 110, according to some embodiments of the invention. It is emphasized that FIG. 5A is highly schematic and represents principles for selecting bonding molecules 116, according to some embodiments of the invention. Actual bonding molecules 116 may be selected according to requirements, e.g., from bonding molecules 116 represented by any one of formulas I-VII, under any of their embodiments.

FIG. 5B is a high-level schematic illustration of non-limiting examples for bonding molecules 116, according to some embodiments of the invention. Non-limiting examples for bonding molecules 116 include any of the following: lithium 4-methylbenzenesulfonate, lithium 3,5-dicarboxybenzenesulfonate, lithium sulfate, lithium phosphate, lithium phosphate monobasic, lithium trifluoromethanesulfonate, lithium 4-dodecylbenzenesulfonate, lithium propane-1-sulfonate, lithium 1,1,2,2,3,3,4,4,5,5,6,6,7,7,8,8,8-heptadecafluorooctane-1-sulfonate, lithium 2,6-dimethylbenzene-1,4-disulfonate, lithium 2,6-di-tert-butylbenzene-1,4-disulfonate, 3,3'-((1,2-dithiane-4,5-diyl) bis(oxy))bis(N-hydroxypropanamide), 3,3'-((4-mercapto-1, 2-phenylene)bis(oxy))bis(N-hydroxypropanamide), lithium aniline sulfonate (the sulfonate may be in any of para, meta and ortho positions) as well as poly(lithium-4-styrenesulfonate) applied in coating the anode material particles. It is noted that in cases of coatings that contain lithium (e.g., metallic lithium), ionic liquid additive(s) 135 may be selected to be not reactive toward it.

For example, various coatings of the anode active material may be used to bond or enhance bonding of molecules 116 to anode material 110, as disclosed above. The size(s) of molecules 116 may be selected to provide good lithium ion conductivity therethrough. In certain embodiments, molecules 116 may be selected (e.g., some of the disclosed salts) to form channels configured to enable fast lithium ion movement therethrough.

Surface molecules layer 117 may be configured to prevent contact of electrolyte solvent (of electrolyte 85) with anode active material 110, e.g., through steric hindrance by molecules 116. Non-limiting examples are embodiments represented e.g., by formulas II, IV and V, among others, such as the non-limiting examples lithium 3,5-dicarboxybenzenesulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis (N-hydroxypropanamide), etc.

Molecules 116 may be selected and attached onto anode active material 110 in a way that forms a mechanical and/or electrostatic barrier towards electrolyte solvent and prevents it from reaching and interacting with anode active material 110. Bonding molecules 116 may be selected to have electron rich groups that provide mobile electric charge on the surface of molecules layer 117. Non-limiting examples are embodiments represented e.g., by formulas II, and IV-VII, having conjugated double bonds, acidic groups and benzene groups, among others, such as the non-limiting examples lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy)) bis(N-hydroxypropanamide), lithium aniline sulfonate, poly (lithium-4-styrenesulfonate) etc.

For example, bonding molecules 116 may be selected to have a width W (anchored in anode 100 and/or anode active material particles 110) of up to three benzene rings and a length L (protruding into electrolyte 105) of up to four benzene rings, as exemplified in a non-limiting manner in embodiments represented e.g., by formulas II and VII having bicyclic or tricyclic structures, e.g., anthracene-based structures and/or in embodiments represented e.g., by formulas IV and V.

In some embodiments, bonding molecules 116 may comprise an anode material anchoring part 116A, configured to bind to or be associated with anode active material 110, e.g., via lithium, thiols, or other functional groups in bonding molecules 116. In some embodiments, anode material anchoring part 116A may be pre-lithiated exemplified in a non-limiting manner in embodiments represented by any of formulas I-VII which include lithium, such as the non-limiting examples illustrated in FIG. 5B.

In some embodiments, bonding molecules 116 may comprise an ionic conductive part 116B having an ionic conductivity which is much higher than its electronic conductivity, e.g., by one, two, three or more orders of magnitude. Ionic conductive part 116B may extend through most or all of length L of bonding molecules 116 and provide a conductivity path 91A (illustrated schematically) for lithium ions 91 moving back and forth between electrolyte 105 and anode 110 during charging and discharging cycles. Conductivity paths 91A may be provided e.g., by conjugated double bonds, acidic groups, benzene rings, carbon-fluorine bonds, charged functional groups etc. which are disclosed above.

For example, the charge distribution on bonding molecules 116 may be selected to be mobile and support lithium ion movement across molecules layer 117, possibly reducing the charge of the lithium ion to $Li^{\delta+}$ as explained above, to prevent metallization on the surface of anode 110. Partial charge reduction may be carried out by electron rich groups such as aromatic groups and acidic groups disclosed above.

In some embodiments, bonding molecules 116 may comprise a top, ionic liquid binding part 116C configured to bind cations 132 and/or anions 131 of ionic liquid additive 135 in electrolyte 105. For example, embodiments represented by any of formulas I-VII which involve charged and/or polar functional groups may provide top, ionic liquid binding part 116C, e.g., lithium 3,5-dicarboxybenzenesulfonate, lithium sulfate, lithium phosphate, lithium phosphate monobasic, lithium trifluoromethanesulfonate, lithium 1,1,2,2,3,3,4,4,5, 5,6,6,7,7,8,8,8-heptadecafluorooctane-1-sulfonate, lithium 2,6-dimethylbenzene-1,4-disulfonate, lithium 2,6-di-tert-butylbenzene-1,4-disulfonate, 3,3'-((1,2-dithiane-4,5-diyl) bis(oxy))bis(N-hydroxypropanamide), 3,3'-((4-mercapto-1, 2-phenylene)bis(oxy))bis(N-hydroxypropanamide), lithium aniline sulfonate (the sulfonate may be in any of para, meta and ortho positions) as well as poly(lithium-4-styrenesulfonate), as some non-limiting examples. Ionic liquid binding part 116C may be further configured to stabilize electrolyte-buffering zone(s) 130 as described above.

Figure 6:
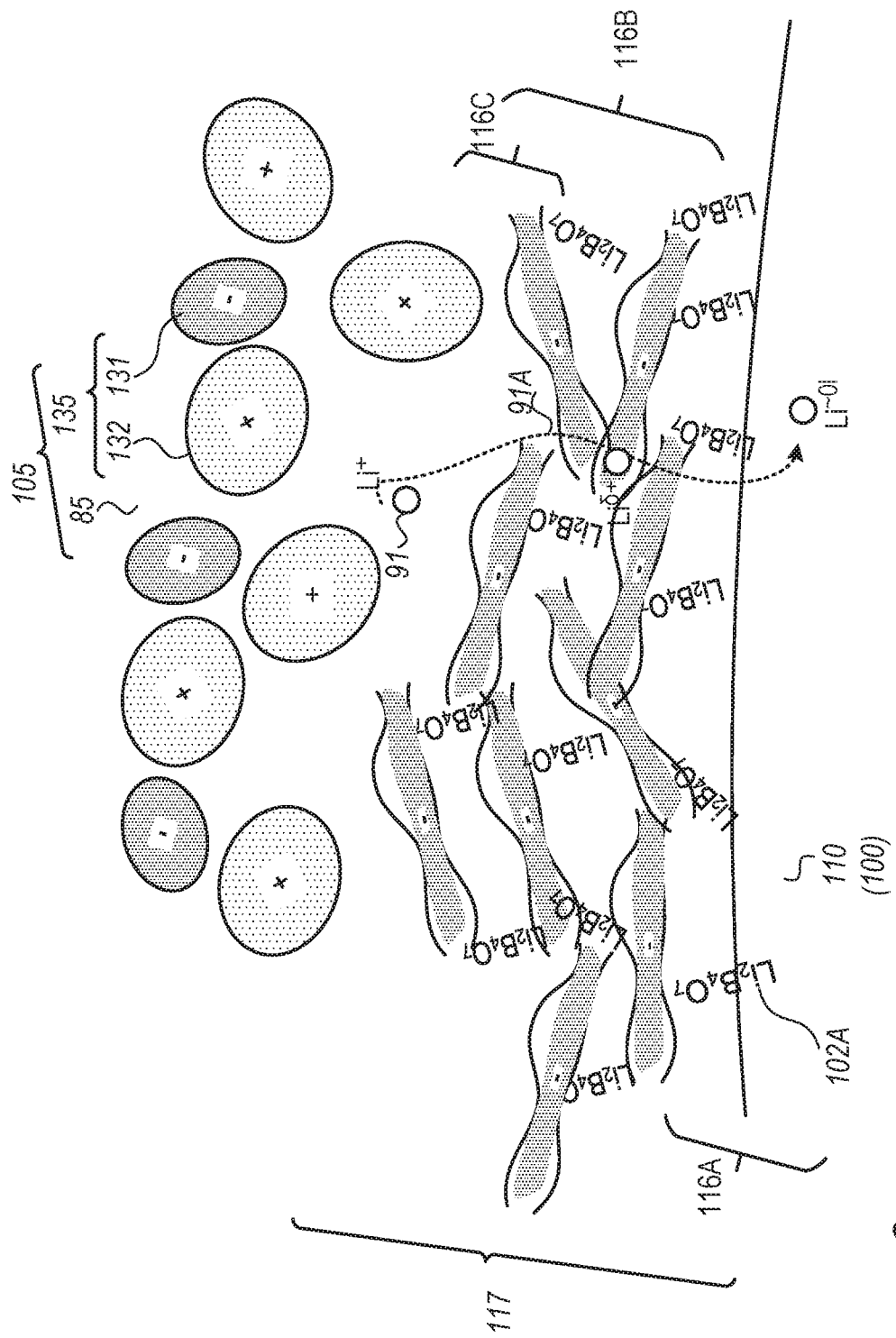
FIG. 6 is a high-level schematic illustration of bonding molecules forming a surface molecular layer on the anode and/or anode active material particles, according to some embodiments of the invention.

FIG. 6 is a high-level schematic illustration of bonding molecules 116 forming surface molecules layer 117 on anode 100 and/or anode active material particles 110, according to some embodiments of the invention. In the illustrated non-limiting example, bonding molecules 116 comprise a combination of lithium borates 102A which anchor (116A) layer 117 to anode active material 110, and polymer molecules (116B) having electron rich groups (e.g., conjugated bonds, acidic groups, etc.) which provide, together with lithium borates interconnecting the polymer molecules, ionic conductivity paths 91A through layer 117 and have an ionic conductivity which is much larger than electronic conductivity (e.g., by one or few orders of magnitude). Either or both the lithium borate molecules and the polymer molecules may have electron rich groups and may be pre-lithiated. Surface molecules layer 117 may comprise multiple polymer layers interconnected by lithium borates. Surface molecules layer 117 may bond cations 132 and/or anions 131 of ionic liquid (additive) at its top layer 116C, yet may also operate with carbonate-based electrolyte 85 due to its efficient blocking of contact between the solvent of electrolyte 85 and anode active material 110. It is noted that lithium borates and lithium phosphates 102A may likewise be used similarly to $Li_2B_4O_7$, which is provided in FIG. 6 as a non-limiting example.

Figure 7:
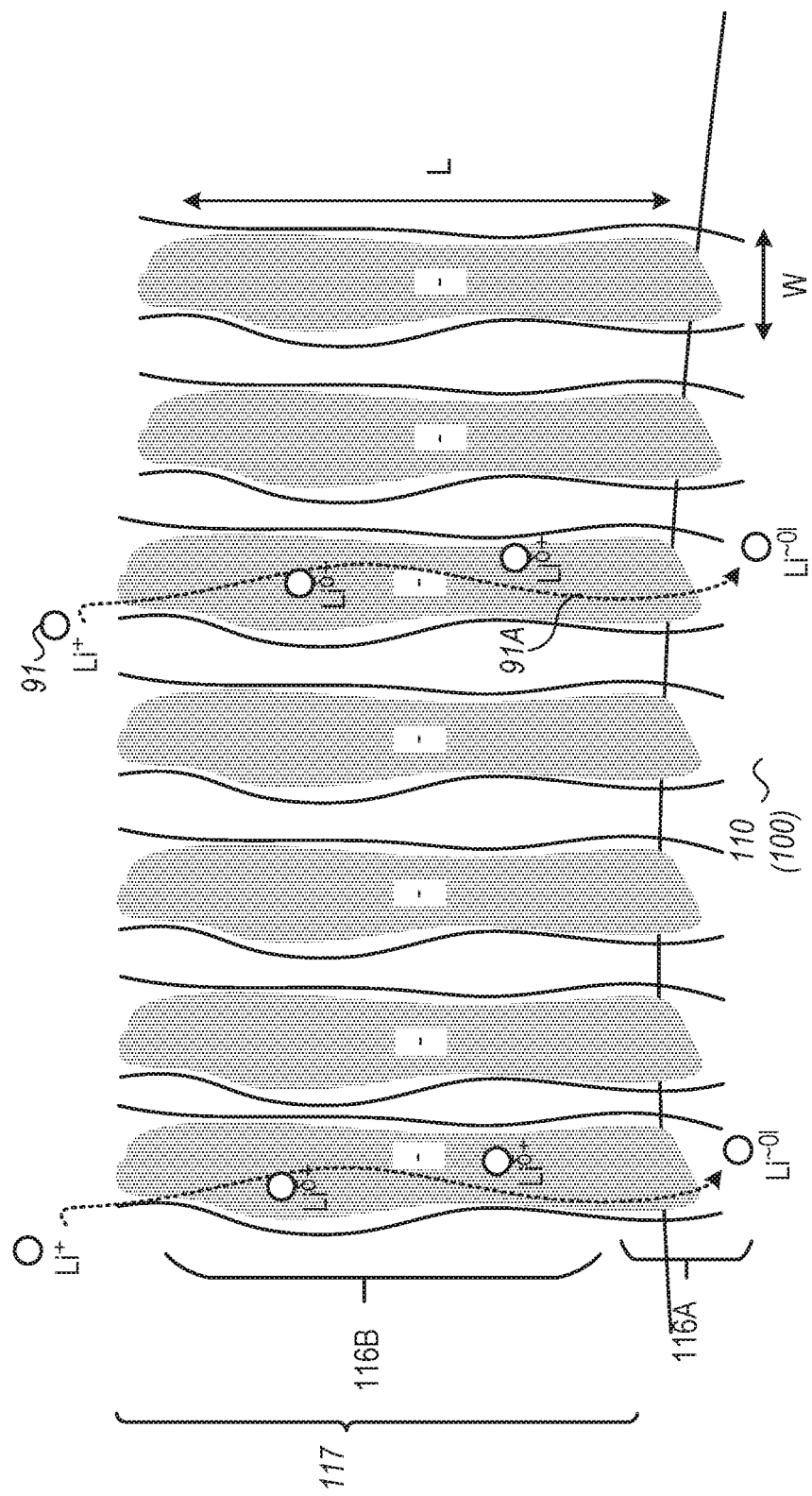
FIG. 7 is a high-level schematic illustration of bonding molecules forming thick surface molecules layer on the anode and/or anode active material particles, according to some embodiments of the invention.

FIG. 7 is a high-level schematic illustration of bonding molecules 116 forming thick surface molecules layer 117 on anode 100 and/or anode active material particles 110, according to some embodiments of the invention. In certain embodiments, bonding molecules 116 may extend deep into electrolyte 105 to form thick surface molecules layer 117 having a length L of more than ten benzene rings. For example, surface layer 117 may be thick to an extent of 10% or more of the distance between anode 100 and separator 86. The charge distribution on bonding molecules 116 in ionic conductive part 116B may be selected to be mobile and support lithium ion movement across molecules layer 117, possibly reducing the charge of the lithium ion to $Li^{\delta+}$ as explained above, to prevent metallization on the surface of anode 110. Partial charge reduction may be carried out by electron rich groups such as aromatic groups and acidic groups disclosed above. Certain embodiments comprise surface molecules layer 117 having intermediate thickness of between 4-10 benzene rings.

Figure 8A:
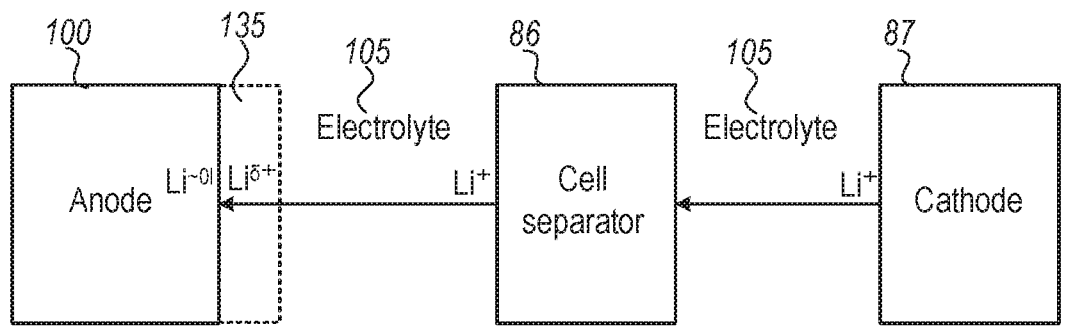
FIGS. 8A and 8B are high-level schematic illustrations of a lithium ion cell with the electrolyte during charging, according to some embodiments of the invention.
Figure 8B:
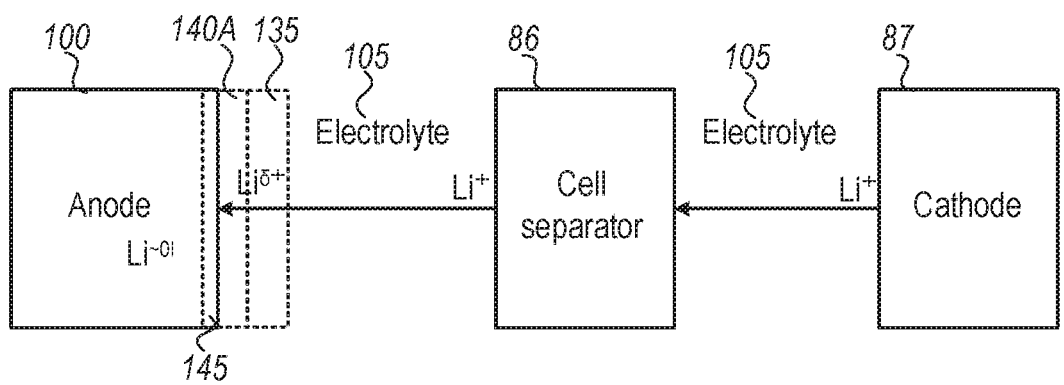

FIGS. 8A and 8B are high-level schematic illustrations of a lithium ion cell 150 with electrolyte 105 during charging, according to some embodiments of the invention. Lithium ion cell 150 comprises a metalloid anode 100, comprising at least one of C, graphite, Si, Sn, Ge and Al, and electrolyte 105 comprising at most 20% of at least one ionic liquid as ionic liquid additive 135. Ionic liquid additive 135 may form a mobile SEI (e.g., in place of the (static) SEI, in addition to the SEI or in an interaction with the SEI) on anode 100, e.g., during charging, as illustrated in FIG. 8A and disclosed above.

In certain embodiments, electrolyte 105 may comprise at most 5% of the at least one ionic liquid. In certain embodiments, the at least one ionic liquid may comprise sulfonylimides-piperidinium derivatives ionic liquid(s). Ionic liquid additive 135 may be selected to have a melting temperature below 10° C., below 0° C. or below −4° C., in certain embodiments.

Layer 145 may be part of the anode surface or coated thereupon, and bind at least a part of ionic liquid additive 135 to hold at least stationary portion 140A of ionic liquid additive 135 at the anode surface to support the SEI, prevent decomposition of electrolyte 105 and prevent lithium metallization on anode 100. Layer 145 of bonding molecules 116 and/or layer 140A of bonded ionic liquid additive may also provide some negative electric charge that partly reduces the lithium ion, leaving them with a partial charge δ+ and preventing full reduction and metallization of lithium on the anode surface. Layer 145 of bonding molecules 116 and/or layer 140A of bonded ionic liquid additive may be configured to support gradient 119 described in FIG. 3A.

Figure 9:
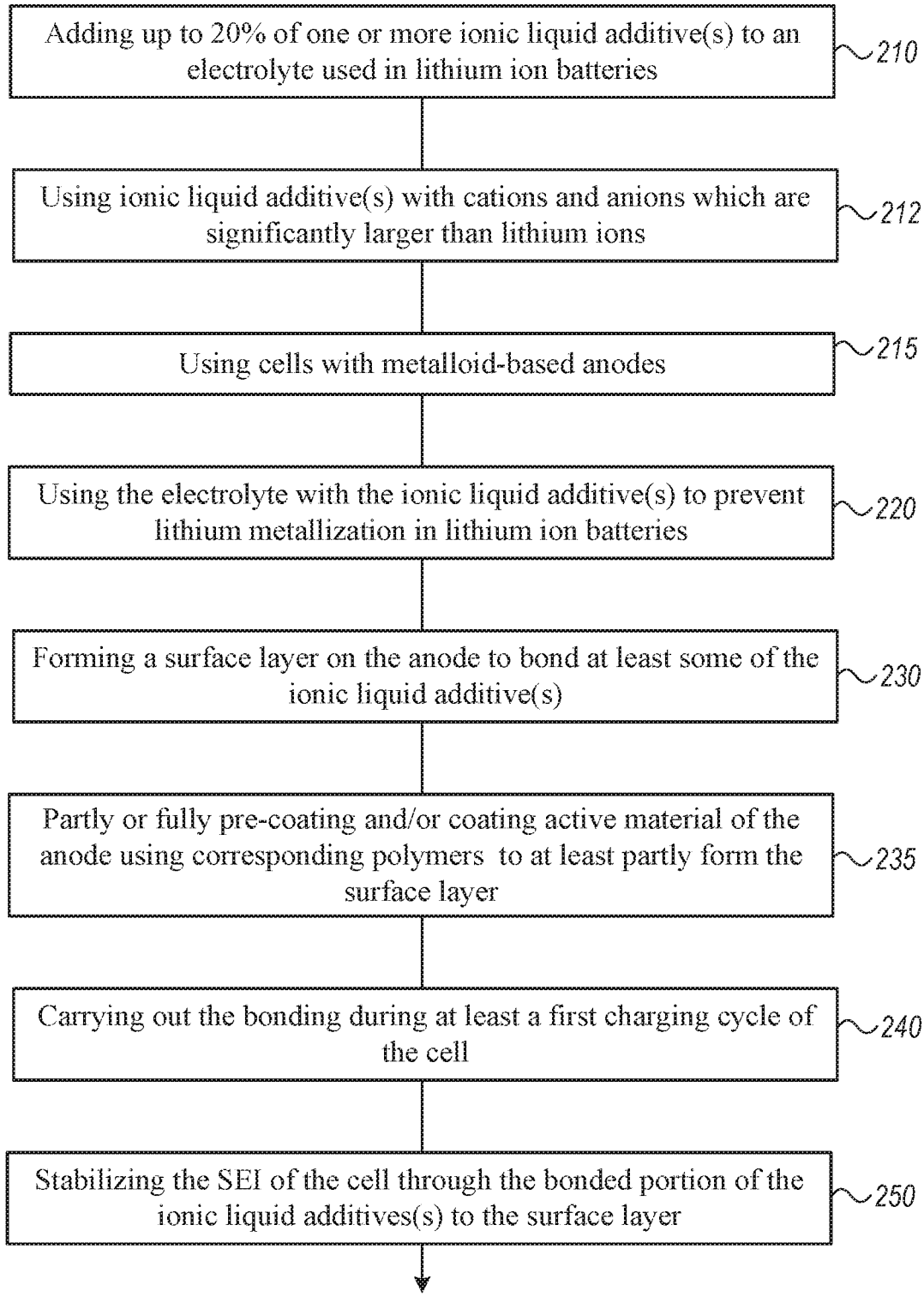
FIG. 9 is a high-level flowchart illustrating a method, according to some embodiments of the invention.
Figure 9:
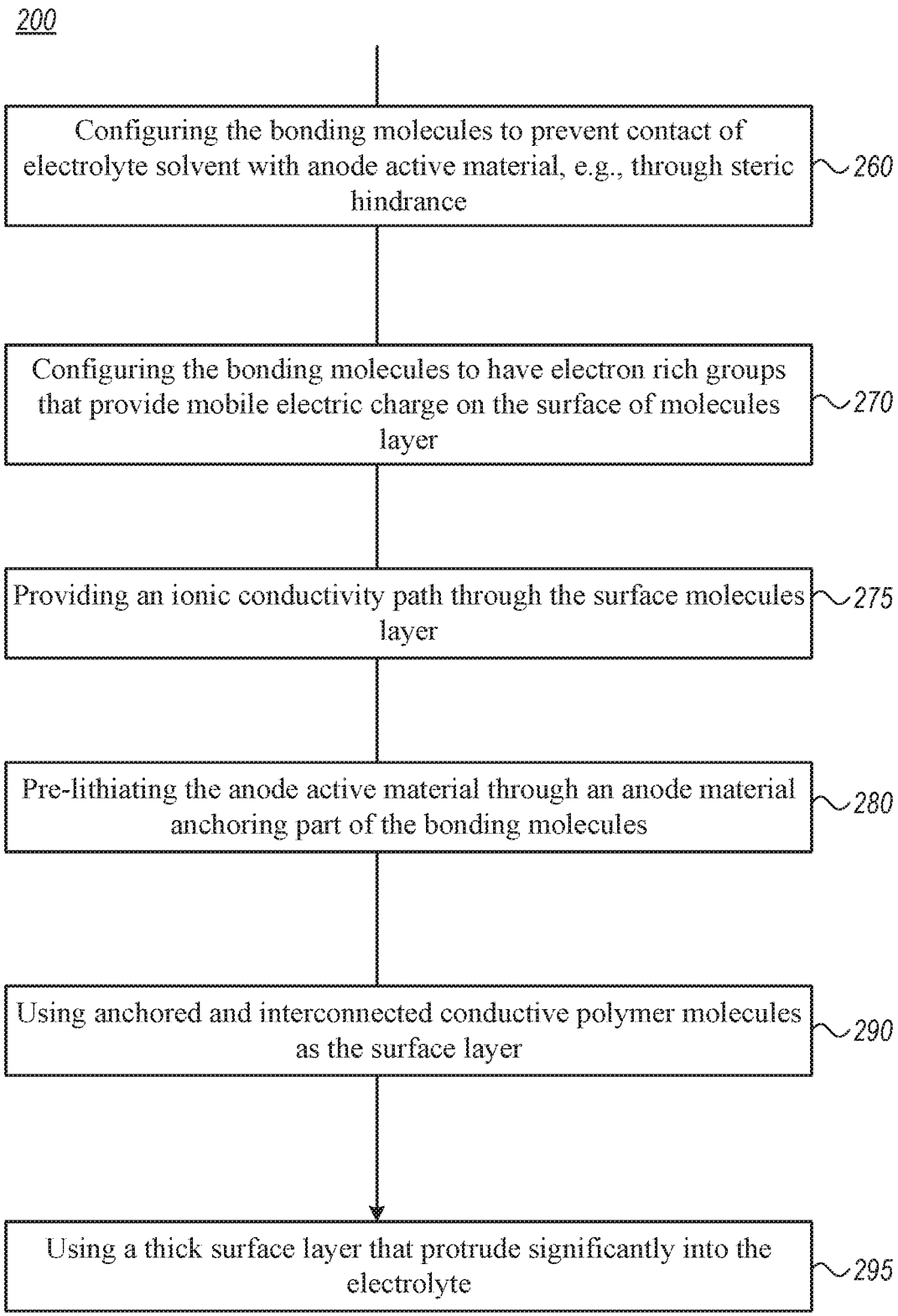

FIG. 9 is a high-level flowchart illustrating a method 200, according to some embodiments of the invention. The method stages may be carried out with respect to cells 150 described above and lithium ion batteries constructed therefrom, which may optionally be configured to implement method 200. Method 200 may comprise stages for producing, preparing and/or using cells 150, such as any of the following stages, irrespective of their order.

Method 200 may comprise adding up to 20% of at least one ionic liquid to an electrolyte used in lithium ion batteries (stage 210), using metalloid-based anodes (stage 215), e.g., comprising at least one of C, graphite, Si, Sn, Ge and Al, and using the electrolyte with the ionic liquid additive to prevent lithium metallization in lithium ion batteries (stage 220). Method 200 may comprise selecting one or more ionic liquids to have cations and/or anions which are much larger than lithium ions, e.g., two to ten times the size (e.g., volume) thereof (stage 212). In certain embodiments, electrolyte 105 may comprise at most 5% of the at least one ionic liquid. In certain embodiments, the at least one ionic liquid may comprise sulfonylimides-piperidinium derivatives ionic liquid(s). Ionic liquid additive 135 may be selected to have a melting temperature below 10° C., below 0° C. or below −4° C.

In certain embodiments, method 200 may comprise forming a surface layer on the anode to bond (e.g., electrostatically and/or ionically) at least some of the ionic liquid additive(s) (stage 230), e.g., by coating the anode active material by various bonding molecules as disclosed above and/or partly or fully pre-coating and/or coating the active material using corresponding polymers (stage 235).

Method 200 may comprise carrying out the bonding during at least a first charging cycle of the cell (stage 240), possibly during several first charging and discharging cycles. In certain embodiments, the bonding of cations and/or anions may be carried out, at least partially, on the active material itself, even before the first charging cycle. The bonding of the ionic liquid to the bonding layer may be electrostatic and/or salt-like (ionic). In certain embodiments, the bonding may be at least partly covalent.

Method 200 may comprise stabilizing the SEI of the cell through the bonded portion of the ionic liquid additive(s) to the surface layer (stage 250).

Method 200 may further comprise configuring the bonding molecules to prevent contact of electrolyte solvent with anode active material, e.g., through steric hindrance (stage 260).

Method 200 may further comprise configuring the bonding molecules to have electron rich groups that provide mobile electric charge on the surface of molecules layer (stage 270), e.g., to provide an ionic conductivity path through the surface molecules layer (stage 275).

Method 200 may further comprise pre-lithiating the anode active material through an anode material anchoring part of the bonding molecules (stage 280).

Method 200 may comprise using anchored and interconnected conductive polymer molecules as the surface layer (stage 290). Alternatively or complementarily, method 200 may comprise using a thick surface layer that protrude significantly into the electrolyte (stage 295).

Figure 10A:
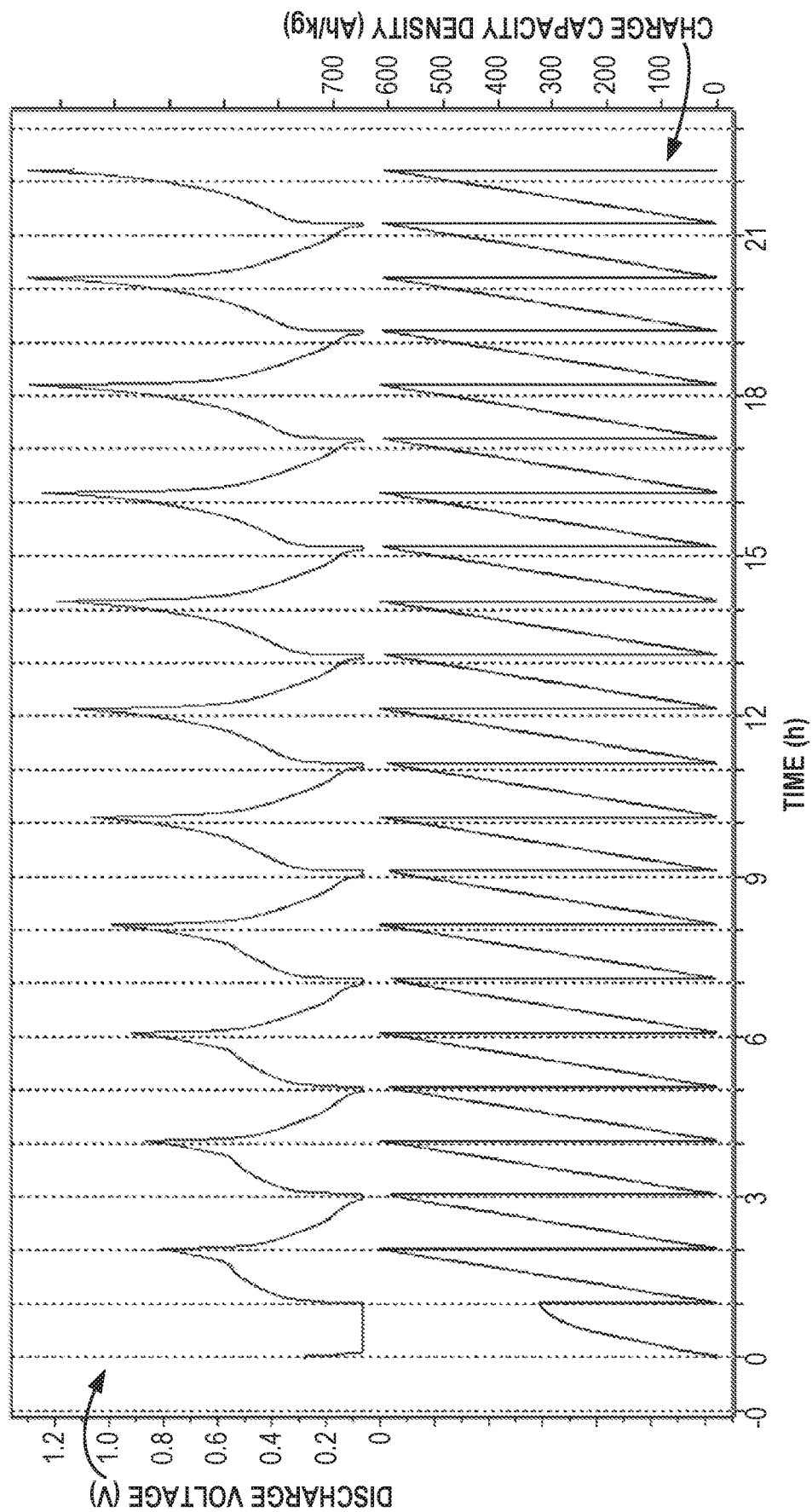

FIGS. 10A and 10B are non-limiting examples which indicate reversible lithiation at the anode when using the ionic liquid additive according to some embodiments of the invention (FIG. 10A) with respect to the prior art (FIG. 10B). Charging and discharging cycles at 1 C (ca. 1 hour charging followed by 1 hour discharging) are shown for half-cells having anodes 100 operate with lithium as cathodes 87—in FIG. 10A with ionic liquid additive 135 being N,N-Diethyl-N-methyl-N-propylammonium (cation 132) and bis(fluorosulfonyl)imide (anion 131) (electrolyte 105, with 1% ionic liquid additive 135) and in FIG. 10B without ionic liquid additive 135 (electrolyte 85—FEC:DMC (3:7) and 2% VC). The cycles were performed after four formation cycles at 0.03C (discharge to 80% of the capacity) followed by one cycle at 0.1C, limited by capacity. Without being bound by theory, the continuous rise in the discharge voltage from cycle to cycle (while the capacity during charging and discharging remains constant at ca. 600 mAh/gr) in FIG. 10A (in contrast to FIG. 10B) is understood as indicating the reversibility of lithium excess in the anode (e.g., lithiated lithium during the first slow cycles) facilitated through the ionic liquid additive preventing the lithium ions from binding to the anode active material permanently and/or possibly contributing to formation of a relatively lithium poor SEI.

Figure 11:
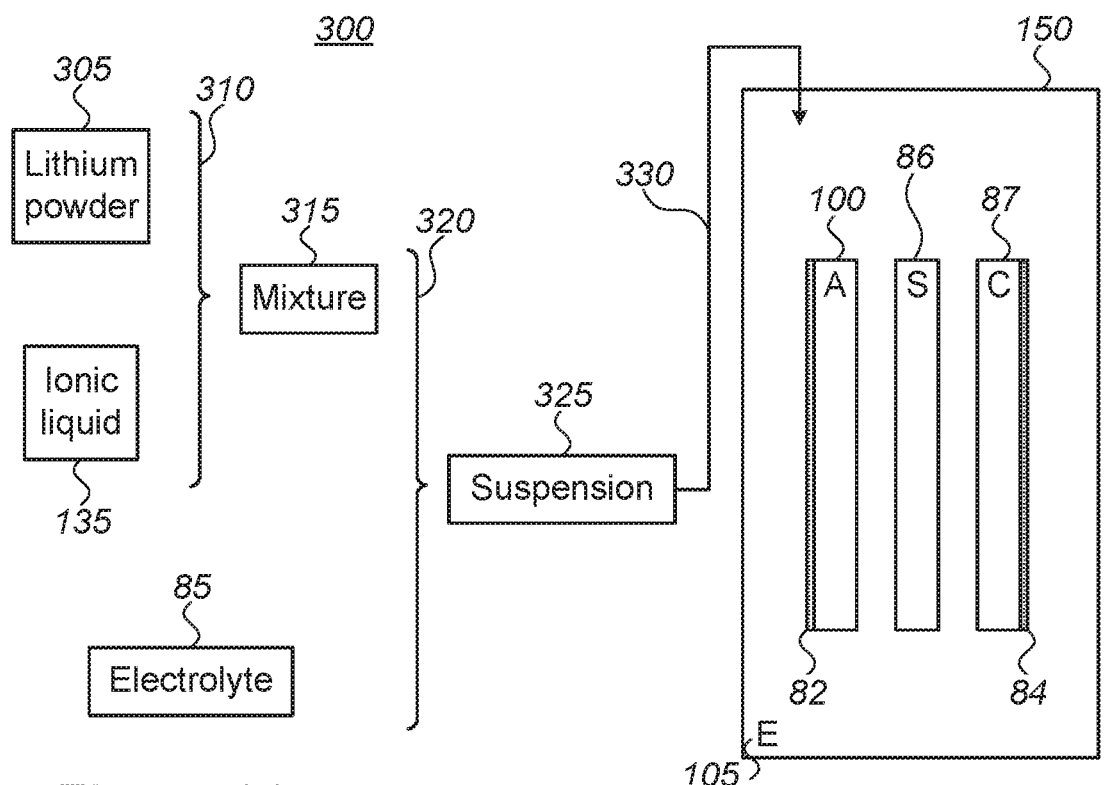
FIG. 11 is a high-level schematic block diagram of a prelithiation method applied to a lithium ion battery, according to some embodiments of the invention.

Embodiments of the present invention provide efficient and economical methods and mechanisms for pre-lithiating anodes of lithium ion battery cells, and thereby provide improvements to the technological field of energy storage devices. Pre-lithiation methods and pre-lithiated cells for lithium ion batteries are provided. In the methods, lithium powder is mixed with an ionic liquid, the mixture is suspended in an electrolyte, and the suspension is introduced into the cell. The ionic liquid may be removed from the cell prior to operation, or may be maintained as an electrolyte additive which provides a mobile SEI (solid electrolyte interface), and/or an immobilize MSEI (mobile SEI), during operation of the cell. The pre-lithiation may be carried out in a formation process and/or during operation of the cell. The lithium particles of the powder may be FIG. 11 is a high-level schematic block diagram of a prelithiation method 300 applied to a lithium ion battery 150, according to some embodiments of the invention. FIG. 11 illustrates schematically on its left-hand side, prelithiation method 300 comprising mixing lithium powder 305 with an ionic liquid 135 to form a mixture 315 (stage 310), suspending mixture 315 in an electrolyte 85 (e.g., carbonate-based electrolyte) to form a suspension 325 (stage 320), and introducing suspension 325 into a cell 150 (stage 330). FIG. 11 further illustrates on its right-hand side, a schematic side view of anodes 100 (denoted "A"), separators 86 (denoted "S") and cathodes 87 (denoted "C") in cell 150. It is noted that the figures are very schematic, and merely relate to the ordering of some of the elements of the battery, without reflecting realistic spatial relations, for the sake of clarity of explanation. Electrolyte 105 (denoted "E", which may be carbonate-based and possibly include ionic liquid additive (s)) contacts anodes 100 and cathodes 87 in separate compartments, delimited by separators 86, a feature which is not shown in the figures. Current collectors 82, 84 are depicted for anode 100 and cathode 87, respectively, e.g., in non-limiting examples, anode current collector 82 may be made of copper and/or copper alloys and cathode current collector 84 may be made of aluminum and/or aluminum alloys. Electrolyte 105 may comprise some lithium powder 305, or lithium powder 305 may be attached to anode(s) 100 during a formation process. Ionic liquid 135 may remain in electrolyte 85 and function as a mobile SEI (MSEI), as disclosed e.g., above, or some or all of ionic liquid 135 may be removed from cell 150, with electrolyte 85 possibly being replaced before operation by electrolyte 105 or by a different electrolyte. It is noted that ionic liquids may generally comprise one or more salt(s) which are liquid below 100° C., or even at room temperature or at lower temperatures such as below any of 10° C., 0° C., −5° C., −10° C., etc.

In contrast to prior art practice of mixing lithium powder (comprising micrometer particles with bonded polymer) in the anode slurry to produce pre-lithiate anode(s) 100, disclosed embodiments, utilize electrolyte 105, and in particular a coupling of ionic liquid additive 135 to electrolyte 85, to associate lithium powder 305 thereto and, within cell 150 and possibly before and/or during the formation process, pre-lithiate anode(s) 100 from lithium powder 305. Ionic liquid additive 135 may be maintained in cell 150—in electrolyte 105 and/or at least partly bonded to anode(s) 100, and possibly function to improve the safety and lifetime of battery 150, as disclosed below.

In certain embodiments, lithium powder 305 may comprise uncoated lithium powder 305, which may have nanometer to micrometer particles. Uncoated lithium particles may bond (or be configured to bond) better to ionic liquid 135. For example, lithium powder 305 may be prepared along lines derived from the method of Zhao et al. 2015 (Artificial Solid Electrolyte Interphase-Protected LixSi Nanoparticles: An Efficient and Stable Prelithiation Reagent for Lithium-Ion Batteries, J. Am. Chem. Soc., 2015, 137 (26), pp 8372-8375), without using silicon.

Ionic liquid 135 may then be used to suspend lithium powder 305 in electrolyte 85 to form suspension 325, possibly replacing in this function polymer coating of the lithium powder particles. Following the introduction of suspension 325 into cell 150, at least some of the lithium may enter anode(s) 100 operatively to reduce or prevent the capacitance decrease of operating cells, and ionic liquid 135 may then function in operative cell 150 for forming the MSEI.

Ionic liquid 135 may be selected to be non-reactive (or possibly somewhat reactive) towards lithium, and the length of chains of the anions is selected to optimize suspension 325. Suspension 325 may be used for pre-lithiation only (be washed away before operation) or ionic liquid 135 may be retained in the operative cell. Non-limiting examples for ionic liquid 135 are disclosed herein.

Figure 12:
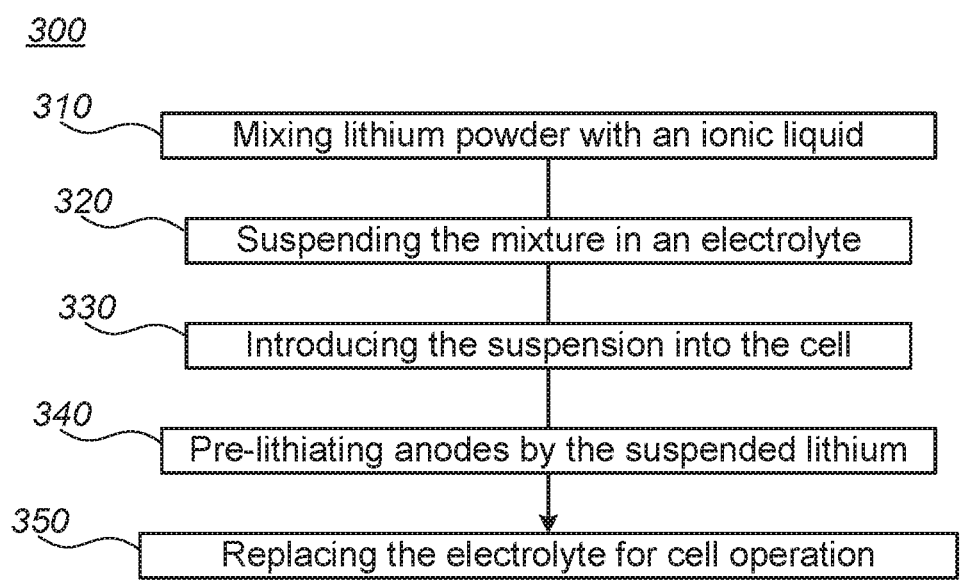
FIG. 12 is a high-level flowchart illustrating a method, according to some embodiments of the invention.

FIG. 12 is a high-level flowchart illustrating a method 300, according to some embodiments of the invention. The method stages may be carried out with respect to cells 150 described above, which may optionally be configured to implement method 300. Method 300 may comprise stages for producing, preparing and/or using cells 150, such as any of the following stages, irrespective of their order. In various embodiments, method 300 and/or stages thereof may be implemented as part of any of methods 200 and/or 400 disclosed herein.

Method 300 may comprise mixing lithium powder with an ionic liquid (stage 210), suspending the mixture in an electrolyte (stage 320), and introducing the suspension into the cell (stage 330). Method 300 may comprise pre-lithiating anodes by the suspended lithium (stage 340), e.g., in a formation process and/or during operation.

Method 300 may further comprise replacing the electrolyte for cell operation (stage 350).

In certain embodiments, particles of lithium powder 305 may be un-coated. In certain embodiments, particles of lithium powder 305 may be 10-100 nm in diameter.

Certain embodiments comprise composite electrolytes for lithium ion cells and corresponding cells, production processes and methods. The composite electrolytes comprise solid electrolyte particles coated by flexible ionic conductive material. The flexible ionic conductive material is selected to increase a contact area between the solid electrolyte particles and electrode active material particles with respect to a contact area therewith of uncoated solid electrolyte particles, and/or to provide an ionic conduction path through the flexible ionic conductive material throughout at least a portion of the composite electrolyte. The flexible ionic conductive material may further comprise bonding molecules selected to bind electrode active material particles and/or to ionic liquid ions serving as additional electrolyte in the cell. Disclosed semi-solid electrolyte cells are able to provide high ionic conductivity and cell operation at a wide temperature range, extending to 0° C., −10° C., −20° C. or even −40° C. Disclosed composite electrolytes may also be described as semi-solid electrolytes due to their flexibility and compliance to applied pressures, which secure better contact between the electrolyte and the electrodes.

FIGS. 13A and 13B are high-level schematic illustrations of lithium ion cells 150, according to some embodiments of the invention. FIG. 13C is a high-level schematic illustration of prior art lithium ion cells 90. Disclosed cells 150 comprise at least one film of composite electrolyte 120 contacting an anode 100 and/or a cathode 87 of cell 150, replacing at least partly prior art liquid electrolyte 85. Other elements of prior art lithium ion cells 90, such as a separator 86, current collectors 82, 84, enclosure 79 and even anode 95 and cathode 87 may be used in disclosed cells 150 or replaced by corresponding elements as disclosed herein, e.g., modified anode 100, modified cathode 87, modified enclosure 160 and possibly modified current collectors (not shown). Composite electrolyte 120 may be used to replace electrolyte 85 and separator 86 to form a continuous solid or semi-solid contact from anode 100 to cathode 87, as illustrated schematically in FIG. 13A, or composite electrolyte 120 may be used to replace only part of electrolyte near either or both anode 100 and cathode 87, leaving some liquid electrolyte 85 and separator 86 therebetween, as illustrated schematically in FIG. 13B.

FIGS. 14A and 14B are high-level schematic illustrations of the contact between an electrode and composite electrolyte 120, according to some embodiments of the invention. FIG. 14C is a high-level schematic illustration of prior art contact between an electrode 95 and a solid electrolyte 83. The disclosed electrode is illustrated in a non-limited manner as anode 100, and similar principles may apply to cathode 87 as well.

Electrode active material particles 110 are illustrated schematically as circles at an interface 113 to composite electrolyte 120. It is noted that the interface between anode 100 and electrolyte 120 is denoted by 113 while the surface of anode material particles 110 is denoted by 112. The considerations disclosed below may by applicable to either interface 113 and/or surface 112, depending on details of the interaction models, and are hence treated as alternatives through the disclosure. Composite electrolyte particles 125 may comprise solid particles 122 of composite electrolyte 120, illustrated schematically as circles, which have an ionic conductive coating 124 at least partly enveloping solid particles 122. Coating 124 may be flexible and yield upon contact of active material particles 110 with particles 122 and/or upon application of pressure thereupon (e.g., pressure 160A which may be applied on enclosure 160 mechanically, thermally or by letting gases evaporate out of enclosure 160). It is emphasized that electrolyte 120 is configured to have minimal porosity to ensure good contact among electrode active material particles 110 to maximize ionic conductivity and to increase the energy density of cells 150. Moreover, the porosity at interface region 113 between electrolyte 120 and electrode(s) 100 and/or 87 and/or the porosity of electrode material particle surface 112 is configured to be minimal to ensure good contact between the electrode active material particles and the electrolyte particles to maximize ionic conductivity and to increase the energy density of cells 150.

In contrast to prior art interfaces 83A which provide minimal contact 81A between hard active material particles 95A and solid electrolyte particles 88, due to the rigid nature of particles 95A, 88, disclosed composite electrolyte particles 125 provide a much broader contact 121A providing a larger contact area between composite electrolyte particles 125 and active material particles 110 to enable much better ion transfer therebetween. As a result, the ionic conductivity at interface 113 between disclosed composite electrolyte 120 and anode 100 (and/or through electrode material particle surface 112) is much high along a conductivity path 121 (indicated schematically by the broken line arrow) than prior art ionic conductivity at interface 83A between prior art solid electrolyte 83 and anode 95 along a conductivity path 81 (indicated schematically by the broken line arrow). The resulting improvement in ionic conductivity may reach one or more orders of magnitude, as composite electrolyte particles 125 provide a contact area 121A with active material particles 110 which may be one or more orders of magnitude larger than contact area 81A of prior art solid electrolyte particles 88 and active material particles 95A.

Additionally, ionic conductive coating 124 may be configured to provide an additional conductivity path 123 for delivering lithium ions between the electrode (e.g., anode 100) and composite electrolyte 120, in addition to prior art path 81 through contact area 81A therebetween. For example, ionic conductive coating 124 may comprise a plurality of lithium ion binding sites which are separated from each other by 2-3 nm or less, to conduct the lithium ions.

Without being bound by theory, prior art ionic conduction depends on cracks in solid electrolyte particles 88 and therefore also depends on contact area 81A between solid electrolyte particles 88 and hard active material particles 95A. In addition to achieving improved ionic conductivity path 121 by providing increased contact area 121A, discloses composite electrolyte also provides additional conductivity path 123 through flexible ionic conductive coating 124, which may be configured to build a continuous network throughout at least parts of composite electrolyte 120 that supports conductivity path 123 independently from conductivity path 121—to further enhance and make robust the ionic conductivity between electrodes 100, 87 and composite electrolyte 120.

FIGS. 14D-14H are high-level schematic illustrations of interfaces 113 between any of electrode active material 110, 110A, 110B and electrolyte particles 122, 125, according to some embodiments of the invention. Electrode active material 110 is represented in a non-limiting manner as anode active material 110, yet similar principles may apply to cathode active material as well. The disclosed electrode is illustrated in a non-limited manner as anode 100, and similar principles may apply to cathode 87 as well. It is noted that the disclosed considerations may be applicable to interface 113 and/or to the interface of electrolyte 120 with surface 112 of anode material particles 110.

In some embodiments (see e.g., FIG. 14D), composite electrolyte 120 may comprise electrolyte particles 122 embedded in a viscous ionic liquid 126, configured to improve contact 121A and ionic conductivity between anode 100 and composite electrolyte 120 and possibly provide alternative ionic conduction path 123A.

In some embodiments (see e.g., FIG. 14E), active material particles 110 may be coated by ionic conductive coating 134, prior to incorporation thereof in the electrode slurry, in the electrode slurry itself, or possibly after preparation of the electrode (in the latter case, ionic conductive coating 134 may only enclose active material particles 110 partially). Examples for coatings 134 are presented above (see e.g., FIG. 1B).

In some embodiments, (see e.g., FIG. 14F), both active material particles 110 may be coated by ionic conductive coating 134, and solid electrolyte particles 222 may be coated by ionic conductive coating 124, as disclosed above. It is noted that either or both active material particles 110 and electrolyte particles 122 may be coated by ionic conductive coatings 134, 124, to form particles 110B, 125 respectively, and/or by flexible coatings 134, 124, to possibly provide an additional ion conduction path beyond particles 122 (and cracks therein) themselves and/or to increase the contact area between active material particles 110 and electrolyte particles 122 to enhance ionic conduction therethrough.

In some embodiments, illustrated schematically in FIGS. 14G and 14H, coatings 124 may comprise bonding molecules 129 which may be selected to enhance adhesion of electrolyte particles 125 to the electrode (e.g., to any of anode active material particles 110, 110A, 110B) and/or enhance ionic conduction between the electrode (e.g., anode 100) and composite electrolyte 120 by increasing the contact area therebetween and/or by providing additional path(s) for ionic conduction therebetween. In some embodiments, illustrated schematically in FIG. 14H, bonding molecules 129 may be configured to bind cations 131 (or anions 132) of ionic liquid 135 used either as liquid electrolyte 85 and/or 105 (see FIG. 13B) or as an ionic liquid additive to liquid electrolyte 85 and/or 105—e.g., as disclosed herein Examples for bonding molecules 129 may comprise e.g., lithium 3,5-dicarboxybenzenesulfonate, lithium sulfate, lithium phosphate, lithium phosphate monobasic, lithium trifluoromethanesulfonate, lithium 1,1,2,2,3,3,4,4,5,5,6,6,7,7,8,8,8-heptadecafluorooctane-1-sulfonate, lithium 2,6-dimethylbenzene-1,4-disulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate (the sulfonate may be in any of para, meta and ortho positions) as well as poly(lithium-4-styrenesulfonate), as well as related molecules derived therefrom by various substitutions and modifications, provided as some non-limiting examples.

It is emphasized that elements illustrated in FIGS. 13A, 13B, 14A, 14B and 14D-14H may be combined to provide additional embodiments which are not illustrated explicitly, such as additional combinations of one or more ionic conductive coatings 124, 134 and/or viscous ionic liquid 126.

FIGS. 15A-15C are a high-level schematic block diagrams of various production methods 151, according to some embodiments of the invention. Electrolyte 120 may be processed to be incorporated in cells 150 in various, alternative or complementary ways, such as contact electrolyte solution or slurry with porous electrode(s) 120A, addition of electrolyte material to the electrode material 120B, addition of electrolyte slurry into the electrode slurry 120C, and/or attaching a solid electrolyte layer onto the electrode 120D, as disclosed below (FIGS. 15A, 15B). Ionic conductive material 122 may be used for electrolyte 120 and/or ionic conductive coating(s) 124 such as ionic conductive polymers may be applied to electrolyte particles at various process stages with respect to the incorporation of the electrolyte in the cell (120A-120D).

It is emphasized that while anodes 100 may be porous during the preparation processes, the porosity of the resulting anode 100 and the porosity at interface region 113 between electrolyte 120 and anode 100 (and/or the porosity of electrode material particle surface 112) are configured to be minimal to ensure good contact between the electrode active material particles and the electrolyte particles to maximize ionic conductivity and to increase the energy density of cells 150.

Electrode active material particles and additives 152 (e.g., electron conductive additives 152A, binder(s), monomers and/or polymers) may be processed into an electrode slurry 155, e.g., by ball milling active material particles and additives 152 and possibly adding liquid, from which electrodes, e.g., anodes 100 and cathodes 87 are produced, e.g., by spreading and drying (see e.g., FIG. 1B and process 111 below). Electrode slurry 155 and the electrode production process parameters may be configured to provide a predefined level of porosity to the electrode, e.g., >70%. The electrode porosity may be configured to provide good electrolyte contact to the active material 155, e.g., in cases electrolyte 120 is introduced in solution (120A) and following evaporation of the sustaining liquid 158 (e.g., solvent). Possibly pressure 157 may be applied to improve contact 155, possibly by pressing 160A (see FIG. 14A) cells 150. Processes 151 may be further configured and optimized to prepared electrolyte 120 to have minimal porosity to ensure good contact among electrode active material particles 110 to maximize ionic conductivity and to increase the energy density of cells 150.

In certain embodiments, production methods 151 comprise adding at least some of the electrolyte material as additive 120B (FIG. 15B) and processing it together with active material particles and additives 152, e.g., in ball milling 154A, followed by addition of liquid 154B to form electrode slurry 155, possibly after addition of further electrolyte slurry 120C. The processing of electrolyte particles 125 together with any of electrode particles 110, 110A, 110B may be configured to improve the contact between them. Following production of electrode 100, 87 (e.g., to a degree of porosity between 30-70%), attachment 156 of a solid electrolyte layer 120D may achieve good contact 156 due to initial electrolyte components 120C and/or 120D. Alternatively, solid electrolyte layer 120D may be carried out without prior introduction of electrolyte components 120C and/or 120D, possibly utilizing additives in solid electrolyte layer 120D and/or electrode 100, 87, and possibly pressure 157 to provide good contact 156. It is noted that electrolyte 120 may comprise ionic conductive material such as solid electrolyte particles as well as an ionic conductive polymer 124 which may be polymerized 124A before production process 151 or during process 151 at various stages. In any of the illustrated cases and their combinations, an anode-electrolyte element 160 (or, generally, an electrode-electrolyte element) is formed and may be used for preparing cells 150. In certain embodiments, see e.g., FIG. 13A, the electrode-electrolyte element may comprise both anode and cathode attached to the electrolyte, and may be used by any combination of methods 151A-D.

FIGS. 15D-15G are high-level schematic illustrations of interfaces between electrode active material 110 and electrolyte particles 125, according to some embodiments of the invention. It is noted that elements illustrated in FIGS. 13A, 13B, 14A, 14B, 14D-14H and 15D-15G may be combined to provide additional embodiments which are not illustrated explicitly. It is further noted that while the illustrated embodiments refer to anodes 100, equivalent configurations may be prepared for cathodes 87.

FIG. 15D illustrates schematically porous anode 100 (or cathode 87) having schematically-illustrated pores 111. FIG. 15E illustrates schematically the filling of pores 111 by electrolyte 120 with electrolyte particles 125 (clearly the relative sizes of the particles are non-limiting and are for illustration purposes alone), for example by liquid electrolyte 120 and/or electrolyte 120 in solution (see 120A in FIG. 15A) being dried or evaporated to achieve good electrolyte-electrode contact 156. FIG. 15F illustrates schematically electrode-electrolyte contact which may be achieve by (i) using liquid electrolyte 120 and/or electrolyte 120 in solution (120A in FIG. 15A) to fill pores 111 as well as form electrolyte 120 and/or (ii) using electrolyte material as additive (120B in FIG. 15B) and/or electrolyte material in the slurry (120C in FIG. 15B) to prepare anode 100 with embedded electrolyte material, and then attach solid electrolyte layer thereto (120D in FIG. 15B) to yield good attachment 156. FIG. 15G illustrates schematically application of pressure 160A on electrolyte 120 (in any of its disclosed configurations, e.g., as illustrated in FIG. 15F) to further improve contact 156 between electrode 100 and electrolyte 120.

Figure 16:
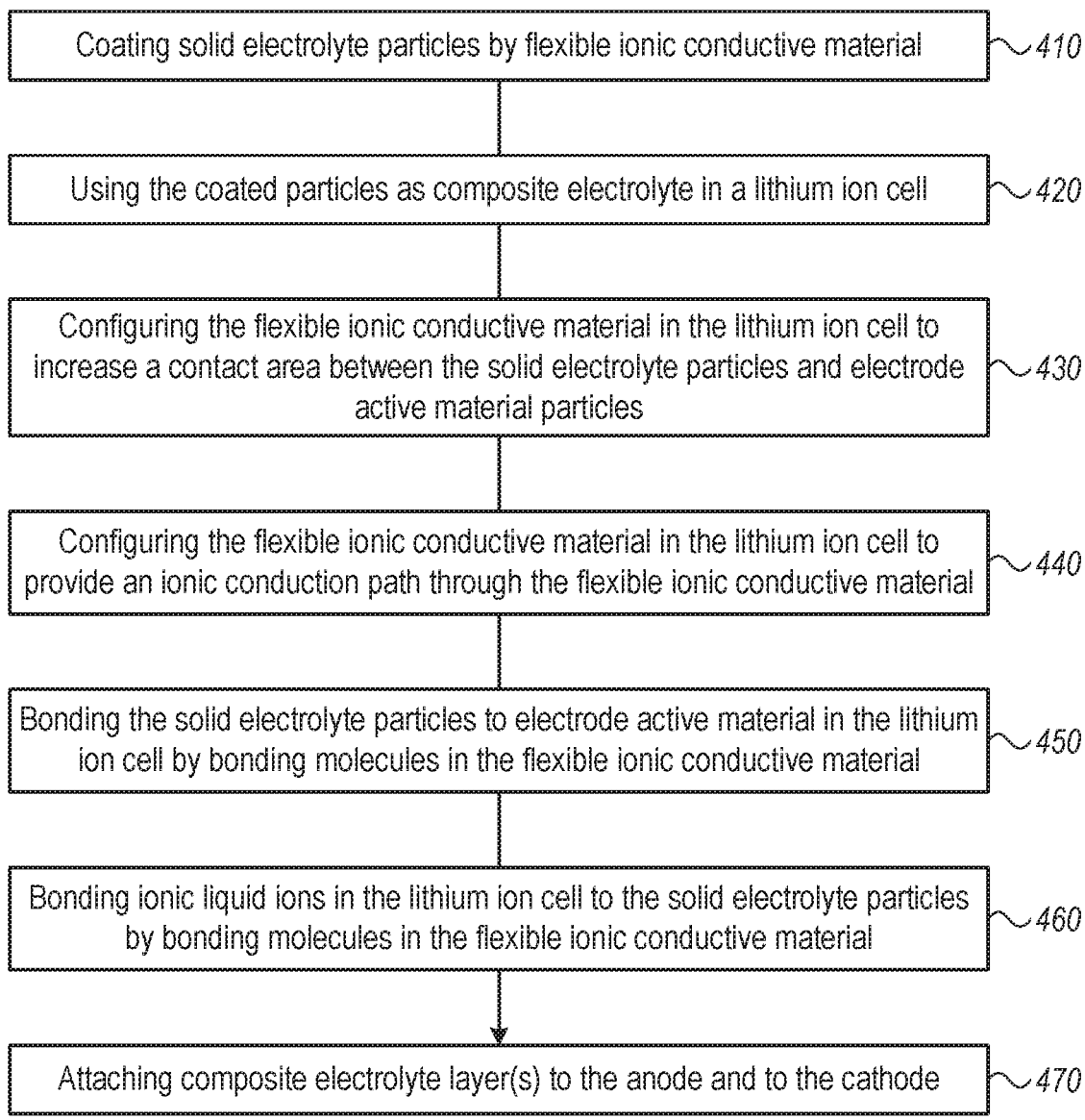
FIG. 16 is a high-level flowchart illustrating a method, according to some embodiments of the invention.

FIG. 16 is a high-level flowchart illustrating a method 400, according to some embodiments of the invention. The method stages may be carried out with respect to composite electrolyte 120 and/or lithium ion cell(s) 150 described above, which may optionally be configured to implement method 400. Method 400 may comprise stages for producing, preparing and/or using composite electrolyte 120 and/or lithium ion cell(s) 150, such as any of the following stages, irrespective of their order. In various embodiments, method 400, processes 151 (see FIGS. 3A-3C) and/or stages thereof may be implemented as part of any of methods 200 and/or 300 disclosed above.

Method 400 comprises coating solid electrolyte particles by flexible ionic conductive material (stage 410) and using the coated particles as composite electrolyte in a lithium ion cell (stage 420). Method 400 may further comprise configuring the flexible ionic conductive material in the lithium ion cell to increase a contact area between the solid electrolyte particles and electrode active material particles (stage 430). Alternatively or complementarily, method 400 may further comprise configuring the flexible ionic conductive material in the lithium ion cell to provide an ionic conduction path through the flexible ionic conductive material (stage 440).

Method 400 may further comprise bonding the solid electrolyte particles to electrode active material in the lithium ion cell by bonding molecules in the flexible ionic conductive material (stage 450) and/or bonding ionic liquid ions in the lithium ion cell to the solid electrolyte particles by bonding molecules in the flexible ionic conductive material (stage 460). The ionic liquid may be used as additional electrolyte or as an additive thereto, with the cells further comprising a separator as described above.

Method 400 may further comprise attaching composite electrolyte layer(s) to the anode and to the cathode (stage 470), possibly applying stages of production process 151 illustrated schematically in FIGS. 15A-15C.

Advantageously, using solid electrolyte particles coated by flexible ionic conductive material as a solid-state electrolyte improves the energy density and safety with respect to liquid electrolyte (e.g., concerning safety, solid state electrolyte dismisses with volatile substances which may present a risk upon dendrite formation) while solving prior art problems of low ionic conductivity, especially at low temperatures, which leads to low C rate capability. The disclosed electrolytes may be configured to enable batteries which operate at high C rate and/or low temperatures, by providing high ionic conductivity.

Electrolytes, lithium ion cells and corresponding methods are provided, for extending the cycle life of fast charging lithium ion batteries. The electrolytes may comprise organic solvent(s) with at least one lithium salt which provides lithium ions for the operation of the lithium ion cell.

The electrolytes are based on fluoroethylene carbonate (FEC) and/or vinylene carbonate (VC) as the cyclic carbonate component, and possibly on ethyl acetate (EA), propyl acetate and/or propionates; and/or ethyl methyl carbonate (EMC) as the linear component. Proposed electrolytes extend the cycle life by factors of two or more, as indicated by several complementary measurements.

In certain embodiments, electrolyte 105 may have at least one linear component and at least one cyclic carbonate component, of which the cyclic carbonate component(s) may comprise at least 80% of FEC and/or VC. In certain embodiments, electrolyte 105 may comprise at least 10% vol FEC and/or VC, and/or 20-50% vol FEC and/or VC as the cyclic carbonate component(s).

In certain embodiments, the at least one linear component of electrolyte 105 may comprise at least 30% of ethyl acetate (EA) and/or propyl acetate and/or propionates. In certain embodiments, a volume ratio between the at least one cyclic carbonate component and the at least one linear component may be between 2:8 and 1:1. In certain embodiments, electrolyte 105 may comprise at least one lithium electrolyte salt, such as 0.9-1.3M $LiPF_6$ or any other lithium salt(s). Examples for non-limiting specific compositions of electrolytes 105 are provided below.

In certain embodiments, the at least one linear component of electrolyte 105 may comprise at least 20% vol or at least 30% vol of any of ethyl acetate (EA), propyl acetate and propionates; and/or any of: ethyl acetate (EA), dimethyl carbonate (DMC), ethyl methyl carbonate (EMC), diethyl carbonate (DEC), modified linear carbonates and fluorinated linear carbonates.

In certain embodiments, electrolyte 105 may comprise 20-50% vol FEC and/or VC. In certain embodiments, electrolyte 105 may comprise 20-60% vol EA and/or propyl acetate and propionates. In certain embodiments, electrolyte 105 may comprise 50-80% vol EMC. In certain embodiments, electrolyte 105 may comprise 20-50% vol FEC and/or VC and 80-50% vol EA and/or EMC. In certain embodiments, electrolyte 105 may comprise between 20-40% vol FEC, between 20-40% vol EA and between 20-60% vol EMC.

While FEC and VC are known in prior art to be used as electrolyte additives to EC:DMC (ethylene carbonate:dimethyl carbonate, e.g., in ratios 1:1 or 3:7, possibly including also DEC or EMC at 1:1:1 ratios with EC and DMC) electrolytes, typically at weight % of a few %, the inventors discovered that FEC-based electrolytes 105 and/or VC-based electrolytes 105—having FEC and/or VC as the main cyclic carbonate component—improve performance of lithium ion cells 150, particularly lithium ion cells 150 configured to enable fast charging rates (see details below). Lithium ion cells 150 may comprise metalloids such as, but not limited to, Si, Ge and/or Sn as at least part of their anode material and/or possibly graphene and/or lithium titanate (LTO) or even graphite, as at least part of their anode material.

In certain embodiments, proposed electrolytes extend the cycle life by factors of two or more, as indicated by several complementary measurements. In certain embodiments, additional linear carbonates may be used, such as DEC (diethyl carbonate) and/or modified linear carbonates such as fluorinated carbonates. Below, a detailed presentation of electrolyte compositions is provided, in any of the disclosed embodiments, electrolyte 105 comprises FEC and/or VC as the main cyclic carbonate compound. In certain embodiments the proposed electrolyte may include other cyclic and linear compounds. In certain embodiments, additional additives may be utilized in the electrolyte 105 including but not limiting; SEI formers, HF-scavengers, phosphorous- and sulfur-based components and compounds disclosed above. In certain embodiments, EMC may replace DMC as the linear component of electrolyte 105, e.g., to enable using lithium ion cell 150 at temperatures as low as −30° C. In certain embodiments, electrolyte 105 may consist of 20-30% vol FEC and 80-50% vol EMC and/or 20-30% vol EA and between 50-60% vol EMC, a VC additive (e.g., at 2% wt) and at least one lithium electrolyte salt.

The non-aqueous linear organic solvent may include, e.g., carbonate-based solvent(s), ester-based solvent(s), ether-based solvent(s), ketone-based solvent(s), nitrile-based solvent(s), sulfone solvent(s), and/or aprotic solvent(s). The carbonate-based solvent may comprise carbonate-based compounds such as any of: dimethyl carbonate (DMC), diethyl carbonate (DEC), dipropyl carbonate (DPC), methylpropyl carbonate (MPC), ethylpropyl carbonate (EPC), ethylinethyl carbonate (EMC), butylene carbonate (BC), or the like. In certain embodiments, ester-based solvent(s) may comprise any of: methyl acetate, ethyl acetate, n-propyl acetate, dimethylacetate, methylpropionate, ethylpropionate, gamma-butyrolactone, decanolide, gamma-valerolactone, mevalonolactone, caprolactone, or the like. In certain embodiments, ether-based solvent(s) may comprise any of: dibutyl ether, tetraglyme, diglyme, dimethoxyethane, 2-methyltetrahydrofuran, tetrahydrofuran, and the like. In certain embodiments, ketone-based solvent(s) may comprise e.g., cyclohexanone, or the like. In certain embodiments, aprotic solvent(s) may comprise, e.g., nitriles such as R—CN of various types and/or dinitriles NC—R—CN of various types (e.g., nitriles or dinitriles in which R is a hydrocarbon group having a C2 to C20 linear, branched, or cyclic structure, and may include a double bond, an aromatic ring, or an ether bond) or the like, amides such as dimethylformamide or the like, dioxolanes such as 1,3-dioxolane or the like, sulfolanes, or the like.

In certain embodiments, non-aqueous organic solvent(s) may comprise, e.g., aromatic hydrocarbon-based organic solvent(s) with the carbonate-based solvent(s). The carbonate-based and the aromatic hydrocarbon-based solvents may be mixed together in a volume ratio of between about 1:1 to about 30:1. Examples of the aromatic hydrocarbon-based organic solvent may comprise any of: benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof. In certain embodiments, non-aqueous solvent(s) may comprise monosulfonic acid ester compound (s) such as any of: 1,3-propane sultone, 1,4-butane sultone, methyl methanesulfonate, methyl ethanesulfonate, methyl trifluoromethanesulfonate and combinations thereof.

One or more lithium salts may be dissolved in the organic solvent(s). The lithium salt(s) may be selected to perform any of the following functions within the battery cells: supply lithium ions in a battery, enable operation of the rechargeable lithium battery, and improve lithium ion transportation between the positive and negative electrodes. Non-limiting examples for lithium electrolyte salt(s) (expressed as Li+X− in electrolyte 105) may comprise, as respective anions X−, any of: F−, Cl−, Br−, I−, NO3−, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$P−, (CF$_3$)$_6$P−, CF$_3$SO$_3^-$, CF$_3$CF$_2$SO$_3^-$, (CF$_3$SO$_2$)$_2$N−, (FSO$_2$)$_2$N−, CF$_3$CF$_2$(CF$_3$)$_2$CO−, and combinations thereof. The lithium salt(s) may be included in electrolyte 105 in a concentration of between about 0.1 M to about 2.0 M. The concentration range and values may be selected to optimize the performance and the lithium ion mobility with respect to electrolyte conductivity and viscosity.

Various additive(s) and their combinations may be added to electrolyte 105, such as solid electrolyte interphase (SEI) forming additives, compounds that promote high temperature stability and HF scavengers which prevent battery capacity deterioration, as disclosed below.

In certain embodiments, SEI forming additives comprise materials that can be reductively decomposed on surfaces of negative electrodes prior to other solvent components, to form protective films (SEI films) that suppress excessive decomposition of the electrolytic solutions, enhance charge/discharge efficiency and/or improve the cycle characteristics and the safety of non-aqueous electrolyte batteries. Generally, SEI formers can include, but not limited to, vinylene carbonate and its derivatives, ethylene carbonate derivatives having non-conjugated unsaturated bonds in their side chains, halogen atom-substituted cyclic carbonates and salts of chelated orthoborates and chelated orthophosphates. Specific, non-limiting, examples of SEI forming additives which may be used in electrolyte 105 comprise any of: VC, vinylethylene carbonate (VEC), methylene ethylene carbonate (or 4-vinyl-1,3-dioxolan-2-one) (MEC), chloroethylene carbonate (CEC), 4,5-divinyl-1,3-dioxolan-2-one, 4-methyl-5-vinyl-1,3-dioxolan-2-one, 4-ethyl-5-vinyl-1,3-dioxolan-2-one, 4-propyl-5-vinyl-1,3-dioxolan-2-one, 4-butyl-5-vinyl-1,3-dioxolan-2-one, 4-pentyl-5-vinyl-1,3-dioxolan-2-one, 4-hexyl-5-vinyl-1,3-dioxolan-2-one, 4-phenyl-5-vinyl-1,3-dioxolan-2-one, 4,4-difluoro-1,3-dioxolan-2-one and 4,5-difluoro-1,3-dioxolan-2-one, lithium bis(oxalate)borate (LiBOB), lithium bis(malonato)borate (LiBMB), lithium bis(difluoromalonato)borate (LiBDFMB), lithium (malonato oxalato)borate (LiMOB), lithium (difluoromalonato oxalato)borate (LiDFMOB), lithium tris(oxalato)phosphate (LiTOP), and lithium tris(difluoromalonato)phosphate (LiTDFMP). Particularly useful SEI formers may be selected from FEC, VC, monofluoroethylene carbonate, MEC, VEC, LiBOB and mixtures thereof. The amount of SEI former may range between 0.1% to 8% of the total electrolyte weight. In certain embodiments, the amount of SEI former may range between 1% to 5% of the total electrolyte weight.

In certain embodiments, high temperature stabilizer additives may be selected to promote high temperature stability, e.g., by enhancing capacity retention at high temperatures (e.g., above 50° C.) and preventing swelling and gas generation, e.g., by preventing decomposition of the electrolyte at the cathode. High temperature stabilizer additives may be particularly effective in cells operating at high voltages and/or in cells operating at high charging rates, and they may be selected to enhance charge-discharge characteristics of the batteries and effectively reduce the swelling of batteries at elevated temperatures. High temperature stabilizer additives may be selected to help to create a protective layer on the surface of the cathode which further decreases the amount of solvent oxidation and decomposition at the cathode. In certain embodiments, Electrolyte 105 may comprise compounds that promote high temperature stability such as any of: sulfur-containing linear and heterocyclic, unsaturated and saturated compounds; phosphorus containing linear and heterocyclic, unsaturated and saturated compounds; as well as HF scavenging compounds. Sulfur containing compounds may comprise linear and cyclic compounds such as sulfites, sulfates, sulfoxides, sulfonates, thiophenes, thiazoles, thietanes, thietes, thiolanes, thiazolidines, thiazines, sultones, and sulfones. These sulfur-containing compounds can include various degrees of fluorine substitution up to and including the fully perfluorinated compounds. Certain embodiments may comprise any of the following non-limiting examples of sulfur-containing linear and cyclic compounds: ethylene sulfite, ethylene sulfate, thiophene, benzothiophene, benzo[c]thiophene, thiazole, dithiazole, isothiazole, thietane, thiete, dithietane, dithiete, thiolane, dithiolane, thiazolidine, isothiazolidine, thiadiazole, thiane, thiopyran, thiomorpholine, thiazine, dithiane, dithiine; thiepane; thiepine; thiazepine; prop-1-ene-1,3-sultone; propane-1,3-sultone; butane-1,4-sultone; 3-hydroxy-1-phenylpropanesulfonic acid 1,3-sultone; 4-hydroxy-1-phenylbutane sulfonic acid 1,4-sultone; 4-hydroxy-1-methylbutane sulfonic acid 1,4 sultone; 3-hydroxy-3-methylpropanesulfonic acid 1,4-sultone; 4-hydroxy-4-methylbutanesulfonic acid 1,4-sultone; a sulfone having the formula R—S(=O)$_2$R' where R and R' are independently selected from the group consisting of substituted or unsubstituted, saturated or unsaturated C1 to C20 alkyl or aralkyl groups; and combinations of two or more thereof. In certain embodiments, sulfur-containing compounds may be selected from propane-1,3-sultone, butane-1,4-sultone and prop-1-ene-1,3-sultone, each provided in an amount of 0.1 to 5.0% by weight of the electrolyte solution. Electrolyte 105 may comprise phosphorus-containing compounds such as linear and cyclic, phosphates and phosphonates. Electrolyte 105 may comprise any of the following phosphorus-containing compounds: alkyl phosphates, such as trimethyl phosphate, triethyl phosphate, tri-isopropyl phosphate, propyl dimethyl phosphate, dipropyl methyl phosphate, and tripropyl phosphate; aromatic phosphates, such as triphenyl phosphate; alkyl phosphonates include trimethylphosphonate, and propyl dimethylphosphonate; and aromatic phosphonates, such as phenyl dimethylphosphonate; as well as combinations thereof. Electrolyte 105 may comprise phosphorus-containing compounds at an amount which is between 0.1% and 5% of the total electrolyte weight.

Electrolyte 105 may comprise HF scavenger compounds selected to prevent battery capacity deterioration and improve output characteristics at high temperatures. HF scavenger compounds may comprise acetamides, anhydrides, pyridines, tris(trialkylsilyl)phosphates, tris(trialkylsilyl)phosphites, tris(trialkylsilyl)borates. Electrolyte 105 may comprise any of: acetamides such as, N,N-dimethyl acetamide, and 2,2,2-trifluoroacetamide; anhydrides such as phthalic anhydride succinic anhydride, and glutaric anhydride; pyridines such as antipyridine and pyridine; tris (trialkylsilyl)phosphates such as tris(trimethylsilyl)phosphate and tris(triethylsilyl)phosphate; tris(trialkylsilyl) phosphites tris(trimethylsilyl)phosphite, tris(triethylsilyl) phosphite, tris(tripropylsilyl)phosphite; tris(trialkylsilyl) borates such as, tris(trimethylsilyl)borate, tris(triethylsilyl) borate, and tris(tripropylsilyl)borate; alone or as a mixture of two or more thereof. Electrolyte 105 may comprise HF scavenger compounds at an amount which is between 0.1% to 5% of the total electrolyte weight.

Ionic liquid additive(s) may be added to electrolyte 105 as disclosed e.g., in U.S. patent application Ser. Nos. 15/447,784 and 15/447,889, both filed on Mar. 2, 2017, which are incorporated herein by reference in their entirety; for example, ionic liquids based on sulfonylimides and piperidinium derivatives having relatively low melting temperatures in any of the ranges 10-20° C., 0-10° C., or possibly even <0° C., <−20° C., and/or <−40° C., The inventors have found out that replacing the prior art cyclic carbonate component EC with FEC and/or VC improves the cycle life of the cells, particularly in fast charging applications—as illustrated e.g., in FIGS. 20A-20J. In certain embodiments, cell lifetime (e.g., in terms of capacity retention, coulombic efficiency etc.) was doubled using disclosed electrolytes 105, providing a significant improvement with respect to a bottleneck in the development of metalloid-based (e.g., comprising Si, Ge and/or Sn anode material), LTO, graphene and/or fast charging cells 150. Disclosed electrolytes may be beneficial for graphite-based anodes as well, possibly with additions of metalloids and/or possibly metalloid-based anodes with additions of graphite.

Preparation

Electrolyte 105 may be prepared from a baseline electrolyte, prepared by dissolving LiPF$_6$ into FEC (possibly with additional cyclic compounds) and linear compounds so that the LiPF$_6$ concentration is above 1 mol/L. The amount of FEC is above 10% vol, preferably between 20-50% vol. VC was added into the baseline electrolyte in the amount of 0.5-2.5%.

Figure 17:
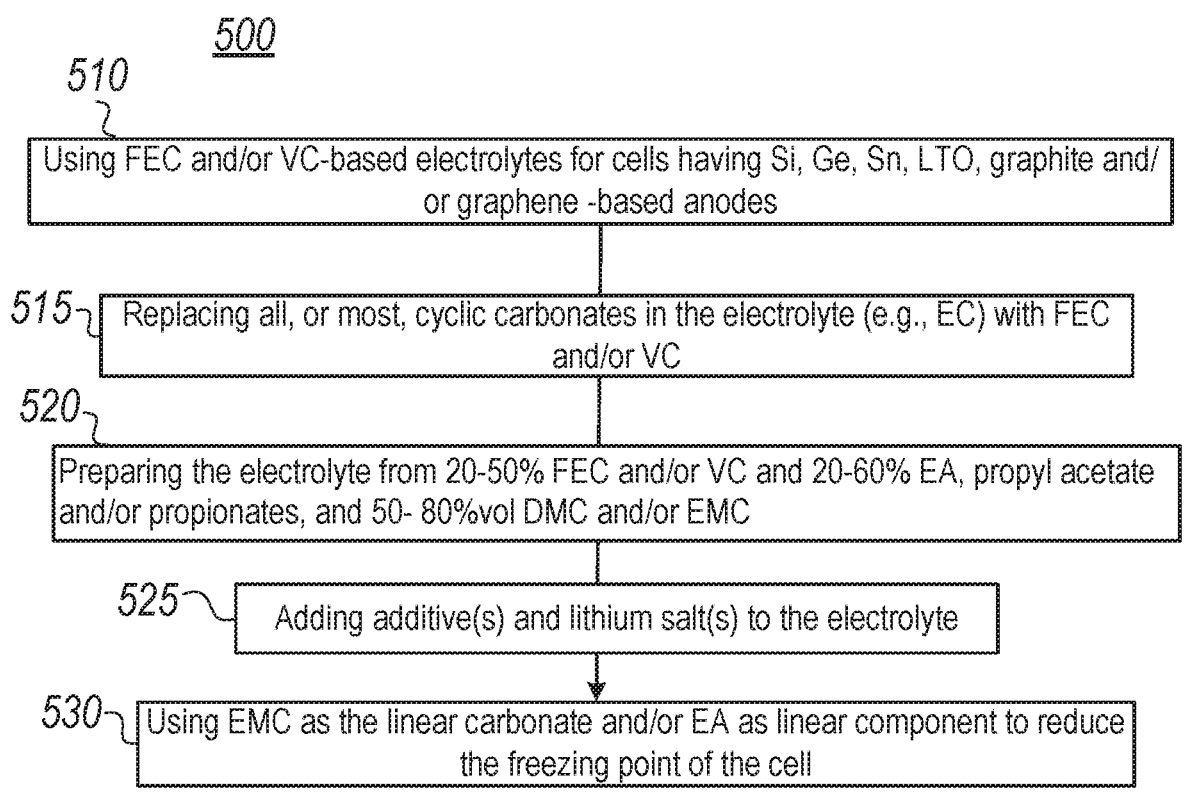
FIG. 17 is a high-level flowchart illustrating a method, according to some embodiments of the invention.

Cathode(s) 87 in lithium ion battery 150 comprises cathode active material that can reversibly intercalate and de-intercalate lithium ions. As a non-limiting example, the cathode active material may be a composite metal oxide of lithium and at least one selected from cobalt, manganese and nickel. The solid solubility of metals may be variously used in the composite metal oxide. In addition to these metals, any one selected from the group consisting of Mg, Al, Co, K, Na, Ca, Si, Ti, Sn, V, Ge, Ga, B, As, Zr, Mn, Cr, Fe, Sr, V and rare earth elements may be further included. In certain embodiments, cathode(s) 87 may comprise materials based on layered, spinel and/or olivine frameworks, and comprise various compositions, such as LCO formulations (based on LiCoO$_2$), NMC formulations (based on lithium nickel-manganese-cobalt), NCA formulations (based on lithium nickel cobalt aluminum oxides), LMO formulations (based on LiMn$_2$O$_4$), LMN formulations (based on lithium manganese-nickel oxides) LFP formulations (based on LiFePO$_4$), lithium rich cathodes, and/or combinations thereof. The cathode may be made by preparing an electrode slurry composition by dispersing the electrode active material, a binder, a conductive material and a thickener, if desired, in a solvent and coating the slurry composition on an electrode collector. As non-limiting examples, aluminum or aluminum alloy may be used as a cathode collector. The cathode collector may be formed as a foil or mesh. Separator(s) 86 may comprise various materials, such as polyethylene (PE), polypropylene (PP) or other appropriate materials. As non-limiting examples, a polymer membrane such as a polyolefin, polypropylene, or polyethylene membrane, a multi-membrane thereof, a micro-porous film, or a woven or non-woven fabric may be used as the separator. Possible compositions of anode(s) 100 are disclosed below in detail FIG. 17 is a high-level flowchart illustrating a method 500, according to some embodiments of the invention. The method stages may be carried out with respect to lithium ion cell 150 and/or electrolyte 105 described above. Method 500 may comprise stages for producing, preparing and/or using lithium ion cell 150 and/or electrolyte 105, such as any of the following stages, irrespective of their order. In various embodiments, method 500 and/or stages thereof may be implemented as part of any of methods 200, 300 and/or 400 disclosed herein.

Method 500 may comprise using FEC and/or VC-based electrolytes for cells having Si, Ge and/or Sn-based anodes, or possibly graphene and/or LTO-based or even graphite anode material (stage 510), e.g., by replacing all, or most, cyclic carbonates in the electrolyte (e.g., EC) with FEC and/or VC, possibly reaching, e.g., 30% of FEC and/or VC in the electrolyte (stage 515). In any of the embodiments, the anodes may comprise combinations of the anode materials disclosed above, e.g., metalloids such as Ge or Si with graphite, graphite or graphene with metalloids such Ge, Si or Sn, or any other combination.

For example, method 500 may comprise preparing the electrolyte from 20-50% FEC and/or VC, and 20-60% vol EA and/or 50-80% vol DMC and/or EMC (stage 520) and possibly adding additives (e.g., FEC or VC, e.g., at 2% vol, into VC-based and FEC-based electrolytes respectively) and lithium salt(s) to the electrolyte (stage 525), e.g., $LiPF_6$ in concentration 0.9-1.3 M.

Method 500 may further comprise using EMC as the linear carbonate and/or EA as linear component to reduce the freezing point of the cell (stage 530).

Disclosed electrolytes may be used with improved anodes and cells which enable fast charging rates with enhanced safety due to much reduced probability of metallization of lithium on the anode, possibly preventing dendrite growth and related risks of fire or explosion. Disclosed electrolytes may be used with various anode active materials and combinations, modifications through nanoparticles and a range of coatings which implement the improved anodes as illustrated schematically in FIG. 1B.

EXAMPLES

Disclosed electrolytes 105 were shown to increase cycle life in fast charging cells 150 having metalloid-based (e.g., anode material comprising Si, Ge and/or Sn) anode(s).

Figure 18A:
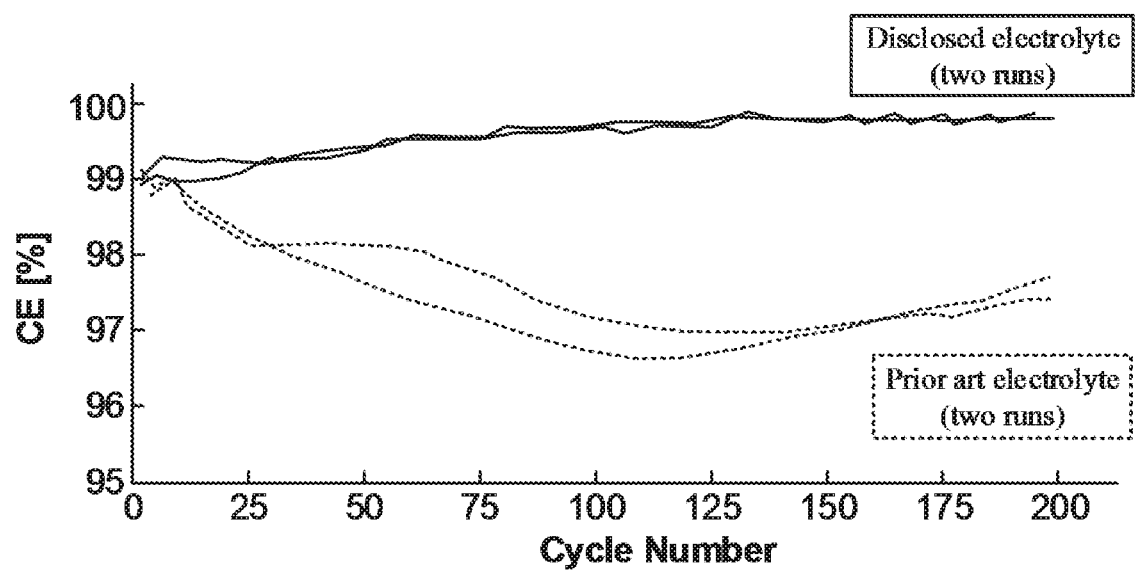
FIGS. 18A-18D demonstrate the increased cell life for using electrolyte according to some embodiments of the invention, with respect to using prior art electrolytes, in half cell experimental setting.
Figure 18B:
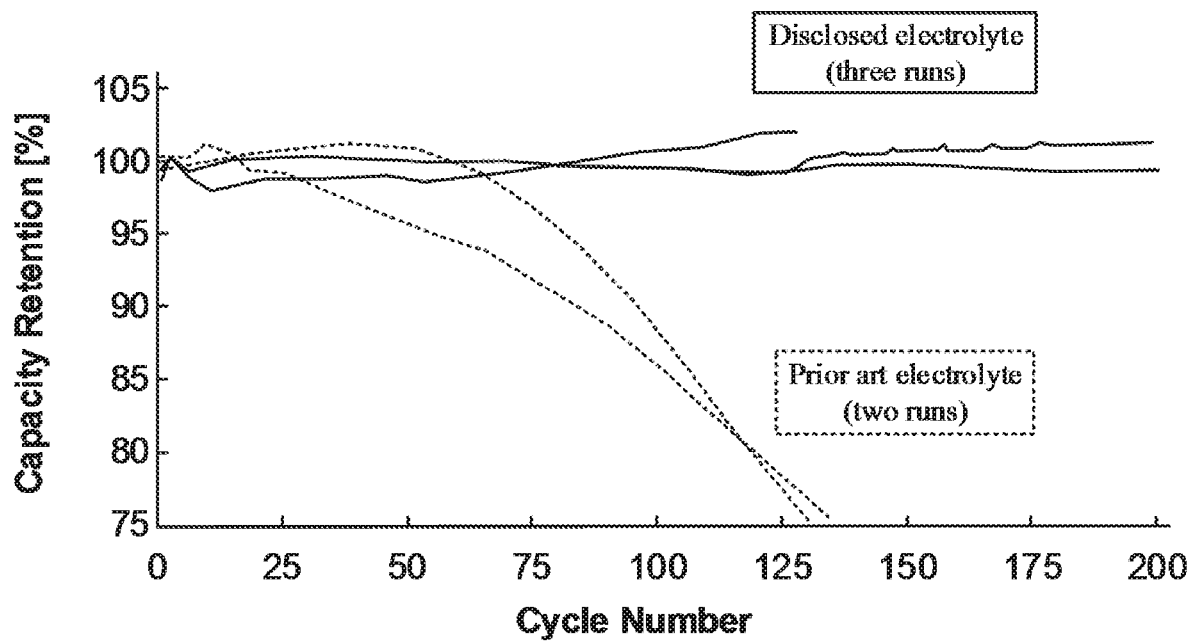
Figure 18C:
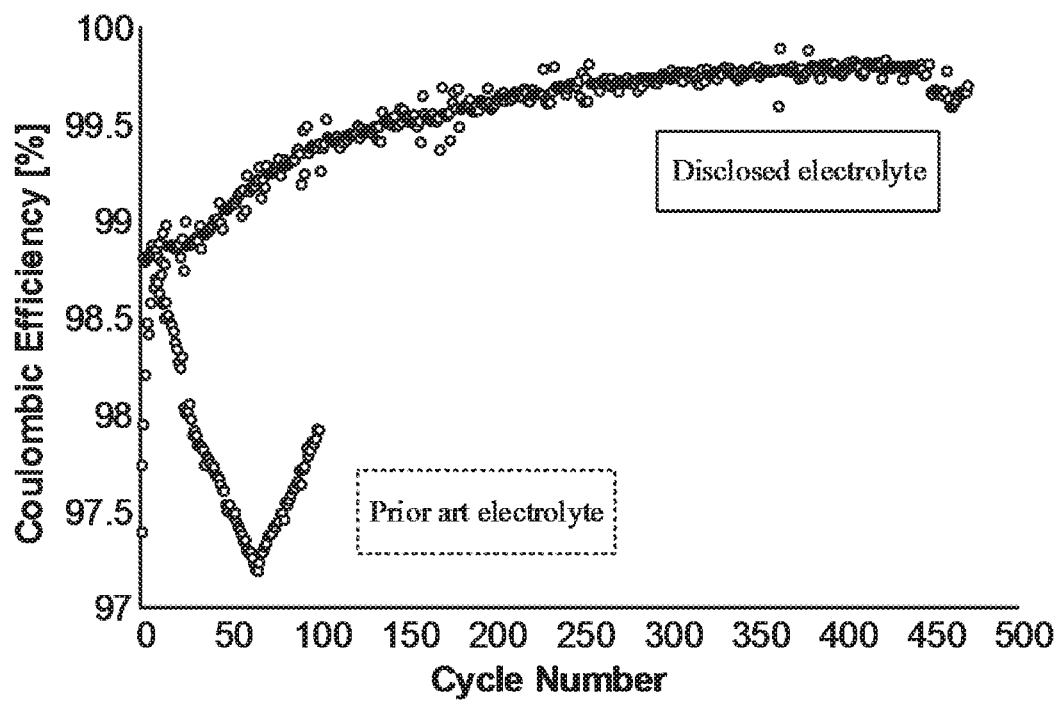
Figure 18D:
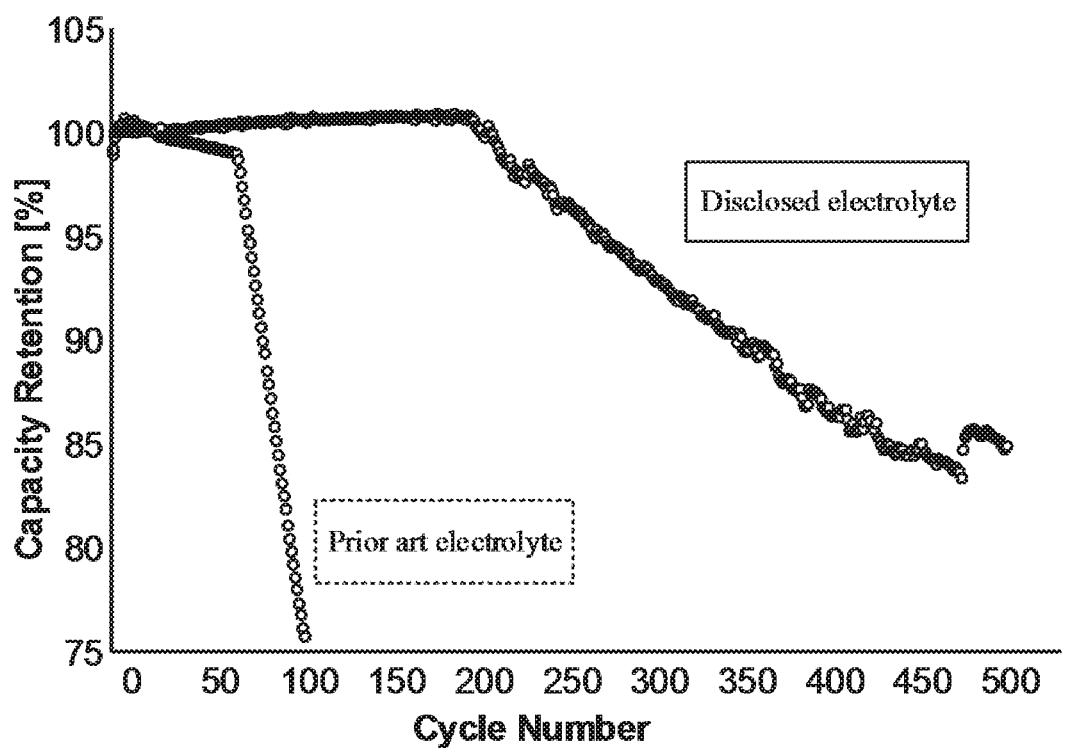

FIGS. 18A-18D demonstrate the increased cell life for using electrolyte 105, according to some embodiments of the invention, with respect to using prior art electrolytes, in half cell experimental setting for anodes 100 having Ge anode material. FIGS. 18A and 18B present, respectively, the coulombic efficiency (CE) and the capacity retention of half-cells having Ge-based anode 100 (and lithium electrode as cathode 87) with prior art electrolyte (1M $LiPF_6$ in EC:DMC (1:1) with 2 wt % VC) with respect to electrolyte 105 (1M $LiPF_6$ in FEC:DMC (1:1) with 2 wt % VC) having FEC replacing EC as the cyclic carbonate. As clearly shown in FIGS. 18A and 18B, both the coulombic efficiency and the capacity retention are much higher when using electrolyte 105 with Ge-based anode 100. FIGS. 18C and 18D present, respectively, the coulombic efficiency (CE) and the capacity retention of half-cells having Si:Sn-based anode 100 (and lithium electrode as cathode 87) with prior art electrolyte (1M $LiPF_6$ in EC:DMC (1:1) with 2 wt % VC) with respect to electrolyte 105 (1M $LiPF_6$ in FEC:DMC (1:1) with 2 wt % VC) having FEC replacing EC as the cyclic carbonate. As clearly shown in FIGS. 18C and 18D, both the coulombic efficiency and the capacity retention are much higher when using electrolyte 105 with Si:Sn-based anode 100 as well.

Figure 19A:
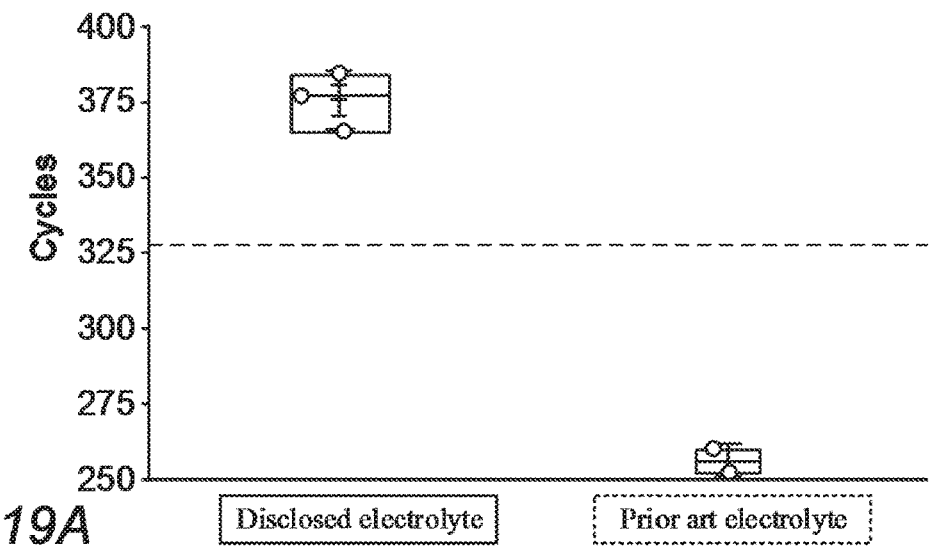
FIGS. 19A-19C demonstrate the increased performance for using electrolyte according to some embodiments of the invention, with respect to using prior art electrolytes, at high C rate in full cell experimental setting.
Figure 19B:
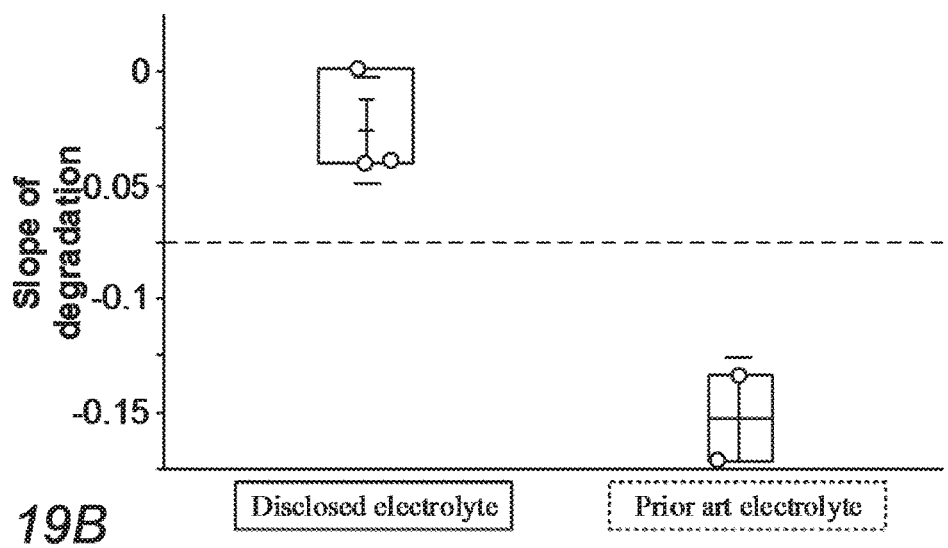
Figure 19C:
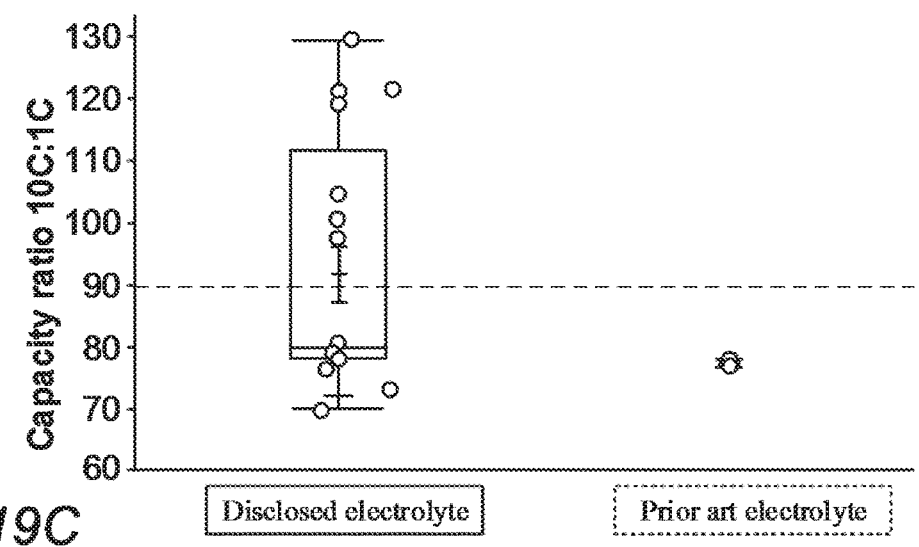

FIGS. 19A-19C demonstrate the increased performance for using electrolytes according to some embodiments of the invention, with respect to using prior art electrolytes, at high C rate in full cell experimental setting. The full cells, having Ge anode 100, a NCA cathode 87 and electrolyte 105 (1M $LiPF_6$ in FEC:DMC (1:1) with 2 wt % VC) were operated at 10 C charging rate (and 0.5C discharging rate) and compared to similar cells with prior art electrolyte (1M $LiPF_6$ in EC:DMC (1:1) with 10% wt FEC). FIG. 19A illustrates the increase in the number of cycles by ca. 50% (from ca. 250 to ca. 375) achieved using electrolyte 105 (mean, standard deviation and quantiles shown for three runs with the disclosed electrolyte and two runs with prior art electrolyte). FIG. 19B illustrates the much smaller slope of capacity degradation (ca. −0.02 compared with ca. −0.15) achieved using electrolyte 105 (mean, standard deviation and quantiles shown for three runs with the disclosed electrolyte and two runs with prior art electrolyte). FIG. 19C illustrates the higher ratio of capacity at 10 C charging rate with respect to 1 C charging rate (ca. 100 compared with ca. 75, respectively) achieved using electrolyte 105 (mean, standard deviation and quantiles shown for seventeen runs with the disclosed electrolyte and three runs with prior art electrolyte). The disclosed experimental data exemplifies the extraordinary improvement achieved by using disclosed electrolytes 105 having FEC (at 20-50% vol) as the cyclic carbonate thereof.

Figure 20A:
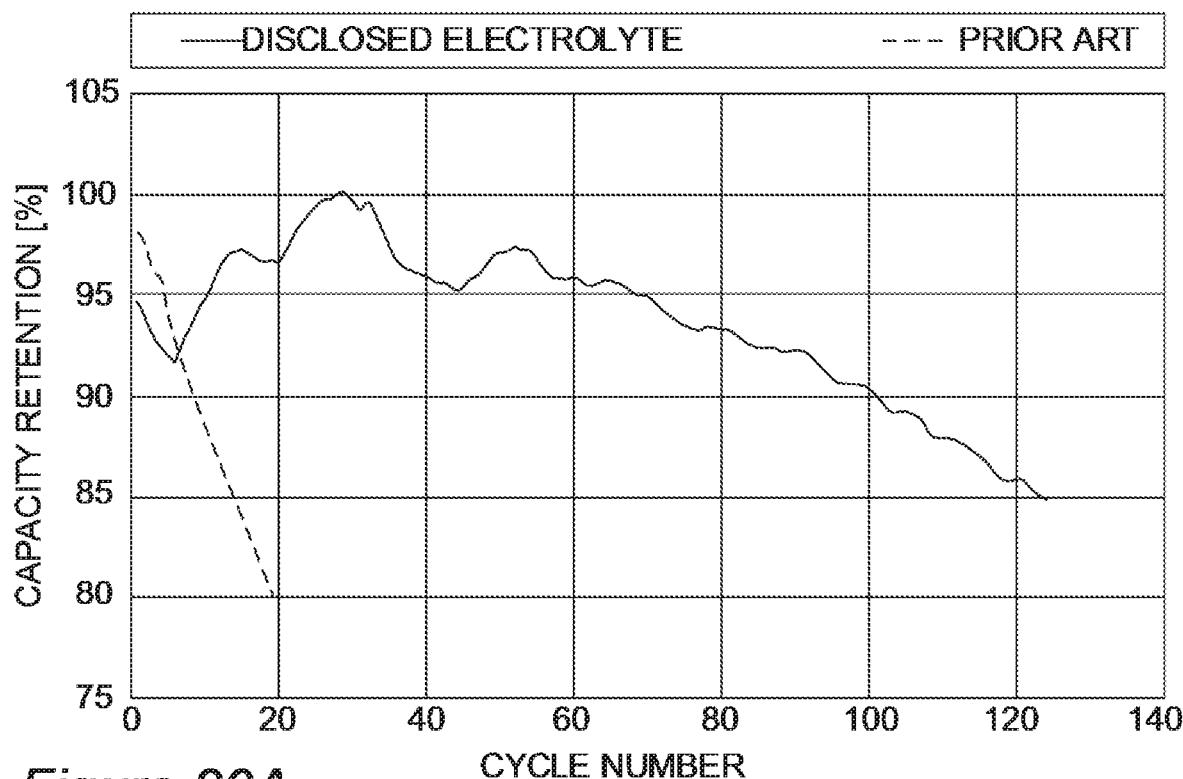
FIGS. 20A-20J provide a range of examples for disclosed electrolyte compositions which outperform prior art electrolytes, according to some embodiments of the invention.
Figure 20B:
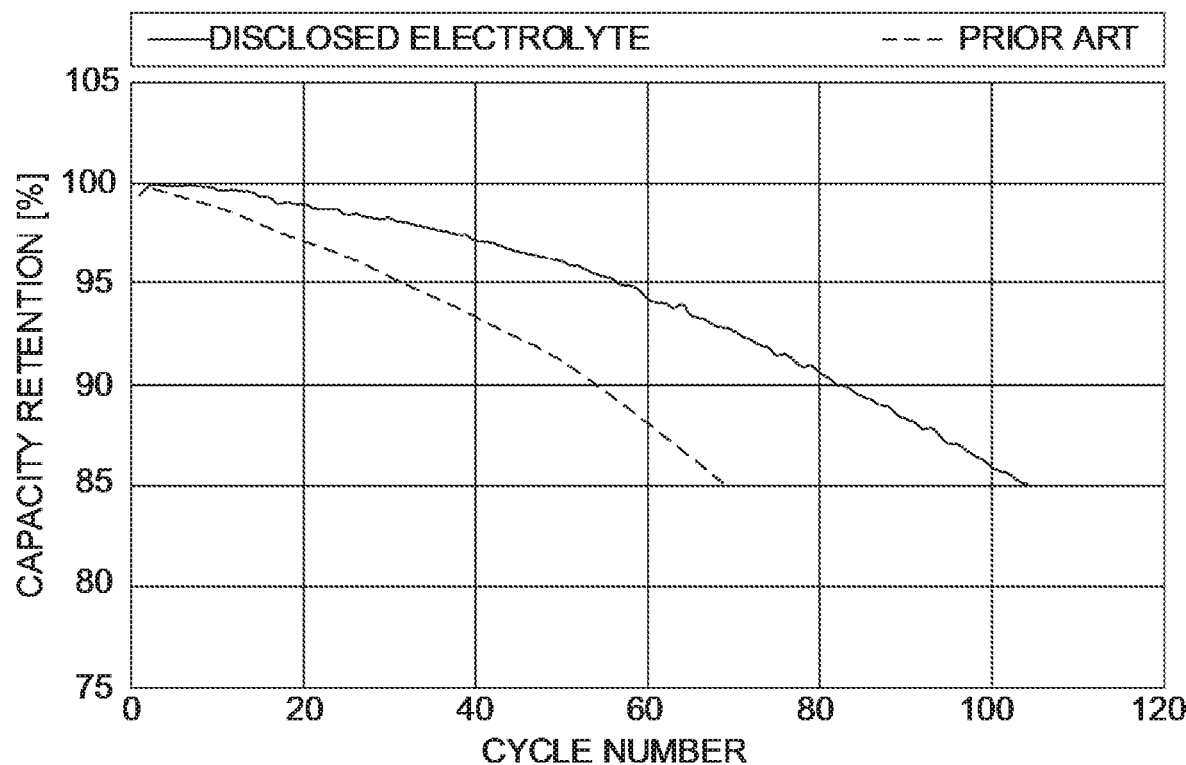
Figure 20C:
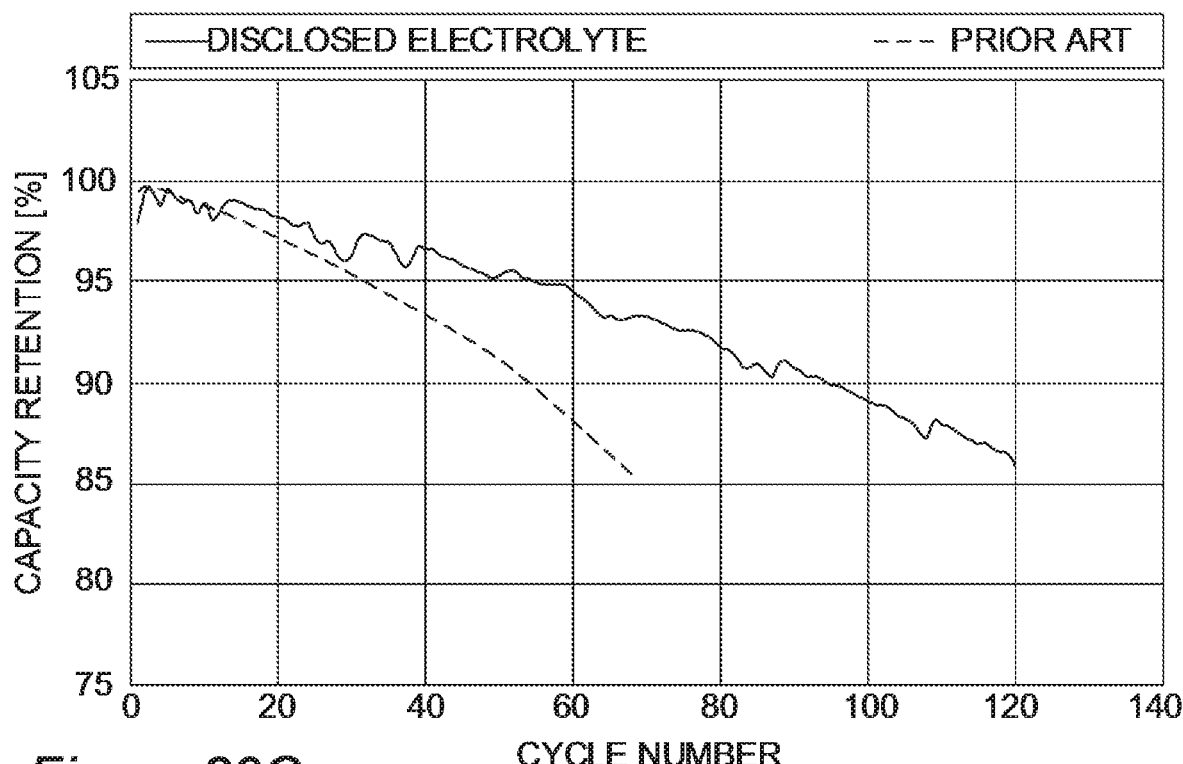
Figure 20D:
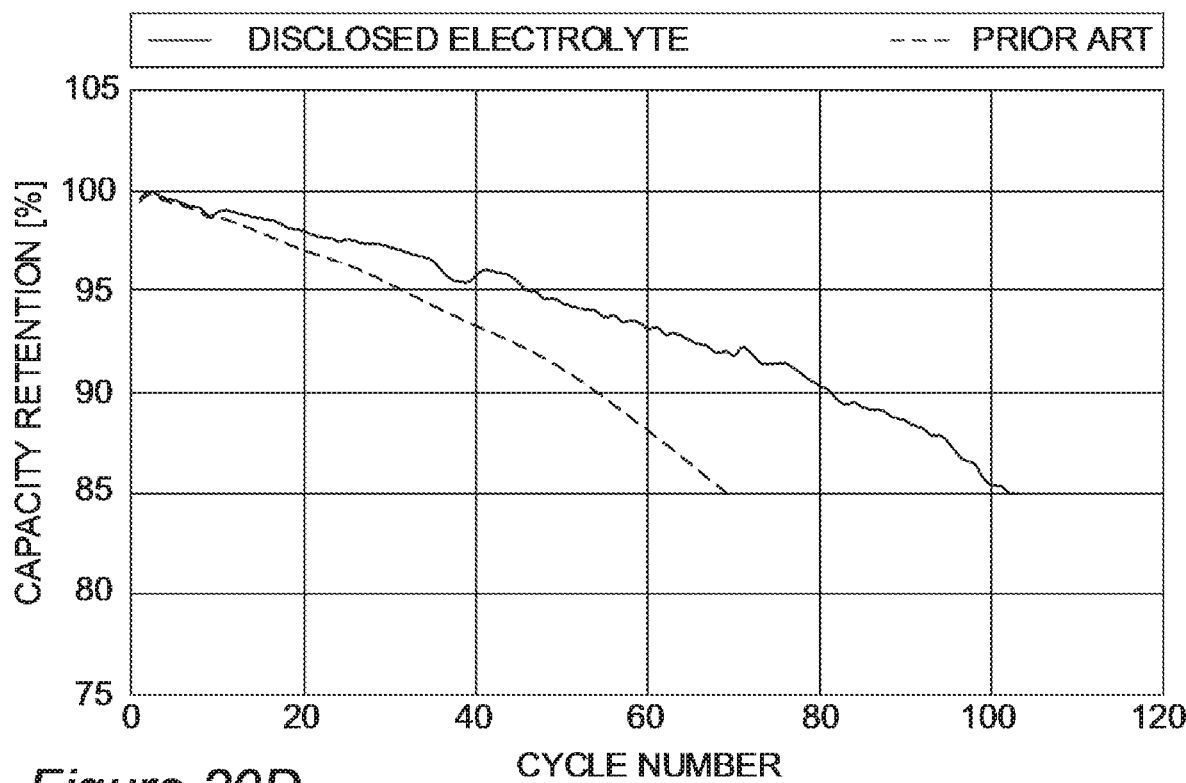
Figure 20E:
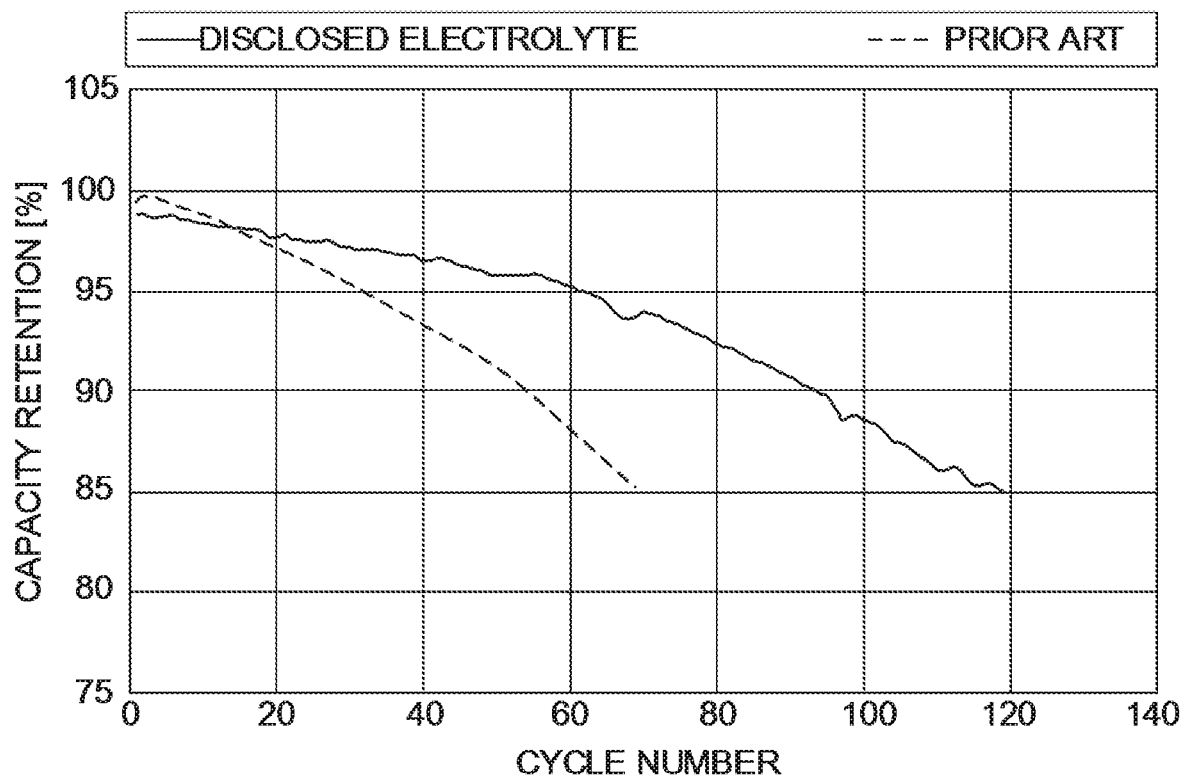
Figure 20F:
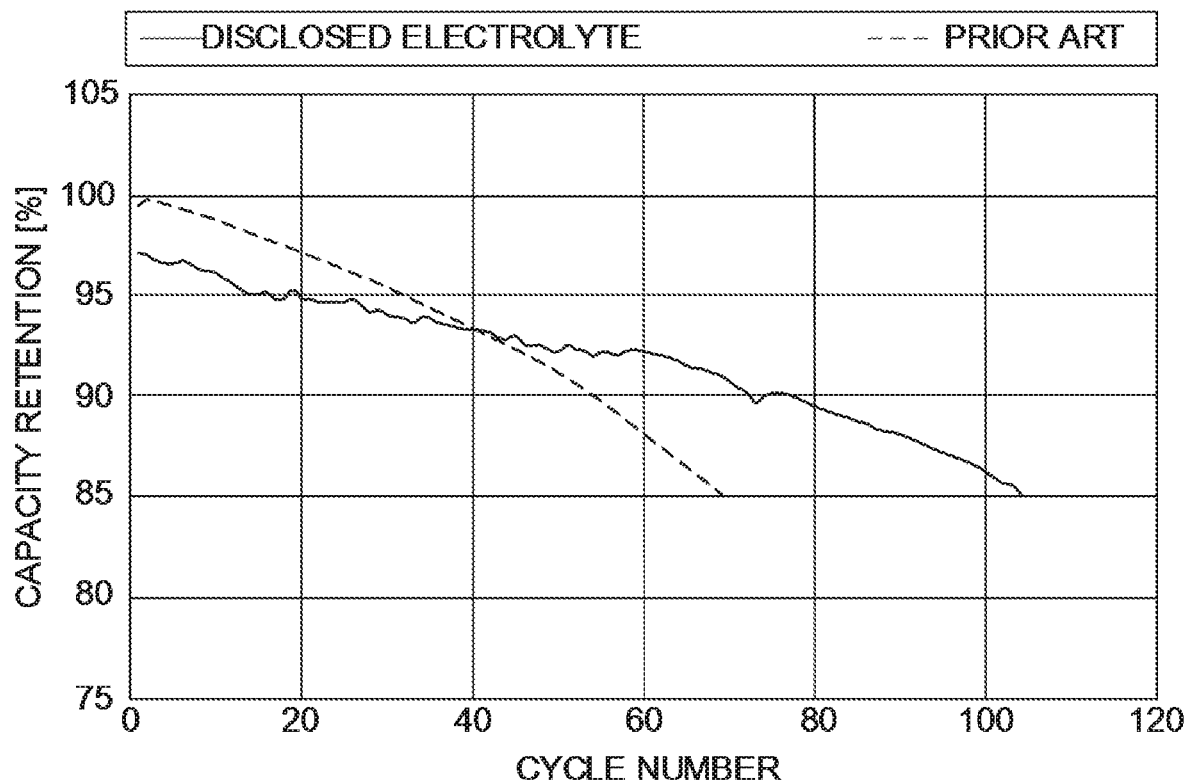
Figure 20G:
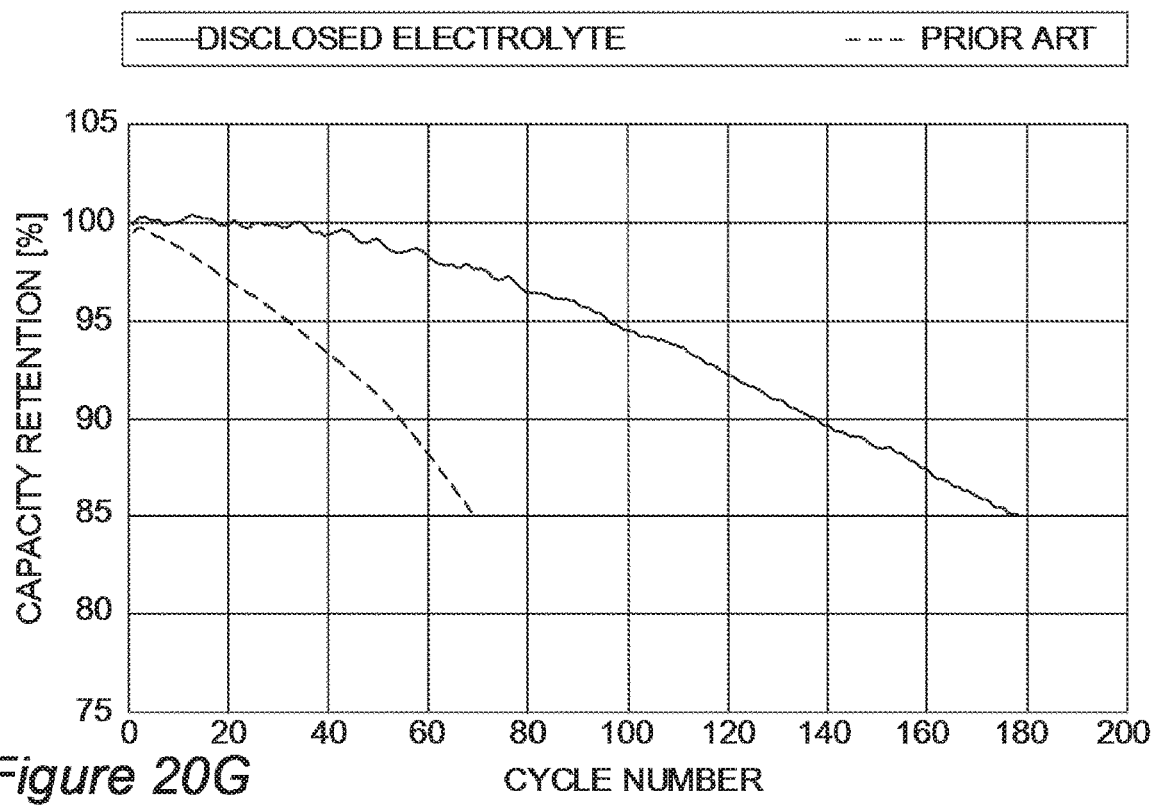

FIGS. 20A-20J provide a range of examples for disclosed electrolyte compositions 105 which outperform prior art electrolytes, according to some embodiments of the invention. All graphs show the capacity retention of cells having either electrolyte, with disclosed electrolytes 105 provide in most cases two to three-fold extensions of the cell lifetime. Disclosed electrolytes 105 in each of FIGS. 20A-20J are provided below. In FIG. 20A the anode material is tin-silicon-based, the examples are carried out in a full cell configuration, and the prior art electrolyte is 1M $LiPF_6$ EC:DMC (1:1) 10 wt % FEC. In FIGS. 20B-20I the anode material is germanium-based, the examples are carried out in full cells configurations, and the prior art electrolyte is 1M $LiPF_6$ EC:DMC (1:1) 10 wt % FEC, and in FIG. 20J the anode material is LTO-based, the example is carried out in a half cell configuration, and the prior art electrolyte is 1M $LiPF_6$ EC:DMC (1:1) 2 wt % VC. In all examples, the cells (and half-cell) are cycled at high charging/discharging rates of 10C.

Figure 20H:
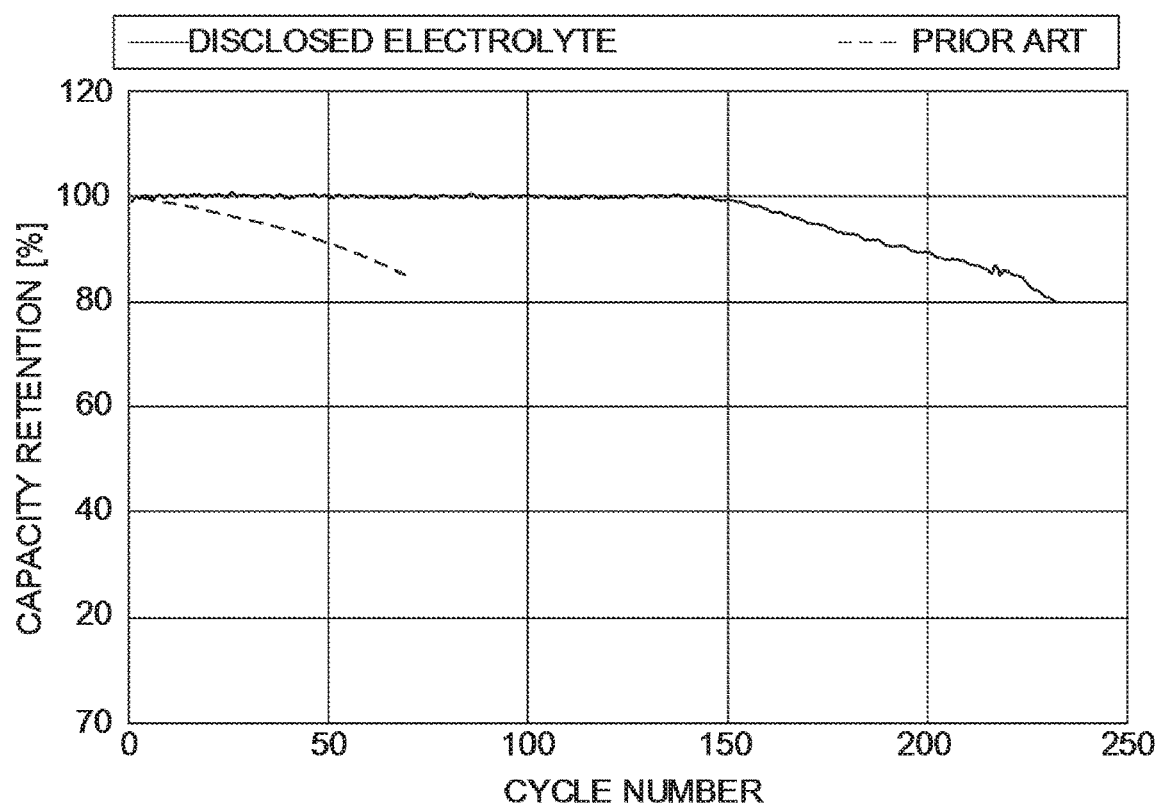
Figure 20I:
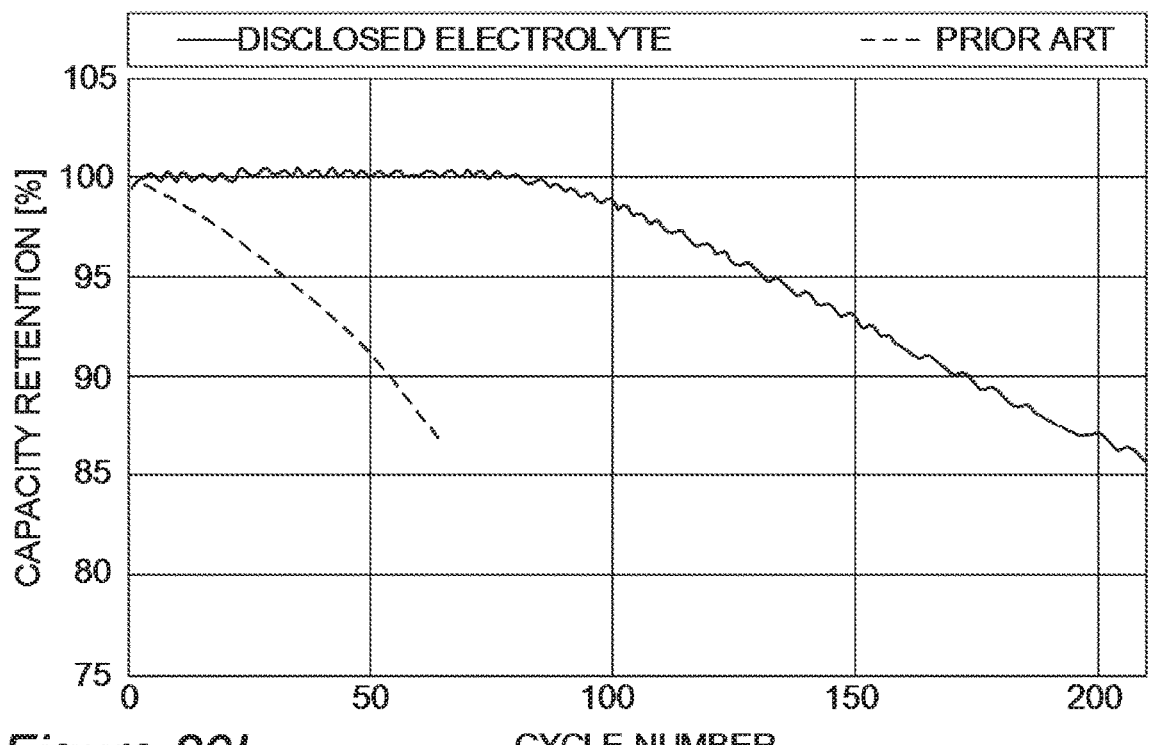
Figure 20J:
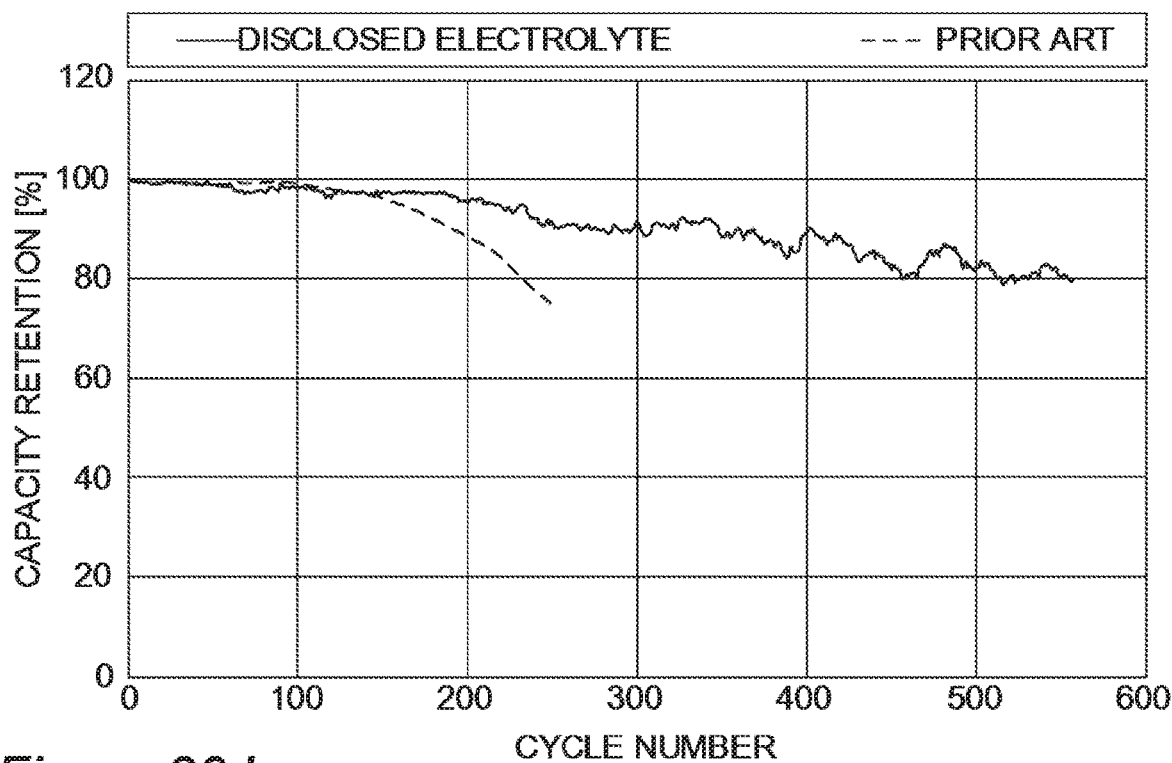

Examples for tested electrolytes 105 comprise the following non-limiting examples: 1.3M $LiPF_6$ FEC:DMC (1:1) 2 wt % VC (FIG. 20C); 1M $LiPF_6$ FEC:DMC (3:7) 2 wt % VC; 1M $LiPF_6$ FEC:DMC (3:7) 2 wt % VC 10 wt % EC; 1M $LiPF_6$ FEC:DEC (1:1) 2 wt % VC; 1M $LiPF_6$ FEC:DEC (3:7) 2 wt % VC (FIGS. 20A and 20J); 1M $LiPF_6$ FEC:EMC 3:7 2 wt % VC; 1M $LiPF_6$ FEC:PC:EMC (2:3:5) 2 wt % VC; 1M $LiPF_6$ FEC:DMC (1:1) 2% VC 10 wt % TMP (trimethyl phosphate) 0.05M LIFOB; 1M $LiPF_6$ FEC:DMC (1:1) 2% VC 10 wt % TMP 0.5 wt % TMSP (tris(trimethylsilyl) phosphite) (FIG. 20D); 1M $LiPF_6$ FEC:DMC (1:1) 2 wt % VC 10 wt % TMP 0.05M LIFOB 0.5 wt % TMSP; 1M $LiPF_6$ FEC:DMC (1:1) 2 wt % VC 10 wt % TMP 0.05M LIBOB; 1M $LiPF_6$ FEC:DMC (1:1) 2 wt % VC 10 wt % TMP 1 wt % DPDMS (diphenyldimethoxysilane); 1M $LiPF_6$ FEC:EMC (3:7) 2 wt % VC 10 wt % TMP (FIG. 20B); 1M $LiPF_6$ FEC:EMC (3:7) 2 wt % VC 10 wt % MFE; 1M $LiPF_6$ FEC:DMC (3:7) 2 wt % VC 10 wt % TMP; 1M $LiPF_6$ FEC:DMC (1:1) 2 wt % VC 10 wt % TMP; 1M $LiPF_6$ FEC:EMC (2.5:7.5) 1.5 wt % VC (FIG. 20E); and 1M $LiPF_6$ FEC:EMC:DMC (2.5:6.5:1) 0.5 wt % VC (FIG. 20F); 1M $LiPF_6$ VC:EA:EMC (3:3.5:3.5) (FIG. 20I); 1M $LiPF_6$ VC:EMC (3:7) (FIG. 20G); 1M $LiPF_6$ FEC:EMC (3:7) (FIG. 20H). These compositions were tested and found at least as good as, or better than prior art electrolyte composition 1M $LiPF_6$ EC:DMC 1:1 10 wt % FEC with respect to capacity retention after fast charging (at 10 C) and cycle lifetime under high C cycling.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A fast-charging lithium ion cell comprising an anode, a cathode and at least one compliant semi-solid composite electrolyte, the compliant semi-solid composite electrolyte comprising solid electrolyte particles coated by a flexible ionic conductive coating material, and the anode comprises active material particles that are coated by the flexible ionic conductive coating material, wherein a flexibility of the ionic conductive coating material on the solid electrolyte particles makes the semi-solid composite electrolyte compliant to applied pressures that are caused by expanding and shrinking anode active material, and maintains continuous solid or semi-solid contact between anodes and cathodes of the cells.

2. The fast-charging lithium ion cell of claim 1, wherein the flexible ionic conductive coating material is selected to increase a contact area between the coated solid electrolyte particles and the coated active material particles of the anode with respect to a contact area therewith of uncoated solid electrolyte particles, and to provide an ionic conduction path through flexible ionic conductive coatings of the solid electrolyte particles, throughout at least a portion of the compliant semi-solid composite electrolyte.

3. The fast-charging lithium ion cell of claim 1, wherein the flexible ionic conductive coating material comprises a plurality of lithium ion binding sites which are separated from each other by 2-3 nm or less.

4. The fast-charging lithium ion cell of claim 1, wherein the flexible ionic conductive coating material further comprises bonding molecules selected to bind the coated active material particles of the anode.

5. The fast-charging lithium ion cell of claim 1, wherein the flexible ionic conductive coating material further comprises bonding molecules selected to bind cations and/or anions of a predefined ionic liquid.

6. The fast-charging lithium ion cell of claim 1, that is configured to be charged at a maximal charging rate of 4C or more.

7. The fast-charging lithium ion cell of claim 6, wherein the at least one compliant semi-solid composite electrolyte comprises at least one compliant semi-solid composite electrolyte layer attached to the anode and to the cathode on either side thereof.

8. The fast-charging lithium ion cell of claim 7, further comprising a liquid electrolyte and a separator between the compliant semi-solid composite electrolyte attached to the anode and the compliant semi-solid composite electrolyte attached to the cathode.

9. The fast-charging lithium ion cell of claim 8, wherein the liquid electrolyte is a viscous ionic liquid.

10. The fast-charging lithium ion cell of claim 8, wherein the liquid electrolyte comprises an ionic liquid additive.

11. A method comprising coating solid electrolyte particles with flexible ionic conductive coating material, coating active material particles of an anode with the flexible ionic conductive coating material, and using the coated solid electrolyte particles as a compliant semi-solid composite electrolyte in a fast-charging lithium ion cell, wherein a flexibility of the ionic conductive coating material on the solid electrolyte particles makes the semi-solid composite electrolyte compliant to applied pressures that are caused by expanding and shrinking anode active material, and maintains continuous solid or semi-solid contact between anodes and cathodes of the cells.

12. The method of claim 11, further comprising configuring the flexible ionic conductive coating material in the fast-charging lithium ion cell to increase a contact area between the solid electrolyte particles and the coated electrode active material particles of the anode with respect to a contact area therewith of uncoated solid electrolyte particles.

13. The method of claim 11, further comprising configuring the flexible ionic conductive coating material in the fast-charging lithium ion cell to provide an ionic conduction path through the flexible ionic conductive coating material throughout at least a portion of the compliant semi-solid composite electrolyte.

14. The method of claim 11, further comprising bonding the coated solid electrolyte particles to electrode active material in the fast-charging lithium ion cell by bonding molecules in the flexible ionic conductive coating material.

15. The method of claim 11, further comprising bonding ionic liquid ions in the fast-charging lithium ion cell to the solid electrolyte particles by bonding molecules in the flexible ionic conductive coating material.

16. The method of claim 11, further comprising attaching at least one compliant semi-solid composite electrolyte layer to the anode and attaching at least one compliant semi-solid composite electrolyte layer to the cathode to form a fast-charging lithium ion cell that is configured to be charged at a maximal charging rate of 4C or more.

17. The fast-charging lithium ion cell of claim 6, wherein the anode comprises metalloid anode active material comprising at least one of Si, Ge and Sn.

18. The method of claim 11, wherein the fast-charging lithium ion cell comprises at least one anode that comprises metalloid anode active material comprising at least one of Si, Ge and Sn.

19. The method of claim 15, further comprising including a liquid electrolyte and a separator between the compliant semi-solid composite electrolyte attached to the anode and the compliant semi-solid composite electrolyte attached to the cathode, wherein the liquid electrolyte comprises a viscous ionic liquid and an ionic liquid additive comprising the ionic liquid ions.

20. The method of claim 11 comprising minimizing a porosity of an interface region between the electrolyte and the anode.

21. The fast-charging lithium ion cell of claim 1 comprising an interface region between the electrolyte and the anode, the interface region having a minimal porosity.

* * * * *